(12) United States Patent
Hidaka et al.

(10) Patent No.: US 11,814,130 B2
(45) Date of Patent: Nov. 14, 2023

(54) OPERATING DEVICE FOR HUMAN-POWERED VEHICLE

(71) Applicant: SHIMANO INC., Sakai (JP)

(72) Inventors: Yuichiro Hidaka, Sakai (JP); Yasuyuki Komada, Sakai (JP)

(73) Assignee: SHIMANO INC., Sakai (JP)

( * ) Notice: Subject to any disclaimer, the term of this patent is extended or adjusted under 35 U.S.C. 154(b) by 163 days.

(21) Appl. No.: 17/213,142

(22) Filed: Mar. 25, 2021

(65) Prior Publication Data

US 2022/0306236 A1    Sep. 29, 2022

(51) Int. Cl.
| | |
|---|---|
| *B62K 23/06* | (2006.01) |
| *B62J 45/00* | (2020.01) |
| *B62M 25/08* | (2006.01) |
| *B62L 3/02* | (2006.01) |

(52) U.S. Cl.
CPC .............. *B62K 23/06* (2013.01); *B62J 45/00* (2020.02); *B62L 3/02* (2013.01); *B62M 25/08* (2013.01)

(58) Field of Classification Search
CPC .. B62K 23/06; B62J 45/00; B62L 3/02; B62L 3/023; B62M 25/08
See application file for complete search history.

(56) References Cited

U.S. PATENT DOCUMENTS

| | | | |
|---|---|---|---|
| 6,073,730 A | 6/2000 | Abe | |
| 7,760,078 B2 | 7/2010 | Miki et al. | |
| 9,434,437 B2 | 9/2016 | Van Dyke et al. | |
| 10,486,658 B2 | 11/2019 | Komatsu et al. | |
| 2003/0032327 A1 | 2/2003 | LaBonte | |
| 2008/0210045 A1 | 9/2008 | De Perini et al. | |
| 2008/0210046 A1 | 9/2008 | De Perini | |
| 2009/0315692 A1 | 12/2009 | Miki et al. | |
| 2012/0096978 A1 | 4/2012 | Voshell et al. | |
| 2014/0102237 A1 | 4/2014 | Jordan et al. | |
| 2015/0284049 A1 | 10/2015 | Shipman et al. | |
| 2016/0311499 A1 | 10/2016 | Kasai | |
| 2017/0080993 A1 | 3/2017 | Bierwerth et al. | |

(Continued)

FOREIGN PATENT DOCUMENTS

| | | |
|---|---|---|
| CN | 1202437 | 12/1998 |
| CN | 107010156 | 8/2017 |

(Continued)

OTHER PUBLICATIONS

Do two non-parallel intersect each other? Microsoft Bing, Nov. 27, 2022 (Year: 2022).*

(Continued)

*Primary Examiner* — Vinh Luong
(74) *Attorney, Agent, or Firm* — MORI & WARD, LLP

(57) ABSTRACT

An operating device for a human-powered vehicle comprises a base member and an electric communication port. The base member extends in a longitudinal direction. The base member includes a first end portion and a second end portion. The first end portion is configured to be coupled to a handlebar. The second end portion is opposite to the first end portion in the longitudinal direction. The electric communication port is configured to be electrically connected to a connector of an electric cable. The electric communication port is closer to the second end portion than the first end portion in the longitudinal direction.

20 Claims, 36 Drawing Sheets

(56) References Cited

U.S. PATENT DOCUMENTS

| | | | |
|---|---|---|---|
| 2017/0305395 A1 | 10/2017 | Komatsu et al. | |
| 2017/0305490 A1 | 10/2017 | Komatsu et al. | |
| 2018/0001960 A1 | 1/2018 | Pasqua | |
| 2018/0057102 A1 | 3/2018 | Komatsu et al. | |
| 2018/0057103 A1 | 3/2018 | Komatsu et al. | |
| 2018/0057104 A1 | 3/2018 | Komatsu et al. | |
| 2018/0141611 A1* | 5/2018 | Komada | B62M 25/08 |
| 2019/0002057 A1 | 1/2019 | Jordan et al. | |
| 2019/0210691 A1 | 7/2019 | Cahan et al. | |
| 2019/0372279 A1* | 12/2019 | Komada | H01R 4/48 |
| 2019/0382074 A1 | 12/2019 | Bierwerth et al. | |
| 2019/0382081 A1 | 12/2019 | Bierwerth et al. | |
| 2020/0010150 A1* | 1/2020 | Tasoniero | B62K 21/26 |
| 2020/0283095 A1* | 9/2020 | Nichols | F16H 25/20 |
| 2021/0139102 A1 | 5/2021 | Komada et al. | |
| 2021/0144453 A1 | 5/2021 | Komada et al. | |
| 2022/0144378 A1* | 5/2022 | Swanson | B62M 25/08 |
| 2022/0306231 A1* | 9/2022 | Hidaka | B62L 3/023 |

FOREIGN PATENT DOCUMENTS

| | | |
|---|---|---|
| CN | 107303924 | 10/2017 |
| CN | 107303929 | 10/2017 |
| CN | 107776814 | 3/2018 |
| CN | 208715401 | 4/2019 |
| DE | 102016010801 | 3/2017 |
| DE | 10 2018 009 621 | 7/2019 |
| DE | 10 2019 004 154 | 12/2019 |
| TW | I667169 B | 8/2019 |

OTHER PUBLICATIONS

Difference between Reference Planes and Reference Lines—Revit, Aug. 31, 2015 (Year: 2015).*
What is a reference plane? Microsoft Bing, Nov. 27, 2022 (Year: 2022).*
Office Action with Form PTO-892 Notice of References Cited issued by the United States Patent and Trademark Office for the co-pending U.S. Appl. No. 16/864, 165, dated Nov. 9, 2021.
Office Action with Form PTO-892 Notice of References Cited issued by the United States Patent and Trademark Office for the co-pending U.S. Appl. No. 16/683,212, dated Feb. 8, 2021.
Define electrical contact, Google Search, May 7, 2021 (Year: 2021).
Office Action with Form PTO-892 Notice of References Cited issued by the United States Patent and Trademark Office for the co-pending U.S. Appl. No. 16/950,829, dated May 12, 2021.
Office Action with Form PTO-892 Notice of References Cited issued by the United States Patent and Trademark Office for the co-pending U.S. Appl. No. 16/864,165, dated May 14, 2021.
Define plane, Google Search, Nov. 17, 2021.
Definition of plane, merriam-webster.com, Nov. 16, 2021.
Definition of area, merriam-webster.com, Nov. 16, 2021.
Define reference plane, Google Search, Nov. 16, 2021.
Office Action with Form PTO-892 Notice of References Cited issued by the United States Patent and Trademark Office for the co-pending U.S. Appl. No. 16/683,206, dated Nov. 22, 2021.
U.S. Appl. No. 16/683,200, filed Nov. 13, 2019 (unpublished).
U.S. Appl. No. 16/864,165, filed May 1, 2020 (unpublished).
U.S. Appl. No. 17/003,948 filed Aug. 26, 2020 (unpublished).
U.S. Appl. No. 16/950,829, filed Nov. 17, 2020 (unpublished).
U.S. Appl. No. 16/950,831, filed Nov. 17, 2020 (unpublished).
Advisory Action issued by the United States Patent and Trademark Office for the co-pending U.S. Appl. No. 16/864,165, dated Feb. 4, 2022.
Office Action issued by the United States Patent Trademark Office for the co-pending U.S. Appl. No. 16/864,165, dated Feb. 15, 2022.
Office Action with Form PTO-892 Notice of References Cited issued by the United States Patent and Trademark Office for the co-pending U.S. Appl. No. 16/683,212, dated Feb. 9, 2022.
Office Action with Form PTO-892 Notice of References Cited issued by the United States Patent and Trademark Office for the co-pending U.S. Appl. No. 16/683,212, dated Jul. 15, 2021.
Office Action with Form PTO-892 Notice of References Cited issued by the United States Patent and Trademark Office for the co-pending U.S. Appl. No. 16/683,200, dated Dec. 9, 2021.
Office Action issued by the United States Patent and Trademark Office for the co-pending U.S. Appl. No. 16/683,200, dated Apr. 14, 2022.
"Vuka Shift AXS User Manual", SRAM, LLC., 2020.

* cited by examiner

OPERATING DEVICE FOR HUMAN-POWERED VEHICLE

BACKGROUND OF THE INVENTION

Field of the Invention

The present invention relates to an operating device for a human-powered vehicle.

Discussion of the Background

A human-powered vehicle includes an operating unit configured to operate an operated unit. The operating unit is configured to operate a component in response to a user input. The operating unit may be configured to communicate with other components via an electric cable. One object of the present disclosure is to effectively utilize a part of the operating unit for providing a communication port.

SUMMARY OF THE INVENTION

In accordance with a first aspect of the present invention, an operating device for a human-powered vehicle comprises a base member and an electric communication port. The base member extends in a longitudinal direction. The base member includes a first end portion and a second end portion. The first end portion is configured to be coupled to a handlebar. The second end portion is opposite to the first end portion in the longitudinal direction. The electric communication port is configured to be electrically connected to a connector of an electric cable. The electric communication port is closer to the second end portion than the first end portion in the longitudinal direction.

With the operating device according to the first aspect, it is possible to effectively utilize the second end portion and/or the surrounding part of the second end portion for providing the electric communication port.

In accordance with a second aspect of the present invention, the operating device according to the first aspect is configured so that the electric communication port is provided at the second end portion.

With the operating device according to the second aspect, it is possible to effectively utilize the second end portion for providing the electric communication port.

In accordance with a third aspect of the present invention, an operating device for a human-powered vehicle comprises a base member, a hydraulic unit, and an electric communication port. The base member extends in a longitudinal direction. The base member includes a first end portion and a second end portion. The first end portion is configured to be coupled to a handlebar. The second end portion is opposite to the first end portion in the longitudinal direction. The hydraulic unit includes a cylinder bore and a piston movably provided in the cylinder bore. The electric communication port is configured to be electrically connected to a connector of an electric cable. The electric communication port is closer to the second end portion than at least one of the cylinder bore and the piston.

With the operating device according to the third aspect, it is possible to effectively utilize the second end portion and/or the surrounding part of the second end portion for providing the electric communication port while the operating device uses the hydraulic unit.

In accordance with a fourth aspect of the present invention, the operating device according to the third aspect is configured so that the hydraulic unit includes a hydraulic chamber and a reservoir chamber. The hydraulic chamber is defined by the cylinder bore and the piston. The reservoir chamber is configured to be in communication with the hydraulic chamber. The electric communication port is closer to the second end portion than at least one of the hydraulic chamber and the reservoir chamber.

With the operating device according to the fourth aspect, it is possible to more effectively utilize the second end portion and/or the surrounding part of the second end portion for providing the electric communication port while the operating device uses the hydraulic unit.

In accordance with a fifth aspect of the present invention, the operating device according to any one of the first to fourth aspects is configured so that the electric communication port includes an insertion hole extending in a port insertion direction. The port insertion direction is different from the longitudinal direction.

With the operating device according to the fifth aspect, it is possible to efficiently arrange the electric communication port relative to the base member.

In accordance with a sixth aspect of the present invention, an operating device for a human-powered vehicle comprises a base member and an electric communication port. The base member extends in a longitudinal direction. The base member includes a first end portion and a second end portion. The first end portion is configured to be coupled to a handlebar. The second end portion is opposite to the first end portion in the longitudinal direction. The electric communication port is configured to be electrically connected to a connector of an electric cable. The electric communication port includes an insertion hole extending in a port insertion direction different from the longitudinal direction. The electric communication port is provided non-movably relative to the base member.

With the operating device according to the sixth aspect, it is possible to efficiently arrange the electric communication port relative to the base member.

In accordance with a seventh aspect of the present invention, the operating device according to the fifth or sixth aspect is configured so that the port insertion direction is non-parallel to the longitudinal direction.

With the operating device according to the seventh aspect, it is possible to more efficiently arrange the electric communication port relative to the base member.

In accordance with an eighth aspect of the present invention, the operating device according to the fifth or sixth aspect is configured so that the port insertion direction is perpendicular to the longitudinal direction.

With the operating device according to the eighth aspect, it is possible to more efficiently arrange the electric communication port relative to the base member.

In accordance with a ninth aspect of the present invention, an operating device for a human-powered vehicle comprises a base member, an operating member, and an electric communication port. The base member extends in a longitudinal direction. The base member includes a first end portion and a second end portion. The first end portion is configured to be coupled to a handlebar. The second end portion is opposite to the first end portion in the longitudinal direction. The operating member is pivotally coupled to the base member about a pivot axis. The electric communication port is configured to be electrically connected to a connector of an electric cable. The electric communication port includes an insertion hole defining an insertion opening. The insertion opening faces a reference plane intersecting with the pivot axis.

With the operating device according to the ninth aspect, it is possible to efficiently arrange the electric communication port relative to the base member.

In accordance with a tenth aspect of the present invention, the operating device according to any one of the first to ninth aspects further comprises an operating member pivotally coupled to the base member about a pivot axis. The electric communication port is provided above the pivot axis as viewed along the pivot axis in a mounting state where the first end portion is coupled to the handlebar.

With the operating device according to the tenth aspect, it is possible to efficiently arrange the electric communication port relative to the base member.

In accordance with an eleventh aspect of the present invention, the operating device according to any one of the first to tenth aspects is configured so that the base member includes a first lateral surface and a second lateral surface provided on a reverse side of the first lateral surface. The electric communication port is provided in at least one of the first lateral surface and the second lateral surface.

With the operating device according to the eleventh aspect, it is possible to effectively utilize at least one of the first lateral surface and the second lateral surface on the base member for providing the electric communication port.

In accordance with a twelfth aspect of the present invention, the operating device according to any one of the first to eleventh aspects further comprises an operating member pivotally coupled to the base member about a pivot axis. The base member includes an accommodating structure configured to accommodate a power supply. The electric communication port is closer to the accommodating structure than the pivot axis as viewed along the pivot axis.

With the operating device according to the twelfth aspect, it is possible to effectively utilize the accommodating structure and/or the surrounding part of the accommodating structure for providing the electric communication port.

In accordance with a thirteenth aspect of the present invention, the operating device according to the twelfth aspect is configured so that the accommodating structure includes a power-supply accommodating space in which the power supply is to be provided. The electric communication port is closer to the power-supply accommodating space than the pivot axis as viewed along the pivot axis.

With the operating device according to the thirteenth aspect, it is possible to effectively utilize the power-supply accommodating space and/or the surrounding part of the power-supply accommodating space for providing the electric communication port.

In accordance with a fourteenth aspect of the present invention, the operating device according to any one of the first to thirteenth aspects further comprises circuitry electrically connected to the electric communication port.

With the operating device according to the fourteenth aspect, it is possible to provide communication between the circuitry and other components via the electric communication port.

In accordance with a fifteenth aspect of the present invention, the operating device according to the fourteenth aspect is configured so that the circuitry includes a substrate provided to the second end portion.

With the operating device according to the fifteenth aspect, it is possible to provide communication between the circuitry and other components via the electric communication port and the substrate.

In accordance with a sixteenth aspect of the present invention, the operating device according to the fourteenth or fifteenth aspect further comprises a wire configured to electrically connect the electric communication port to the substrate. The wire is provided in the base member.

With the operating device according to the sixteenth aspect, it is possible to make it easier to protect the wire.

In accordance with a seventeenth aspect of the present invention, the operating device according to any one of the first to sixteenth aspects is configured so that the second end portion includes a pommel portion. The electric communication port is closer to the pommel portion than the first end portion in the longitudinal direction.

With the operating device according to the seventeenth aspect, it is possible to effectively utilize the pommel portion and/or the surrounding of the pommel portion for providing the electric communication port.

In accordance with an eighteenth aspect of the present invention, the operating device according to any one of the first to seventeenth aspects is configured so that the base member includes a grip portion provided between the first end portion and the second end portion in the longitudinal direction.

With the operating device according to the eighteenth aspect, it is possible to apply the electric communication port to the base member configured to be gripped by a user.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
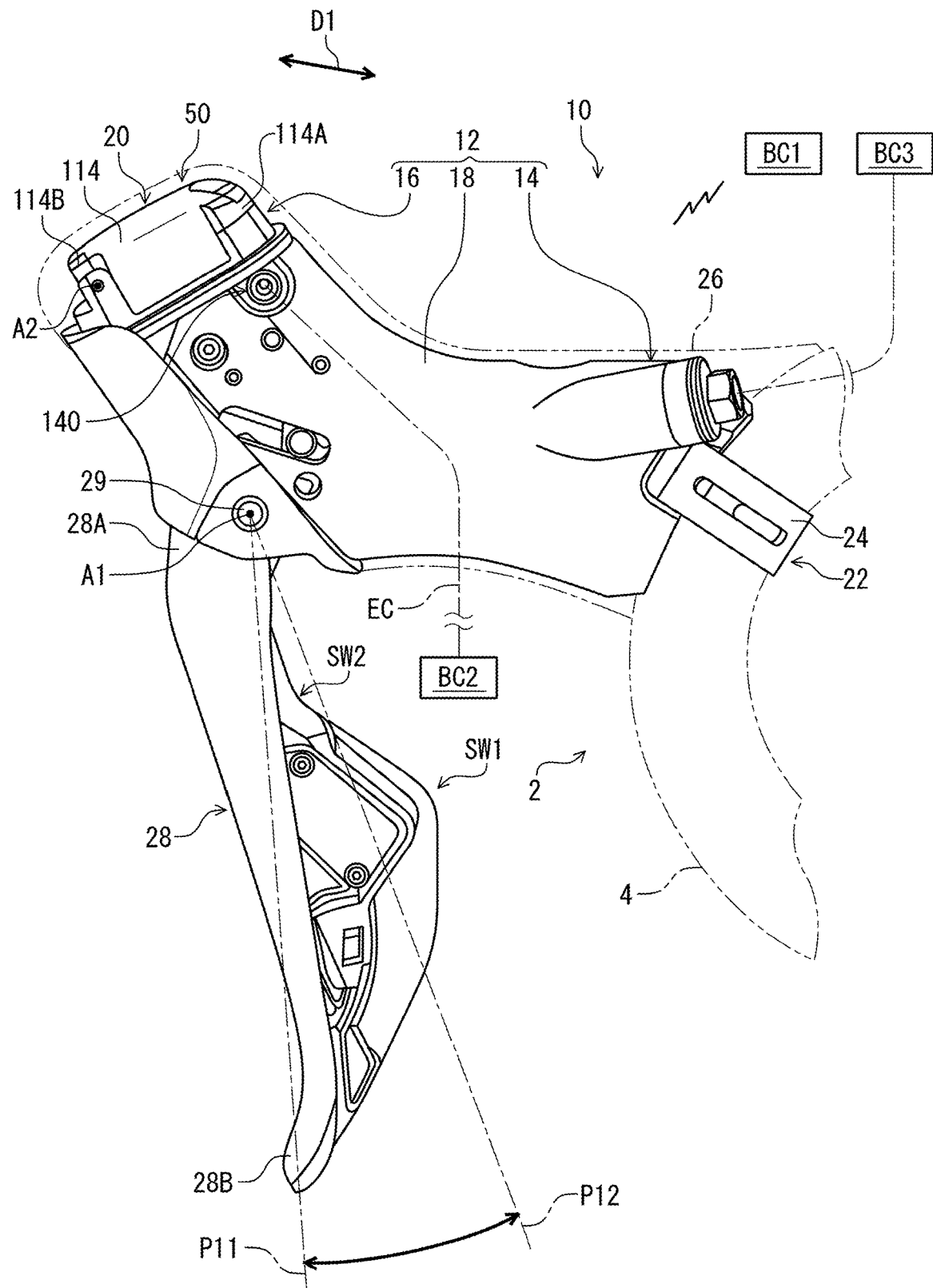
FIG. 1 is a side elevational view of an operating device in accordance with a first embodiment.

The embodiment(s) will now be described with reference to the accompanying drawings, wherein like reference numerals designate corresponding or identical elements throughout the various drawings.

First Embodiment

As seen in FIG. 1, an operating device 10 for a human-powered vehicle 2 is configured to operate at least one component. The operating device 10 is configured to be mounted to a handlebar 4. In the present application, a human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

The operating device 10 is configured to be electrically connected to an electric component BC1. In the present embodiment, the operating device 10 is configured to be connected to the electric component BC1 via a wireless communication channel. The operating device 10 is configured to be wirelessly connected to the electric component BC1.

The operating device 10 is configured to be electrically connected to an additional electric component BC2. In the present embodiment, the operating device 10 is configured to be connected to the additional electric component BC2 via a wired communication channel. The operating device 10 is configured to be connected to the additional electric component BC2 via an electric cable.

Examples of the electric component BC1 and the additional electric component BC2 include an additional or satellite operating device, an adjustable seatpost, a suspension, a gear changing device, a brake device, a lighting device, a display device, a cycle computer, a smartphone, a tablet computer, and a personal computer. In the present embodiment, the electric component BC1 includes a gear changing device such as a derailleur. The additional electric component BC2 includes a personal computer. However, the electric component BC1 the additional electric computer BC2 are not limited to the above devices.

The operating device 10 is configured to be connected to an additional component BC3. In the present embodiment, the operating device 10 is configured to be connected to the additional component BC3 via a hydraulic hose. However, the operating device 10 can be configured to be connected to the additional component BC3 via other elements such as a mechanical cable (e.g., Bowden cable).

Examples of the additional component BC3 include an adjustable seatpost, a suspension, a gear changing device, and a brake device. In the present embodiment, the additional component BC3 includes a hydraulic brake device. However, the additional component BC3 is not limited to the above devices.

In the present embodiment, the operating device 10 is a right-hand side operating/control device configured to be operated by the rider's right hand to actuate the electric component BC1 and the additional component BC3. However, the structures of the operating device 10 can be applied to a left-hand side operating device.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a steering or a handlebar. Accordingly, these terms, as utilized to describe the operating device 10 or other components, should be interpreted relative to the human-powered vehicle 2 equipped with the operating device 10 as used in an upright riding position on a horizontal surface.

The operating device 10 for the human-powered vehicle 2 comprises a base member 12. The base member 12 is configured to be coupled to the handlebar 4. In the present embodiment, the operating device 10 is configured to be mounted to a drop-down handlebar. However, structures of the operating device 10 can be applied to other operating devices mounted to other type of handlebars such as a flat handlebar, a time trial handlebar, and a bull horn handlebar.

The base member 12 extends in a longitudinal direction D1. The base member 12 includes a first end portion 14 and a second end portion 16. The first end portion 14 is configured to be coupled to the handlebar 4. The second end portion 16 is opposite to the first end portion 14 in the longitudinal direction D1. The base member 12 includes a grip portion 18. The grip portion 18 is provided between the first end portion 14 and the second end portion 16 in the longitudinal direction D1. The second end portion 16 includes a pommel portion 20.

The operating device 10 further comprises a mounting structure 22 configured to couple the first end portion 14 to the handlebar 4. The mounting structure 22 includes a band clamp 24. However, the mounting structure 22 can include other structures which is similar to the band clamp 24 and which is used in a road shifter for mounting to a drop-down handlebar.

The operating device 10 comprises a cover 26. The cover 26 is configured to be detachably attached to the base member 12 to at least partially cover the base member 12. The cover 26 is made of an elastic material such as rubber. A rider sometimes grips the base member 12 (e.g., the grip portion 18) and leans on the base member 12 (e.g., the grip portion 18) through the cover 26 during riding. The cover 26 can be omitted from the operating device 10 if needed and/or desired.

The term "detachable" or "detachably" as used herein, encompasses a configuration in which an element is repeatedly detachable from and attachable to another element without substantial damage.

The operating device 10 for the human-powered vehicle 2 comprises an operating member 28. The operating member 28 is pivotally coupled to the base member 12 about a pivot axis. The pivot axis A1 is provided closer to the second end portion 16 than to the first end portion 14. The operating member 28 includes a proximal end portion 28A and a distal end portion 28B opposite to the proximal end portion 28A. The operating member 28 extends from the proximal end portion 28A to the distal end portion 28B. The proximal end portion 28A is closer to the pivot axis A1 than the distal end portion 28B. The distal end portion 28B is farther from the proximal end portion 28A than the pivot axis A1 in a longitudinal direction of the operating member 28.

In the present embodiment, the distal end portion 28B is the farthest from the proximal end portion 28A in the operating member 28 and constitutes a free end portion of the operating member 28. The distal end portion 28B is provided below the pivot axis A1 and the proximal end portion 28A in a mounting state where the first end portion 14 is coupled to the handlebar 4.

The operating member 28 is pivotable relative to the base member 12 between a rest position P11 and an operated position P12 about the pivot axis A1. The operating device 10 includes a pivot shaft 29 defining the pivot axis A1. The pivot shaft 29 pivotally couples the operating member 28 to the base member 12. The pivot shaft 29 extends along the pivot axis A1. In the present embodiment, the rest position P11 and the operated position P12 are defined by the pivot axis A1 and the distal end portion 28B.

In the present application, the term "rest position" as used herein refers to a position at which a movable part such as the operating member 28 remains stationary in a state where the movable part is not operated by the user. The term "operated position" as used herein refers to a position at which the movable part has been operated by the user to perform the operation of a device such as the additional component BC3.

The operating device 10 comprises at least one switch. The operating device 10 comprises a plurality of switches SW1 and SW2. The switches SW1 and SW2 are mounted to the operating member 28 to be movable relative to the base member 12 along with the operating member 28. However, at least one of the switches SW1 and SW2 can be provided in other positions such as the base member 12.

Figure 2:
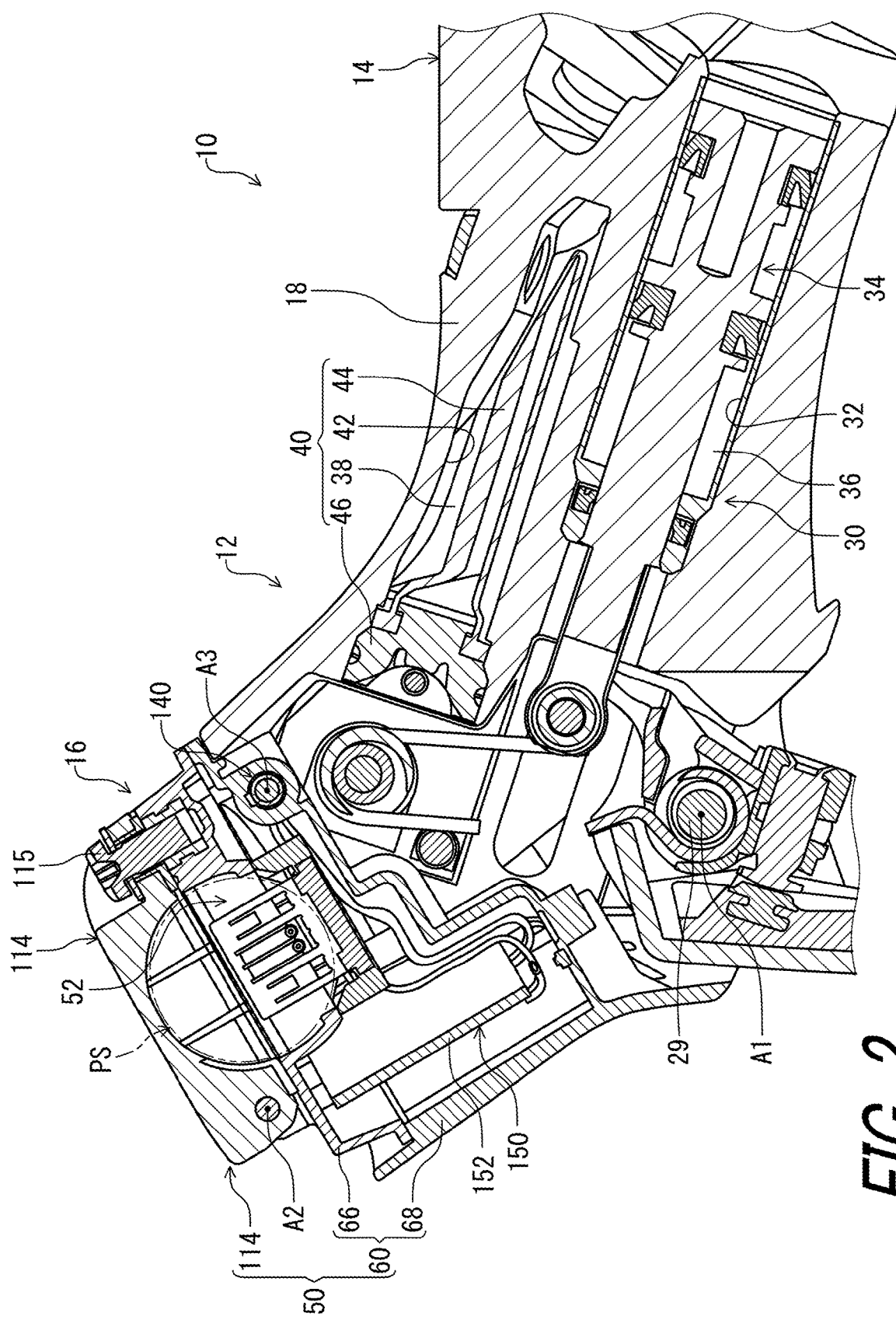
FIG. 2 is a cross-sectional view of the operating device illustrated in FIG. 1.

As seen in FIG. 2, the operating device 10 for the human-powered vehicle 2 comprises a hydraulic unit 30. The hydraulic unit 30 is provided in the base member 12. The hydraulic unit 30 is configured to generate hydraulic pressure in response to a movement of the operating member 28. The hydraulic unit 30 includes a cylinder bore 32 and a piston 34 movably provided in the cylinder bore 32. The hydraulic unit 30 includes a hydraulic chamber 36 and a reservoir chamber 38. The hydraulic chamber 36 is defined by the cylinder bore 32 and the piston 34. The piston 34 is operatively coupled to the operating member 28, The piston 34 is movable relative to the base member 12 in response to a pivotal movement of the operating member 28. However, the operating member 28 can be operatively coupled to another structure instead of the hydraulic unit 30. For example, the operating member 28 can be operatively coupled to a mechanical control cable such as a Bowden cable so as to operate the additional component BC3.

The reservoir chamber 38 is configured to be in communication with the hydraulic chamber 36. The hydraulic unit 30 includes a reservoir 40. The reservoir 40 includes a reservoir recess 42, a diaphragm 44, and a reservoir lid 46. The reservoir recess 42 is provided to the base member 12. The diaphragm 44 is provided in the reservoir recess 42. The reservoir lid 46 is detachably attached to the base member 12 to cover the reservoir recess 42. The reservoir recess 42 and the diaphragm 44 define the reservoir chamber 38.

The base member 12 includes an accommodating structure 50. The accommodating structure 50 is configured to accommodate a power supply PS. The accommodating structure 50 includes a power-supply accommodating space 52 in which the power supply PS is to be provided. In the present embodiment, the accommodating structure 50 is provided to the second end portion 16. However, the accommodating structure 50 can be provided to other portions other than the second end portion 16 in the base member 12.

Figure 3:
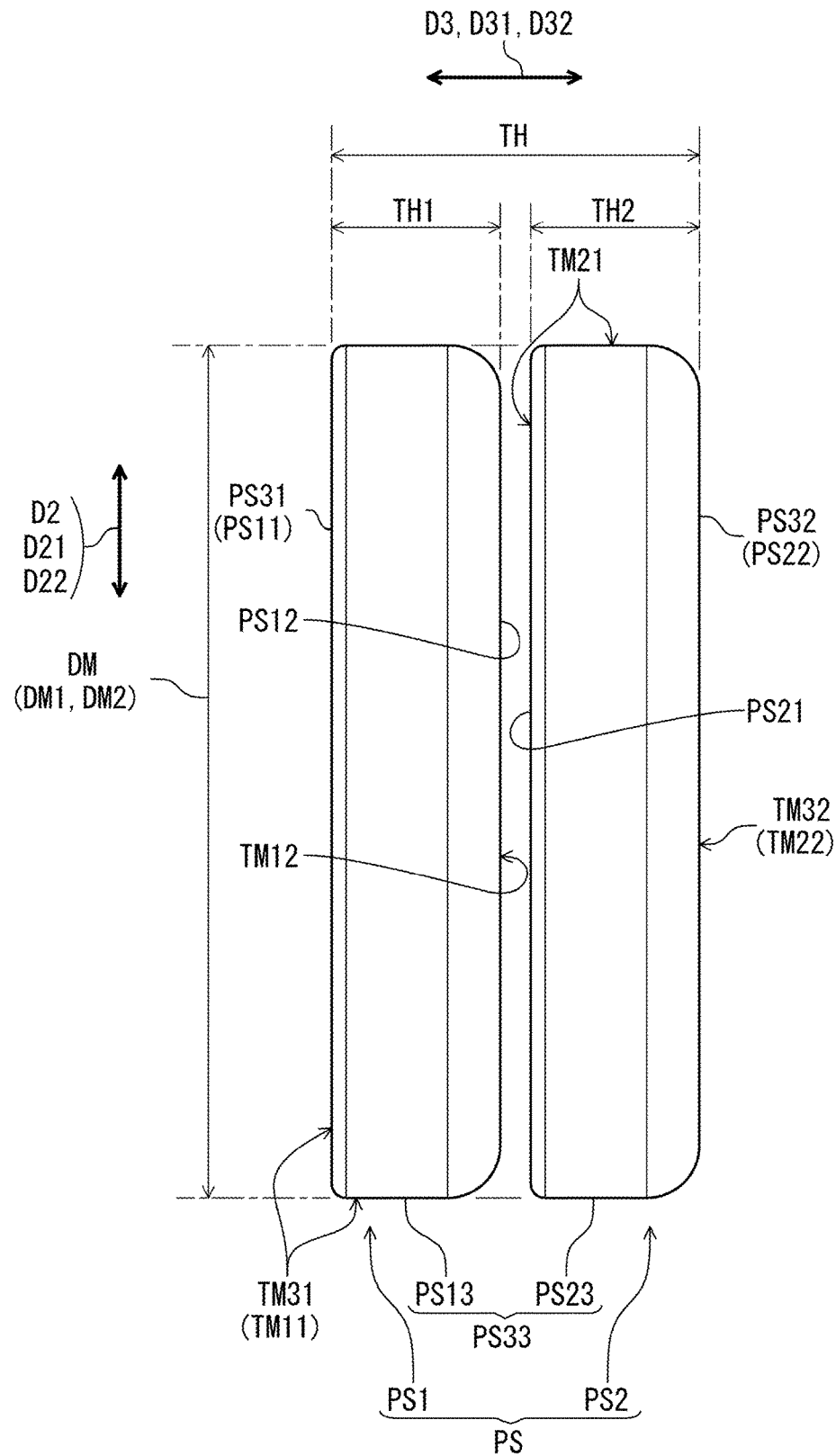
FIG. 3 is a front view of a power supply provided in the operating device illustrated in FIG. 1.
Figure 4:
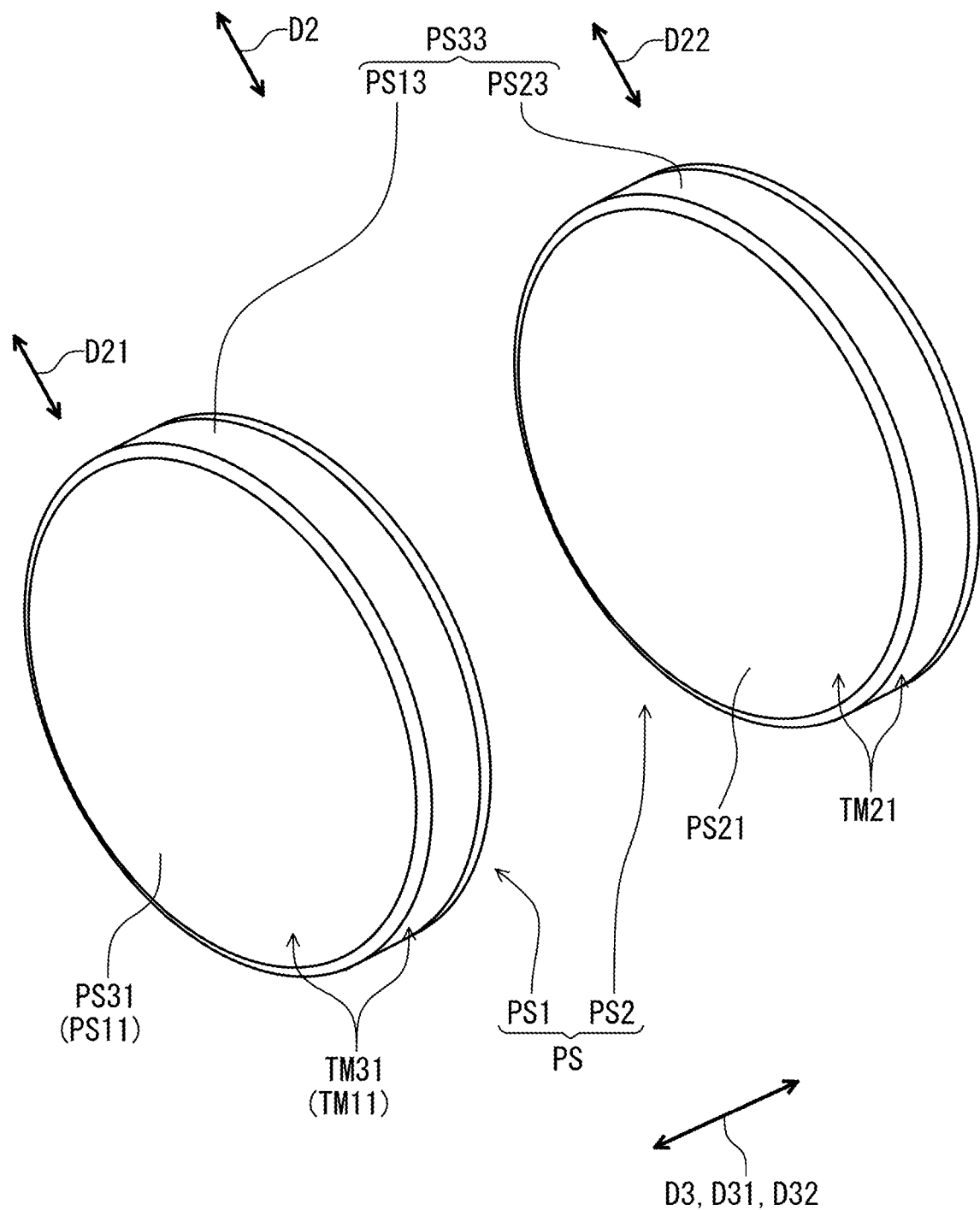
FIG. 4 is a perspective view of the power supply illustrated in FIG. 3.
Figure 5:
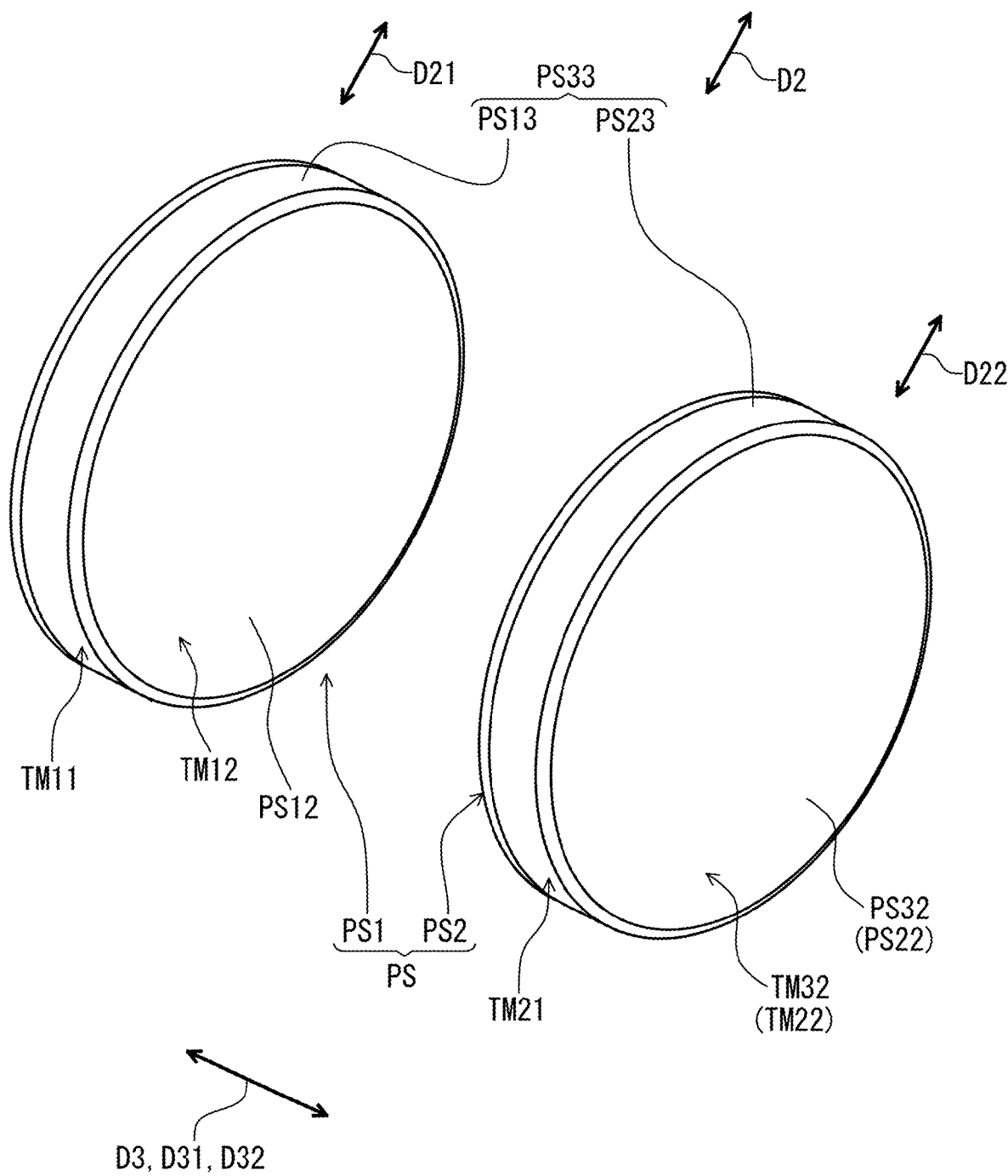
FIG. 5 is another perspective view of the power supply illustrated in FIG. 3.

As seen in FIGS. 3 to 5, the power supply PS defines a radial direction D2. The power supply PS includes a button cell having a columnar shape. The power supply PS has an outer diameter DM defined in the radial direction D2 of the power supply PS. The power supply PS has a thickness TH defined in a thickness direction D3 in a state where the power supply PS is provided in the power-supply accommodating space 52. The thickness direction D3 is different from the radial direction D2. The thickness direction D3 is perpendicular to the radial direction D2. The outer diameter DM of the power supply PS is larger than the thickness TH of the power supply PS. However, the outer diameter DM of the power supply PS can be smaller than or equal to the thickness TH of the power supply PS if needed and/or desired.

The power supply PS includes an end surface PS31, an additional end surface PS32, and an outer peripheral surface PS33. The end surface PS31 has a round shape. The additional end surface PS32 has a round shape. The outer peripheral surface PS33 defines the outer diameter DM. The end surface PS31 faces in the thickness direction D3. The additional end surface PS32 faces in the thickness direction D3. The additional end surface PS32 is provided on a reverse side of the end surface PS31 in the thickness direction D3.

The power supply PS includes a positive terminal TM31 and a negative terminal TM32. The positive terminal TM31 is provided on the end surface PS31 and the outer peripheral surface PS33. The negative terminal TM32 is provided on the additional end surface PS32. However, the shape of the power supply PS is not limited to the above shape.

In the present embodiment, the power supply PS includes a first power supply PS1 and a second power supply PS2. The first power supply PS1 is a separate member from the second power supply PS2. The first power supply PS1 defines a first radial direction D21. The second power supply PS2 defines a second radial direction D22. The first power supply PS1 includes a button cell having a columnar shape. The second power supply PS2 includes a button cell having a columnar shape.

The first power supply PS1 has a first outer diameter DM1 defined in the first radial direction D21 of the first power supply PS1. The first power supply PS1 has a first thickness TH1 defined in a first thickness direction D31. The first thickness direction D31 is different from the first radial direction D21. The first thickness direction D31 is perpendicular to the first radial direction D21. The first outer diameter DM1 of the first power supply PS1 is larger than the first thickness Till of the first power supply PS1. However, the first outer diameter DM1 of the first power supply PS1 can be smaller than or equal to the first thickness TH1 of the first power supply PS1 if needed and/or desired.

As seen in FIGS. 4 and 5, the first power supply PS1 includes a first end surface PS11, a first additional end surface PS12, and a first outer peripheral surface PS13. The first end surface PS11 has a round shape. The first additional end surface PS12 has a round shape. The first outer peripheral surface PS13 defines the first outer diameter DM1. The first end surface PS11 faces in the first thickness direction D31. The first additional end surface PS12 faces in the first thickness direction D31. The first additional end surface PS12 is provided on a reverse side of the first end surface PS11 in the thickness direction D3.

The first power supply PS1 includes a first positive terminal TM11 and a first negative terminal TM12. The first positive terminal TM11 is provided on the first end surface PS11 and the first outer peripheral surface PS13. The first negative terminal TM12 is provided on the first additional end surface PS12.

The second power supply PS2 has a second outer diameter DM2 defined in the second radial direction D22 of the second power supply PS2. The second power supply PS2 has a second thickness TH2 defined in a second thickness direction D32. The second thickness direction D32 is different from the second radial direction D22. The second thickness direction D32 is perpendicular to the second radial direction D22. The second outer diameter DM2 of the second power supply PS2 is larger than the second thickness TH2 of the second power supply PS2. However, the second outer diameter DM2 of the second power supply PS2 can be smaller than or equal to the second thickness TH2 of the second power supply PS2 if needed and/or desired.

The second power supply PS2 includes a second end surface PS21, a second additional end surface PS22, and a second outer peripheral surface PS23. The second end surface PS21 has a round shape. The second additional end surface PS22 has a round shape. The second outer peripheral surface PS23 defines the second outer diameter DM2. The second end surface PS21 faces in the second thickness direction D32. The second additional end surface PS22 faces in the second thickness direction D32. The second additional end surface PS22 is provided on a reverse side of the second end surface PS21 in the second thickness direction D32.

The second power supply PS2 includes a second positive terminal TM21 and a second negative terminal TM22. The second positive terminal TM21 is provided on the second end surface PS21 and the second outer peripheral surface PS23. The second negative terminal TM22 is provided on the second additional end surface PS22.

In the present embodiment, the end surface PS31 of the power supply PS includes the first end surface PS11 of the first power supply PS1. The additional end surface PS32 of the power supply PS includes the second additional end surface PS22 of the second power supply PS2. The outer peripheral surface PS33 of the power supply PS includes the first outer peripheral surface PS13 of the first power supply PS1 and the second outer peripheral surface PS23 of the second power supply PS2. However, the relationships among the end surface PS31, the additional end surface PS32, the outer peripheral surface PS33, the first end surface PS11, the first additional end surface PS12, the first outer peripheral surface PS13, the second end surface PS21, the second additional end surface PS22, and the second outer peripheral surface PS23 are not limited to the above relationships.

In the present embodiment, the first radial direction D21 is defined along the radial direction D2 of the power supply PS in the state where the power supply PS is provided in the power-supply accommodating space 52. The second radial direction D22 is defined along the radial direction D2 of the power supply PS in the state where the power supply PS is provided in the power-supply accommodating space 52. The first radial direction D21 is parallel to the radial direction D2 of the power supply PS in the state where the power supply PS is provided in the power-supply accommodating space 52. The second radial direction D22 is parallel to the radial direction D2 of the power supply PS in the state where the power supply PS is provided in the power-supply accommodating space 52. However, the relationships among the radial direction D2, the first radial direction D21, and the second radial direction D22 are not limited to the above relationships.

In the present embodiment, the first thickness direction D31 is defined along the thickness direction D3 of the power supply PS in the state where the power supply PS is provided in the power-supply accommodating space 52. The second thickness direction D32 is defined along the thickness direction D3 of the power supply PS in the state where the power supply PS is provided in the power-supply accommodating space 52. The first thickness direction D31 is parallel to the thickness direction D3 of the power supply PS in the state where the power supply PS is provided in the power-supply accommodating space 52. The second thickness direction D32 is parallel to the thickness direction D3 of the power supply PS in the state where the power supply PS is provided in the power-supply accommodating space 52. However, the relationships among the thickness direction D3, the first thickness direction D31, and the second thickness direction D32 are not limited to the above relationships.

In the present embodiment, the first outer diameter DM1 and the second outer diameter DM2 are equal to the outer diameter DM of the power supply PS in the state where the power supply PS is provided in the power-supply accommodating space 52. However, at least one of the first outer diameter DM1 and the second outer diameter DM2 can be different from the outer diameter DM of the power supply PS if needed and/or desired.

In the present embodiment, the first thickness TH1 and the second thickness TH2 is smaller than the thickness TH of the power supply PS in the state where the power supply PS is provided in the power-supply accommodating space 52. The first thickness TH1 is equal to the second thickness TH2. A total of the first thickness TH1 and the second thickness TH2 is smaller than the thickness TH of the power supply PS in the state where the power supply PS is provided in the power-supply accommodating space 52. However, the relationships among the thickness TH, the first thickness TH1, and the second thickness TH2 are not limited to the above relationships.

In the present embodiment, the positive terminal TM31 of the power supply PS includes the first positive terminal TM11 of the first power supply PS1 in the state where the power supply PS is provided in the power-supply accommodating space 52. The negative terminal TM32 of the power supply PS includes the second negative terminal TM22 of the second power supply PS2 in the state where the power supply PS is provided in the power-supply accommodating space 52. However, the relationships among the positive terminal TM31, the negative terminal TM32, the first positive terminal TM11, and the second negative terminal TM22 are not limited to the above relationships.

In the present embodiment, the power supply PS includes the first power supply PS1 and the second power supply PS2. However, the power supply PS can be integrally provided as a one-piece unitary member if needed and/or desired.

Figure 6:
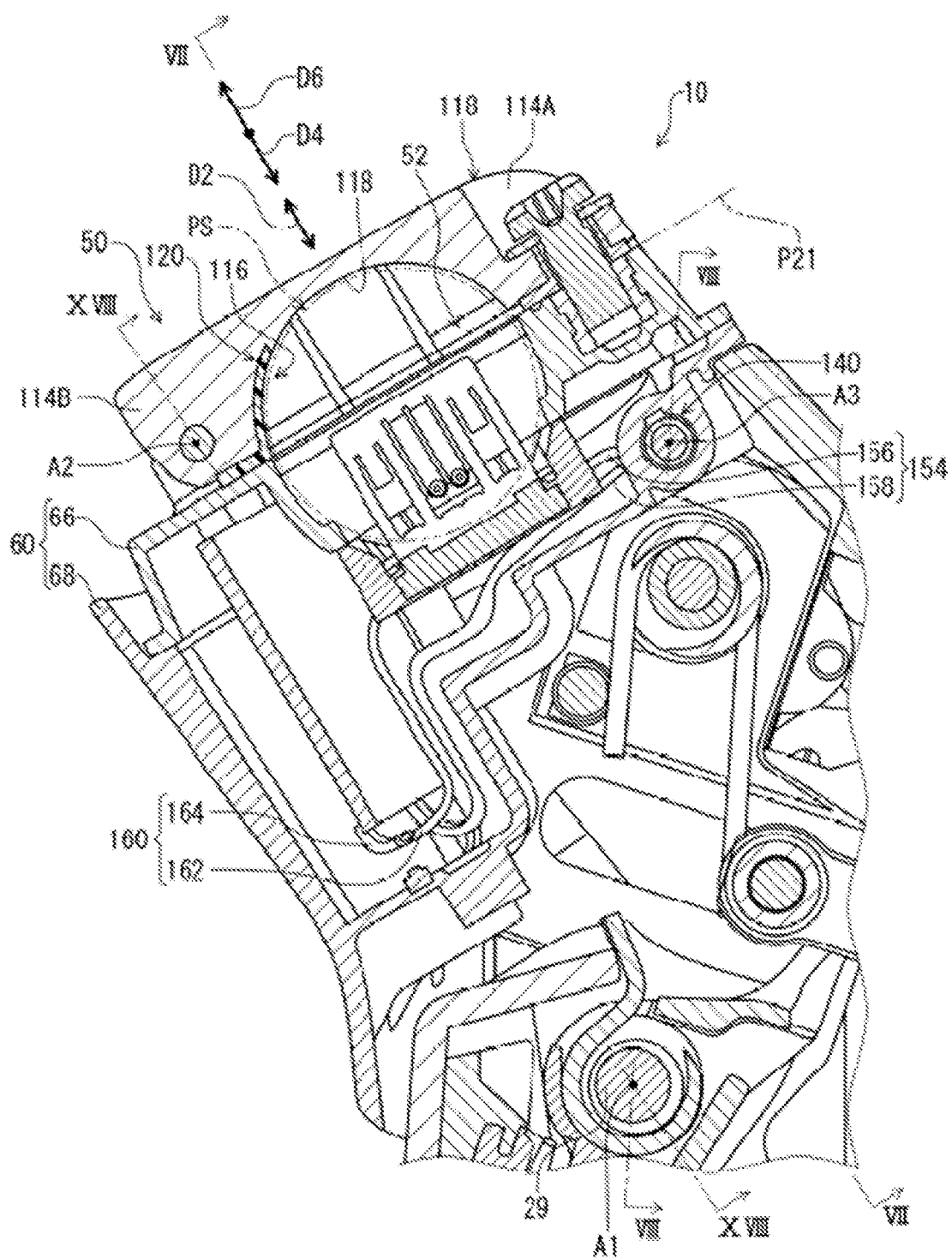
FIG. 6 is a partial cross-sectional view of the operating device taken along line VI-VI of FIG. 7.

As seen in FIG. 6, the accommodating structure 50 includes the power-supply accommodating space 52 into which the power supply PS is to be inserted along the radial direction D2 and in an insertion direction D4 which is non-parallel to the pivot axis A1. In the present embodiment, the insertion direction D4 is defined along the radial direction D2 of the power supply PS. The insertion direction D4 is parallel to the radial direction D2 of the power supply PS. The power supply PS is removed from the power-supply accommodating space 52 in a removal direction D6. The removal direction D6 is an opposite direction of the insertion direction D4. The removal direction D6 is defined along the radial direction D2 of the power supply PS. The removal direction D6 is parallel to the radial direction D2 of the power supply PS. However, at least one of the insertion direction D4 and the removal direction D6 can be non-parallel to the radial direction D2 of the power supply PS if needed and/or desired.

In the present embodiment, the insertion direction D4 faces toward the pivot axis A1. The accommodating structure 50 includes the power-supply accommodating space 52 into which the power supply PS is to be inserted along the radial direction D2 toward the pivot axis A1. However, the insertion direction D4 can be defined to not face toward the pivot axis A1 if needed and/or desired.

Figure 7:
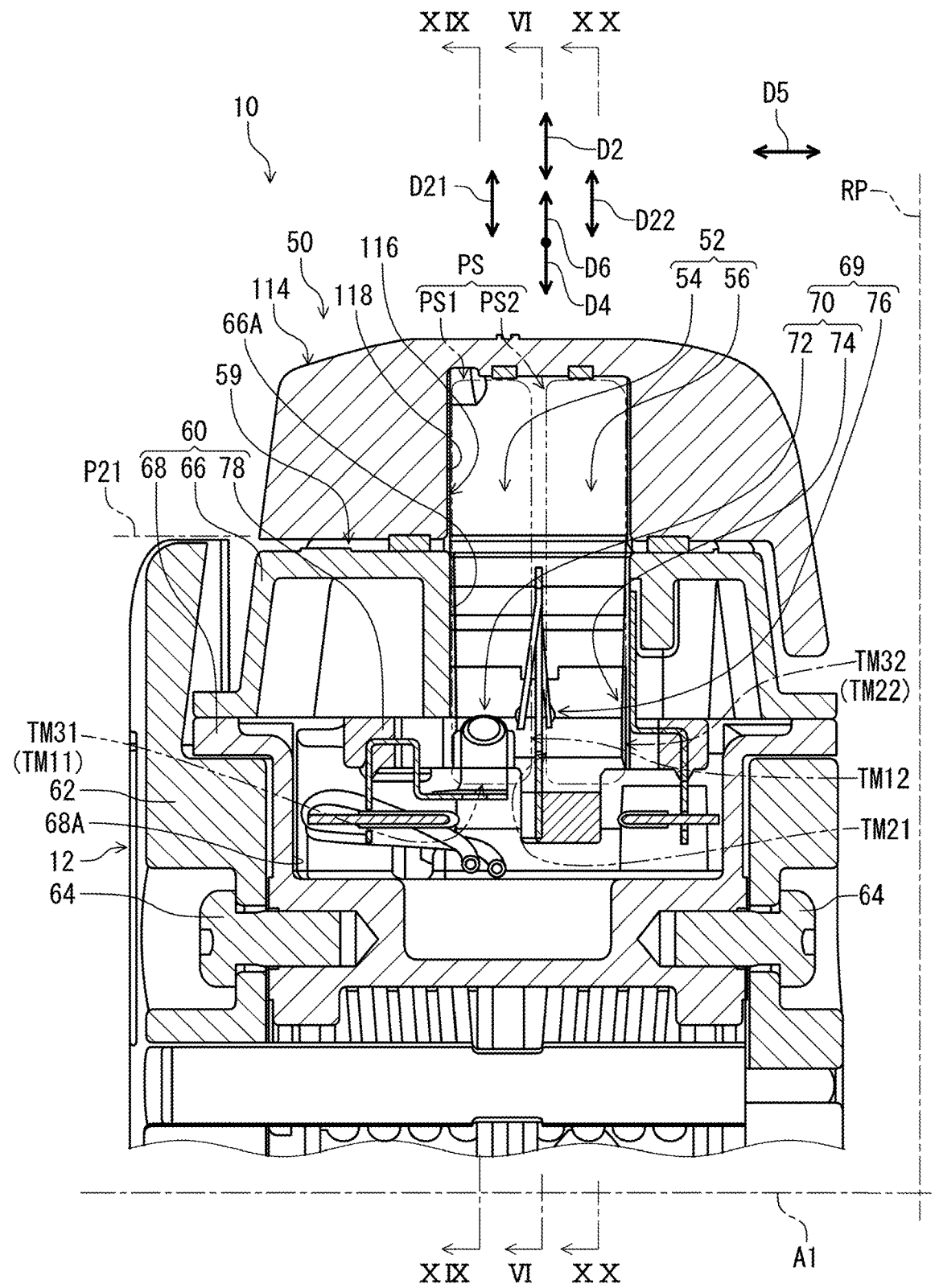
FIG. 7 is a partial cross-sectional view of the operating device taken along line VII-VII of FIG. 6.

As seen in FIG. 7, the power-supply accommodating space 52 includes a first power-supply accommodating space 54 in which the first power supply PS1 is to be provided. The power-supply accommodating space 52 includes a second power-supply accommodating space 56 in which the second power supply PS2 is to be provided. However, the first power supply PS1 can be integrally provided with the second power supply PS2 as a one-piece unitary member if needed and/or desired. The power-supply accommodating space 52 can be integrally provided as a single space if needed and/or desired. The first power-supply accommodating space 54 can be integrally provided with the second power-supply accommodating space 56 as a single space if needed and/or desired.

The insertion direction D4 is defined along the first radial direction D21 of the first power supply PS1. The insertion direction D4 is defined along the second radial direction D22 of the second power supply PS2. The insertion direction D4 is parallel to the first radial direction D21 of the first power supply PS1. The insertion direction D4 is parallel to the second radial direction D22 of the second power supply PS2. However, the positional relationships among the insertion direction D4, the radial direction D2, the first radial direction D21, and the second radial direction D22 are not limited to the above positional relationships.

The power-supply accommodating space 52 includes the first power-supply accommodating space 54 into which the first power supply PS1 is to be inserted. The power-supply accommodating space 52 includes the first power-supply accommodating space 54 into which the first power supply PS1 is to be inserted along the first radial direction D21 and the insertion direction D4.

The power-supply accommodating space 52 includes the second power-supply accommodating space 56 into which the second power supply PS2 is to be inserted. The power-supply accommodating space 52 includes the second power-supply accommodating space 56 into which the second power supply PS2 is to be inserted along the second radial direction D22 and the insertion direction D4.

Figure 8:
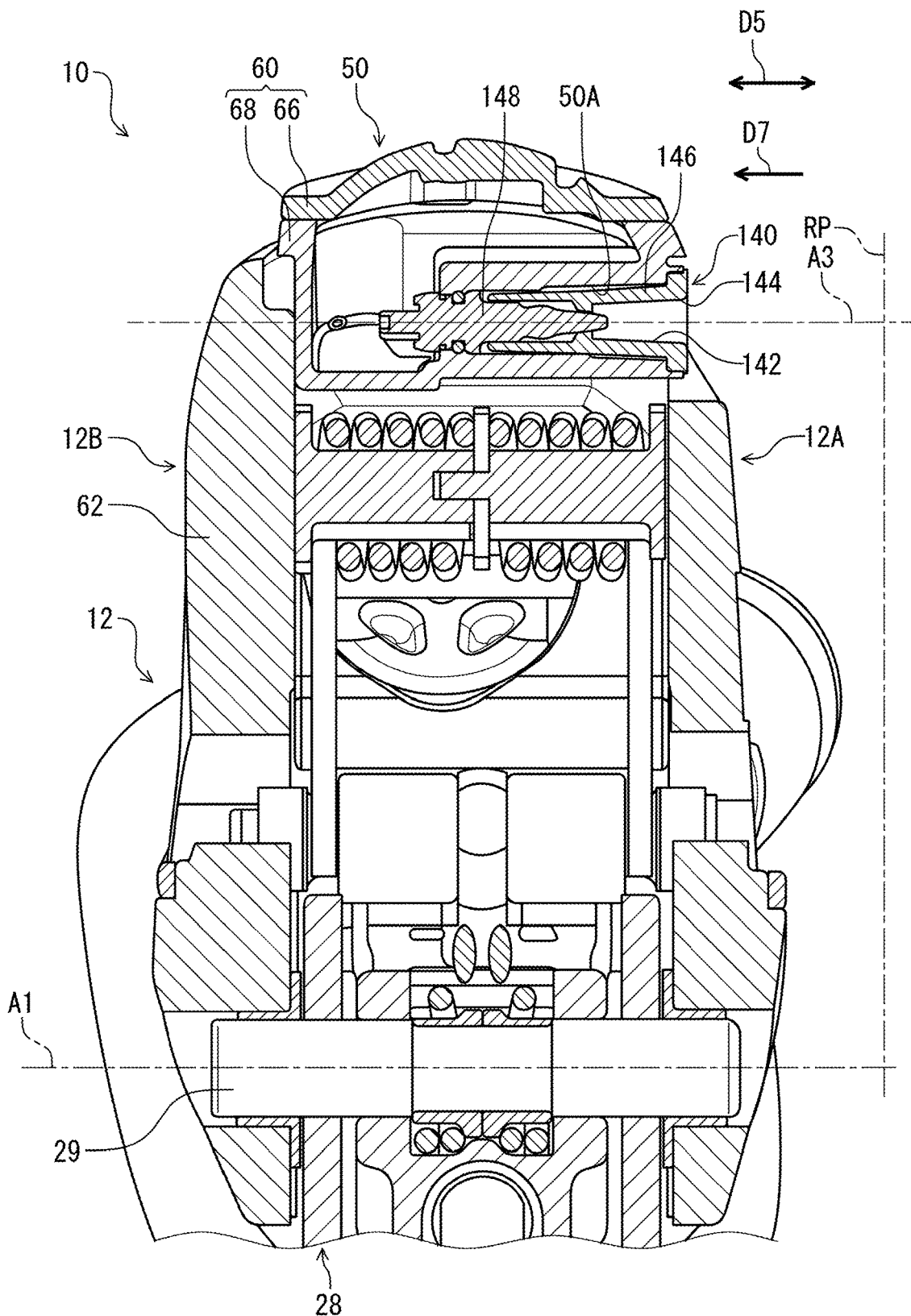
FIG. 8 is a partial cross-sectional view of the operating device taken along line VIII-VIII of FIG. 6.

As seen in FIG. 8, a reference plane RP intersects with the pivot axis A1. The reference plane RP is perpendicular to the pivot axis A1. The reference plane RP is defined to be provided outside the operating device 10 in an axial direction D5 with respect to the pivot axis A1.

As seen in FIG. 7, the insertion direction D4 is defined along the reference plane RP. The insertion direction D4 is parallel to the reference plane RP of the operating device 10. However, the insertion direction D4 can be defined to be non-parallel to the reference plane RP if needed and/or desired. The insertion direction D4 can be inclined relative to the reference plane RP.

The accommodating structure 50 includes an accommodating body 59. The accommodating body 59 includes an accommodating base 60. Namely, the accommodating structure 50 includes the accommodating base 60. The power-supply accommodating space 52 is provided on the accommodating base 60. The first power-supply accommodating space 54 is provided on the accommodating base 60. The second power-supply accommodating space 56 is provided on the accommodating base 60.

In the present embodiment, the base member 12 includes a base body 62. The accommodating base 60 is secured to the base body 62 with fasteners 64. The accommodating base 60 is a separate member from the base body 62. However, the accommodating base 60 can be integrally provided with the base body 62 as a one-piece unitary member if needed and/or desired.

The accommodating base 60 includes a first accommodating base 66 and a second accommodating base 68. The first accommodating base 66 is a separate member from the second accommodating base 68. The first accommodating base 66 is attached to the second accommodating base 68 with a fastener (e.g., a screw) and/or a bonding structure (e.g., an adhesive agent). However, the first accommodating base 66 can be integrally provided with the second accommodating base 68 as a one-piece unitary member if needed and/or desired.

The first accommodating base 66 includes a first internal space 66A. The power-supply accommodating space 52 at least partially includes the first internal space 66A. The second accommodating base 68 includes a second internal space 68A. The second internal space 68A is configured to be in communication with the first internal space 66A. The power-supply accommodating space 52 includes at least part of the first internal space 66A and/or at least part of the second internal space 68A.

The accommodating structure 50 includes a terminal structure 69. The terminal structure 69 is configured to be in contact with the power supply PS in a state where the power supply PS is in the power-supply accommodating space 52. The terminal structure 69 includes a terminal member 70. Namely, the accommodating structure 50 includes the terminal member 70. The terminal member 70 is configured to be attached to the accommodating base 60. The terminal member 70 is configured to be in contact with the power supply PS in a state where the power supply PS is in the power-supply accommodating space 52. The terminal member 70 is made of a conductive material. The terminal member 70 includes a first terminal 72 and a second terminal 74. The first terminal 72 is a separate member from the second terminal 74. The first terminal 72 is spaced apart from the second terminal 74.

The first terminal 72 is configured to be attached to the accommodating base 60. The first terminal 72 is configured to be in contact with the first power supply PS1 in a state where the first power supply PS1 is in the first power-supply accommodating space 54. The second terminal 74 is configured to be attached to the accommodating base 60. The second terminal 74 is configured to be in contact with the second power supply PS2 in a state where the second power supply PS2 is in the second power-supply accommodating space 56.

In the present embodiment, the first terminal 72 is configured to be in contact with the positive terminal TM31 of the power supply PS in the state where the power supply PS is in the power-supply accommodating space 52. The first terminal 72 is configured to be in contact with the first positive terminal TM11 of the first power supply PS1 in the state where the first power supply PS1 is in the first power-supply accommodating space 54.

The second terminal 74 is configured to be in contact with the negative terminal TM32 of the power supply PS in the state where the power supply PS is in the power-supply accommodating space 52. The second terminal 74 is configured to be in contact with the second negative terminal TM22 of the second power supply PS2 in the state where the second power supply PS2 is in the second power-supply accommodating space 56.

The first power-supply accommodating space 54 is adjacent to the second power-supply accommodating space 56 without additional space between the first power-supply accommodating space 54 and the second power-supply accommodating space 56. In the present embodiment, the terminal structure 69 includes an intermediate terminal 76. Namely, the accommodating structure 50 includes the intermediate terminal 76. The intermediate terminal 76 is provided between the first power-supply accommodating space 54 and the second power-supply accommodating space 56. The intermediate terminal 76 is attached to the accommodating base 60. The intermediate terminal 76 is made of a conductive material.

The intermediate terminal 76 is provided between the first power supply PS1 and the second power supply PS2 in the state where the first power supply PS1 is provided in the first power-supply accommodating space 54 and the state where the second power supply PS2 is provided in the second power-supply accommodating space 56. The inter mediate terminal is configured to be in contact with the first negative terminal TM12 and the second positive terminal TM21 in the state where the first power supply PS1 is provided in the first power-supply accommodating space 54 and the state where the second power supply PS2 is provided in the second power-supply accommodating space 56. Thus, the first power supply PS1 and the second power supply PS2 are electrically connected with each other in series in the state where the first power supply PS1 is provided in the first power-supply accommodating space 54 and the state where the second power supply PS2 is provided in the second power-supply accommodating space 56. However, the intermediate terminal 76 can be omitted from the accommodating structure 50 if needed and/or desired.

The accommodating base 60 includes a terminal support 78. The terminal support 78 is attached to at least one of the first accommodating base 66 and the second accommodating base 68.

Figure 9:
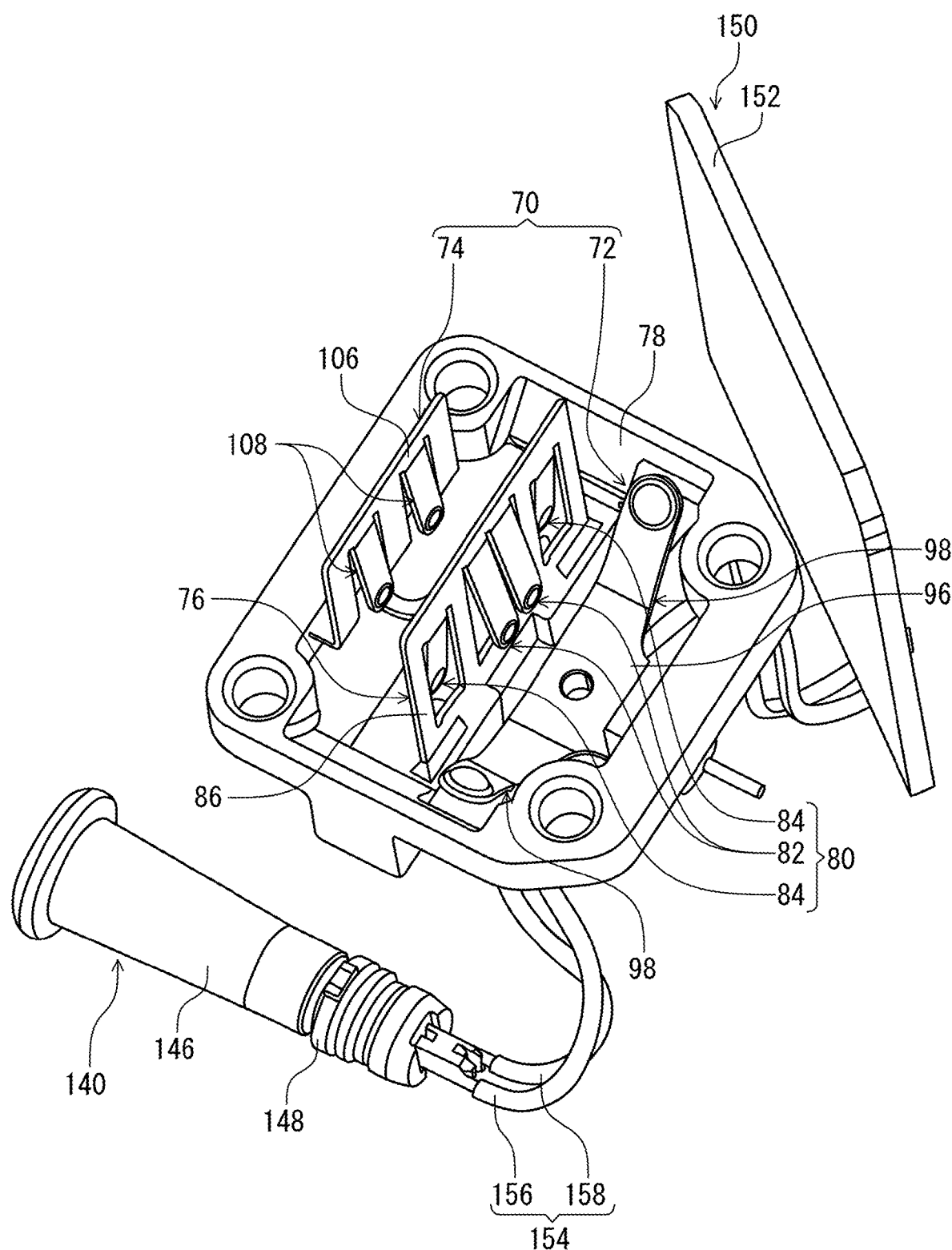
FIG. 9 is a perspective view of an internal structure of the operating device illustrated in FIG. 1.

As seen in FIG. 9, the terminal member 70 and the intermediate terminal 76 are attached to the terminal support 78. The first terminal 72, the second terminal 74, and the intermediate terminal 76 are attached to the terminal support 78.

The intermediate terminal 76 includes a biasing member 80. The biasing member 80 is configured to be in contact with at least one of the first power supply PS1 and the second power supply PS2. The biasing member 80 is configured to bias the at least one of the first power supply PS1 and the second power supply PS2 such that the first power supply PS1 and the second power supply PS2 are separated from each other in a state where the first power supply PS1 and the second power supply PS2 are provided in the first power-supply accommodating space 54 and the second power-supply accommodating space 56.

In the present embodiment, the biasing member 80 includes a first biasing member 82 and a second biasing member 84. The first biasing member 82 is configured to bias the first power supply PS1 away from the second power supply PS2 in the state where the first power supply PS1 and the second power supply PS2 are provided in the first power-supply accommodating space 54 and the second power-supply accommodating space 56. The second biasing member 84 is configured to bias the second power supply PS2 away from the first power supply PS1 in the state where the first power supply PS1 and the second power supply PS2 are provided in the first power-supply accommodating space 54 and the second power-supply accommodating space 56.

The biasing member 80 includes a plurality of first biasing members 82 and a plurality of second biasing members 84. The first biasing members 82 are adjacent to each other. The first biasing members 82 are provided between the second biasing members 84. However, the positional relationships among the first biasing members 82 and the second biasing members 84 are not limited to the above relationships. A total number of the first biasing members 82 is not limited to two. A total number of the second biasing members 84 is not limited to two. At least one of the first biasing member 82 and the second biasing member 84 can be omitted from the intermediate terminal 76 if needed and/or desired. The biasing member 80 can be omitted from the intermediate terminal 76.

The intermediate terminal 76 includes an intermediate base 86. The intermediate base 86 is attached to the terminal support 78. The biasing member 80 is coupled to the intermediate base 86 to be elastically deformable. The first biasing member 82 is coupled to the intermediate base 86 to be elastically deformable. The second biasing member 84 is coupled to the intermediate base 86 to be elastically deformable. In the present embodiment, the biasing member 80 is integrally provided with the intermediate base 86 as a one-piece unitary member. However, the biasing member 80 can be a separate member from the intermediate base 86 if needed and/or desired.

Figure 10:
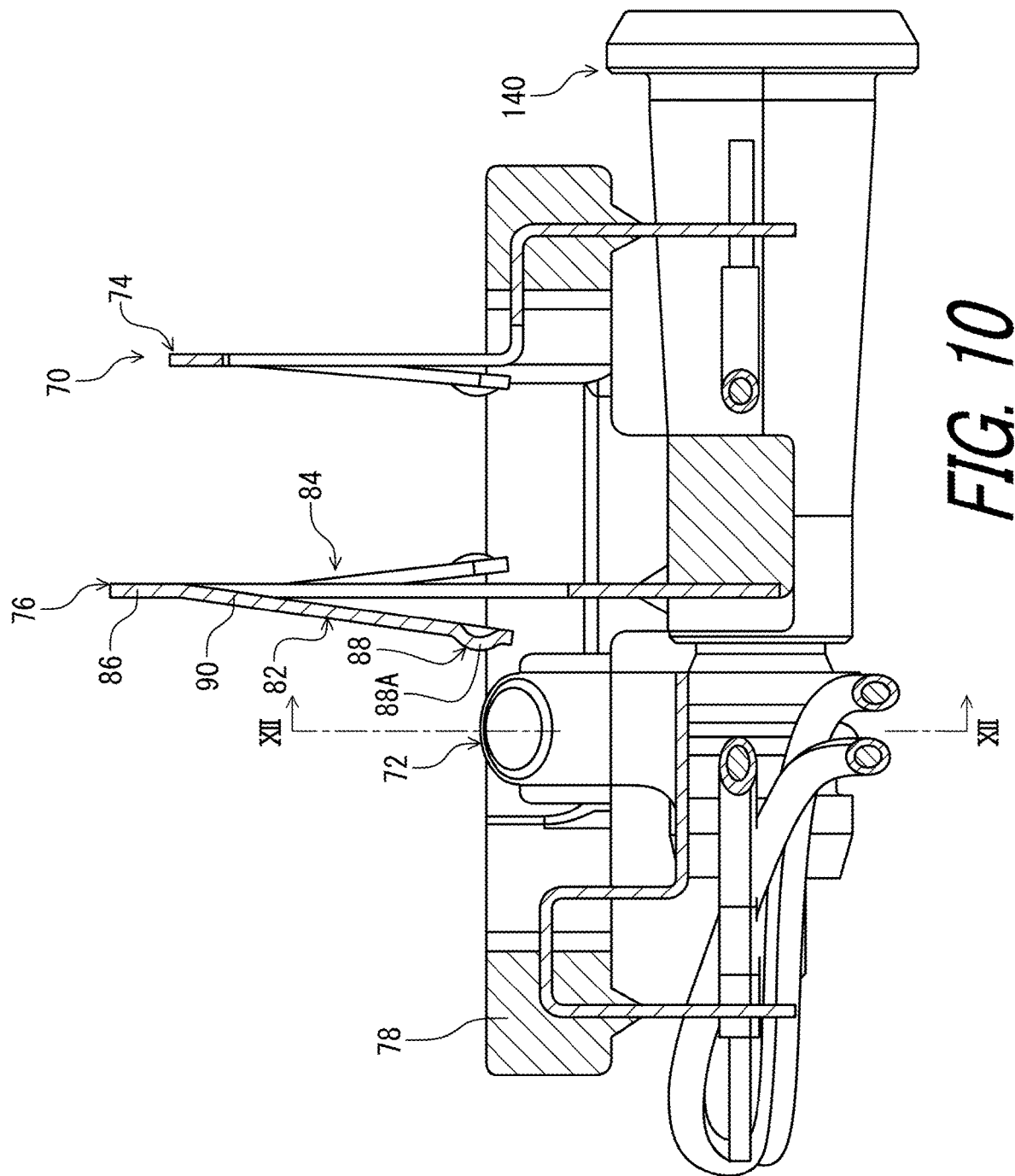
FIG. 10 is a cross-sectional view of the internal structure taken along line X-X of FIG. 12.

As seen in FIG. 10, the first biasing member 82 includes a first contact 88 configured to be in contact with the first power supply PS1 in the state where the first power supply PS1 is in the first power-supply accommodating space 54. The first contact 88 includes a first curved member 88A configured to be in contact with the first power supply PS1. The first biasing member 82 includes a first biasing body 90. The first biasing body 90 extends from the intermediate base 86. The first contact 88 is provided at a longitudinal end of the first biasing body 90. The shape of the first biasing member 82 is not limited to the shape illustrated in FIG. 10.

Figure 11:
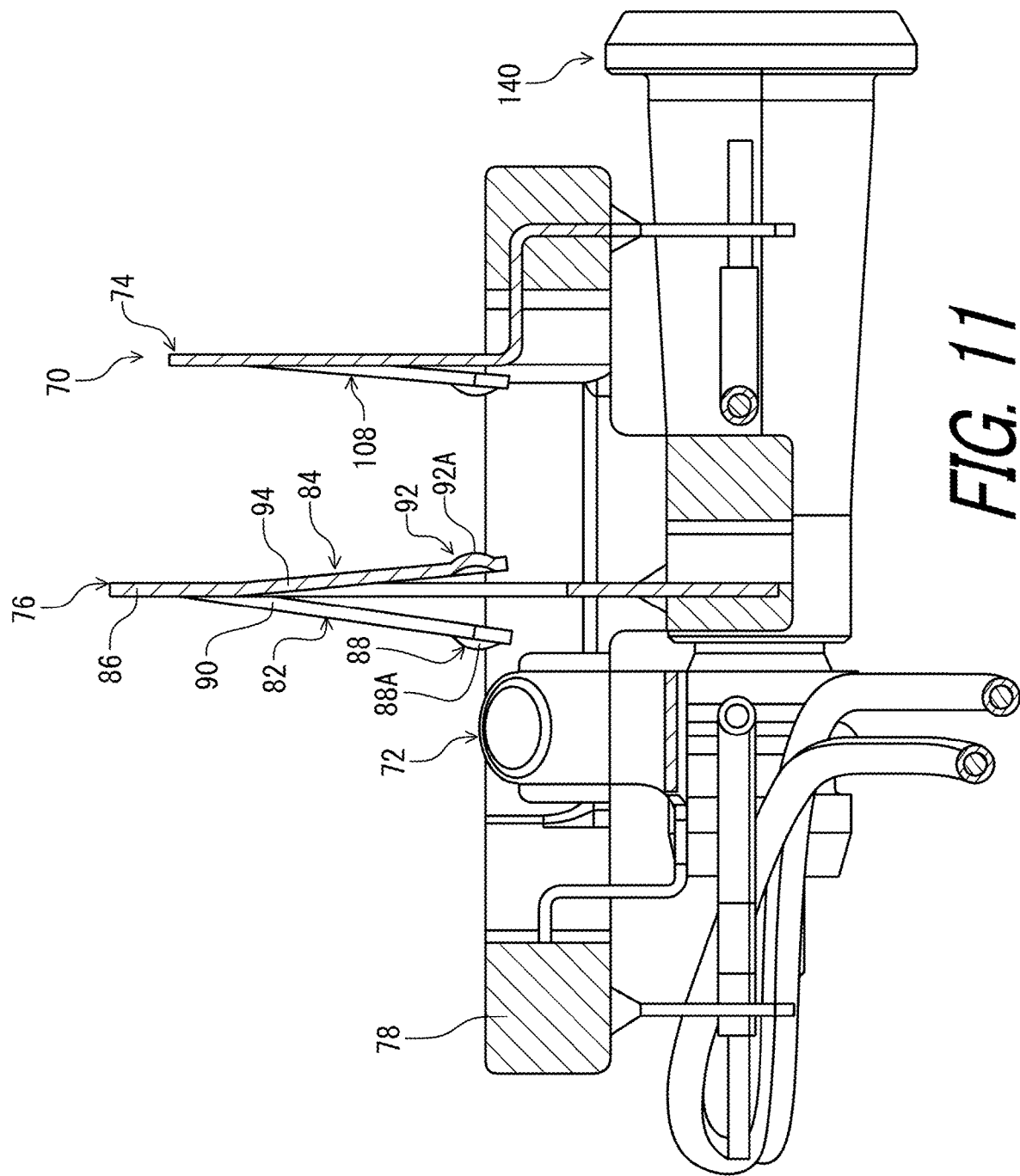
FIG. 11 is another cross-sectional view of the internal structure taken along line XI-XI of FIG. 12.

As seen in FIG. 11, the second biasing member 84 includes a second contact 92 configured to be in contact with the second power supply PS2 in a state where the second power supply PS2 is in the second power-supply accommodating space 56. The second contact 92 is spaced apart from the first contact 88. The second contact 92 includes a second curved member 92A configured to be in contact with the second power supply PS2. The second biasing member 84 includes a second biasing body 94. The second biasing body 94 extends from the intermediate base 86. The second contact 92 is provided at a longitudinal end of the second biasing body 94. The shape of the second biasing member 84 is not limited to the shape illustrated in FIG. 11.

Figure 12:
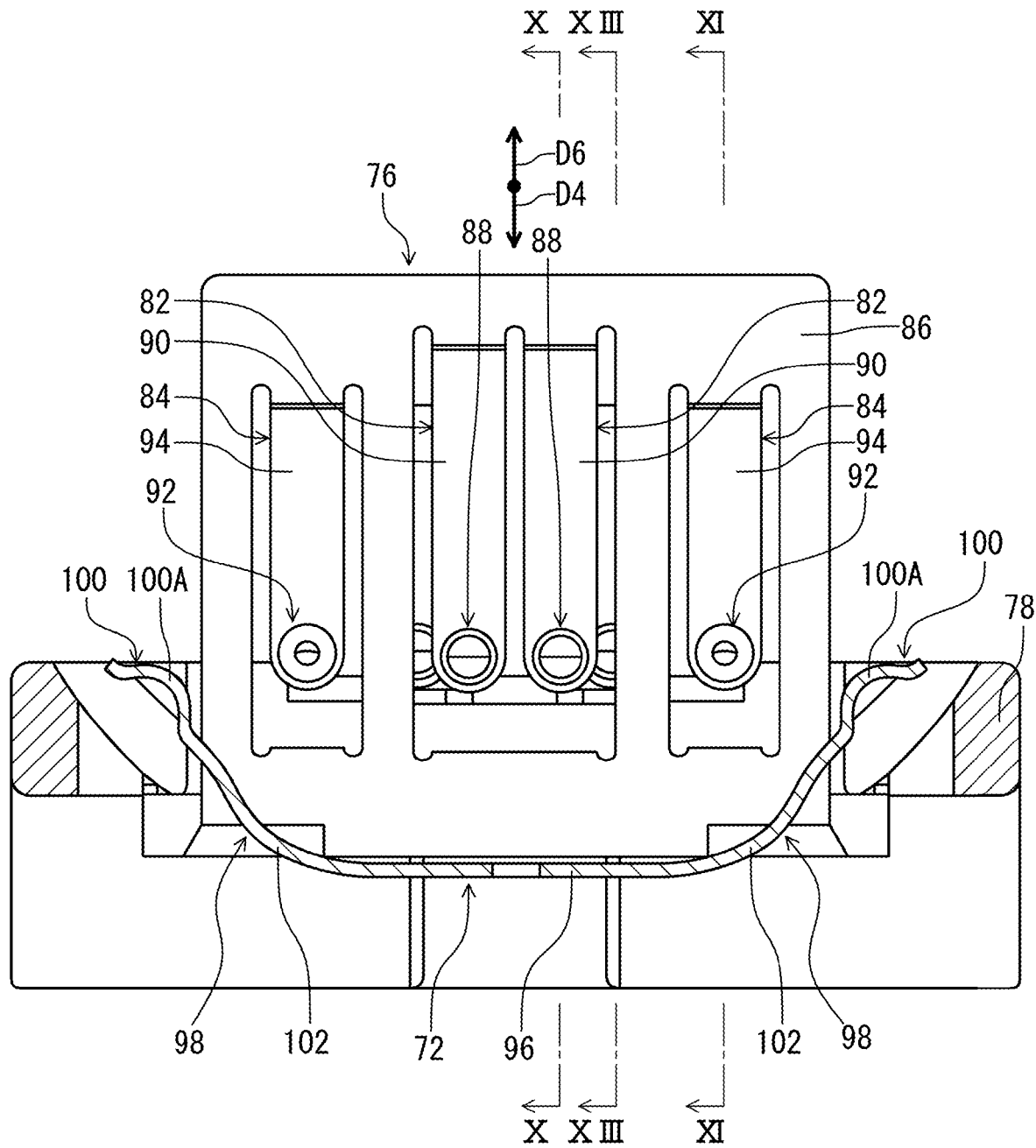
FIG. 12 is another cross-sectional view of the internal structure taken along line XII-XII of FIG. 10.

As seen in FIG. 12, the first terminal 72 includes a first terminal base 96 and a plurality of first biasing parts 98. The first biasing part 98 is configured to be in contact with the first power supply PS1. The first biasing part 98 is configured to bias the first power supply PS1 in the removal direction D6 in the state where the first power supply PS1 is provided in the first power-supply accommodating space 54. The first biasing part 98 is coupled to the first terminal base 96 to be elastically deformable.

The first biasing part 98 includes a first contact 100 configured to be in contact with the first power supply PS1 in the state where the first power supply PS1 is in the first power-supply accommodating space 54. The first contact 100 includes a first curved member 100A configured to be in contact with the first power supply PS1. The first biasing part 98 includes a first biasing body 102. The first biasing body 102 extends from the first terminal base 96. The first contact 100 is provided at a longitudinal end of the first biasing body 102. The shape of the first biasing part 98 is not limited to the shape illustrated in FIG. 12.

Figure 13:
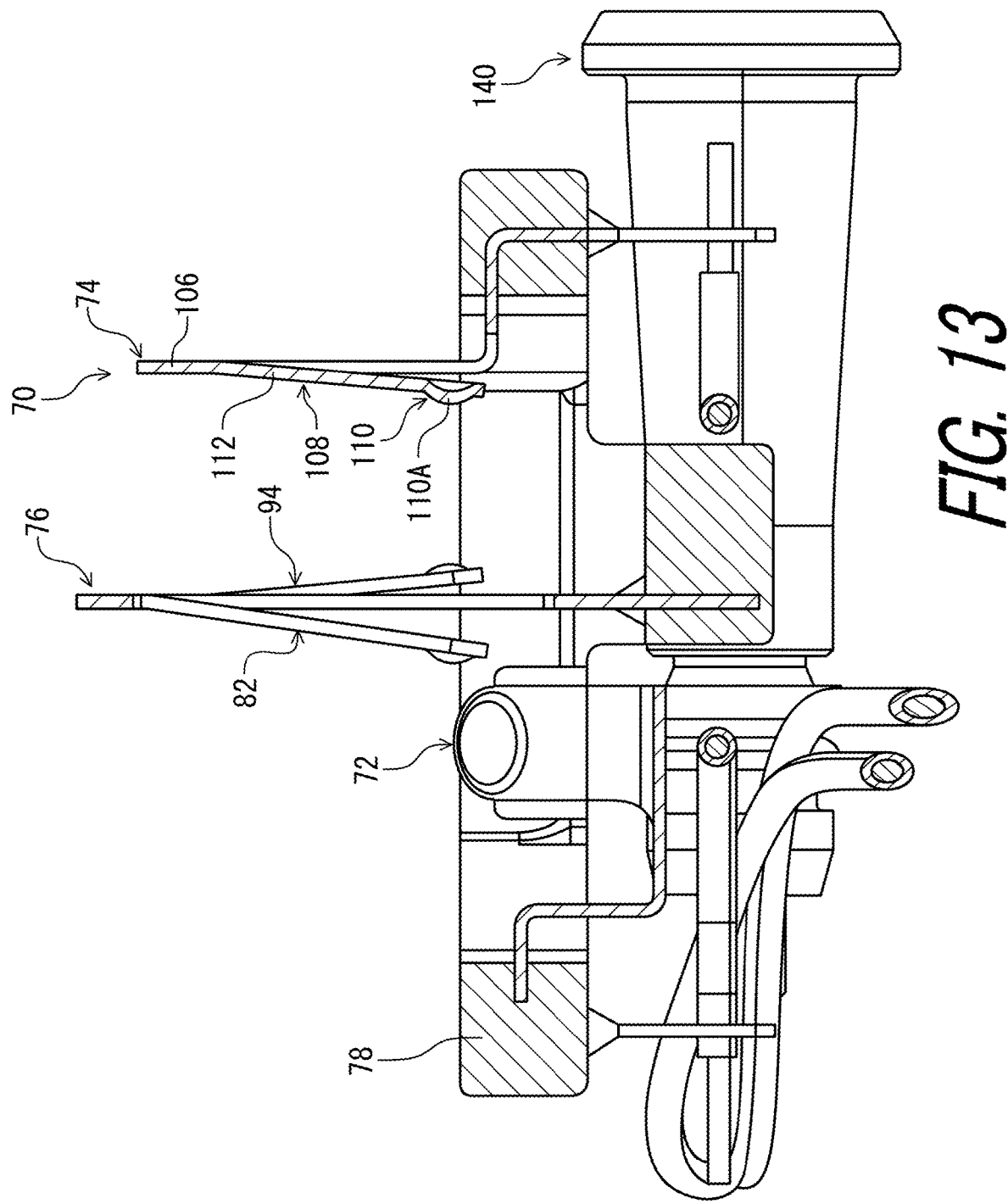
FIG. 13 is another cross-sectional view of the internal structure taken along line XIII-XIII of FIG. 12.

As seen in FIG. 13, the second terminal 74 includes a second terminal base 106 and a plurality of second biasing parts 108. The second biasing part 108 is configured to be in contact with the second power supply PS2. The second biasing part 108 is configured to bias the second power supply PS2 in the removal direction D6 in the state where the second power supply PS2 is provided in the second power-supply accommodating space 56. The second biasing part 108 is coupled to the second terminal base 106 to be elastically deformable.

The second biasing part 108 includes a second contact 110 configured to be in contact with the second power supply PS2 in the state where the second power supply PS2 is in the second power-supply accommodating space 56. The second contact 110 includes a second curved member 110A configured to be in contact with the second power supply PS2. The second biasing part 108 includes a second biasing body 112. The second biasing body 112 extends from the second terminal base 106. The second contact 110 is provided at a longitudinal end of the second biasing body 112. The shape of the second biasing part 108 is not limited to the shape illustrated in FIG. 13.

Figure 14:
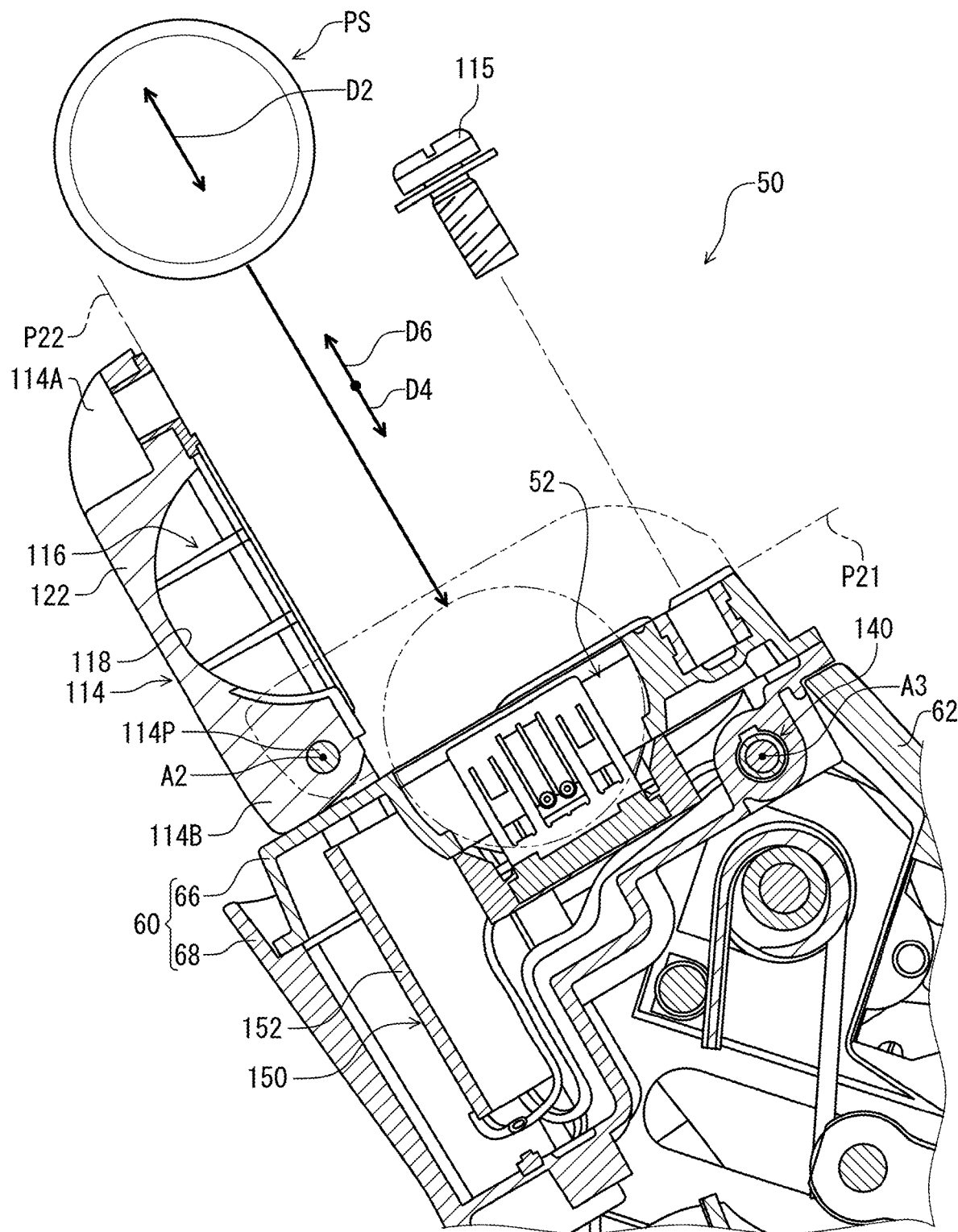
FIG. 14 is a partial cross-sectional view of the operating device illustrated in FIG. 1 (open position) taken along line VI-VI of FIG. 7 (open position).

As seen in FIG. 14, the accommodating structure 50 includes a lid 114. The lid 114 is pivotally coupled to the accommodating base 60 about a lid pivot axis A2. The pivot pin 114P pivotally couples the lid 114 to the accommodating base 60 about the lid pivot axis A2. The lid 114 is pivotable relative to the accommodating base 60 about the lid pivot axis A2 between a closed position P21 and an open position P22. The lid 114 covers the power-supply accommodating space 52 in a closed state where the lid 114 is in the closed position P21. The power-supply accommodating space 52 is open to allow the power supply PS to be inserted into the power-supply accommodating space 52 and to be removed from the power-supply accommodating space 52 in an open state where the lid 114 is in the open position P22. The accommodating structure 50 includes a lid fastener 115. The lid fastener 115 is configured to secure the lid 114 to the accommodating base 60. The accommodating structure 50 includes a pivot pin 114P.

The lid 114 includes a first lid end 114A and a second lid end 114B opposite to the first lid end 114A. The second lid end 114B is pivotally coupled to the accommodating base 60 about the lid pivot axis A2. The second lid end 114B is closer to the pivot axis A1 than the first lid end 114A in the open state where the lid 114 is in the open position P22. As seen in FIG. 1, the first lid end 114A is closer to the first end portion 14 of the base member 12 than the second lid end 114B in the closed state where the lid 114 is in the closed position P21. However, the positional relationships among the pivot axis A1, the first lid end 114A, the second lid end 114B, and the lid pivot axis A2 are not limited to the above relationships.

As seen in FIG. 7, the lid 114 includes a holding part 116 configured to hold the power supply PS in the closed state where the lid 114 is in the closed position P21. The holding part 116 includes a recess 118 in which the power supply PS is to be provided in the closed state where the lid 114 is in the closed position P21. The power-supply accommodating space 52 includes at least part of the recess 118.

Figure 15:
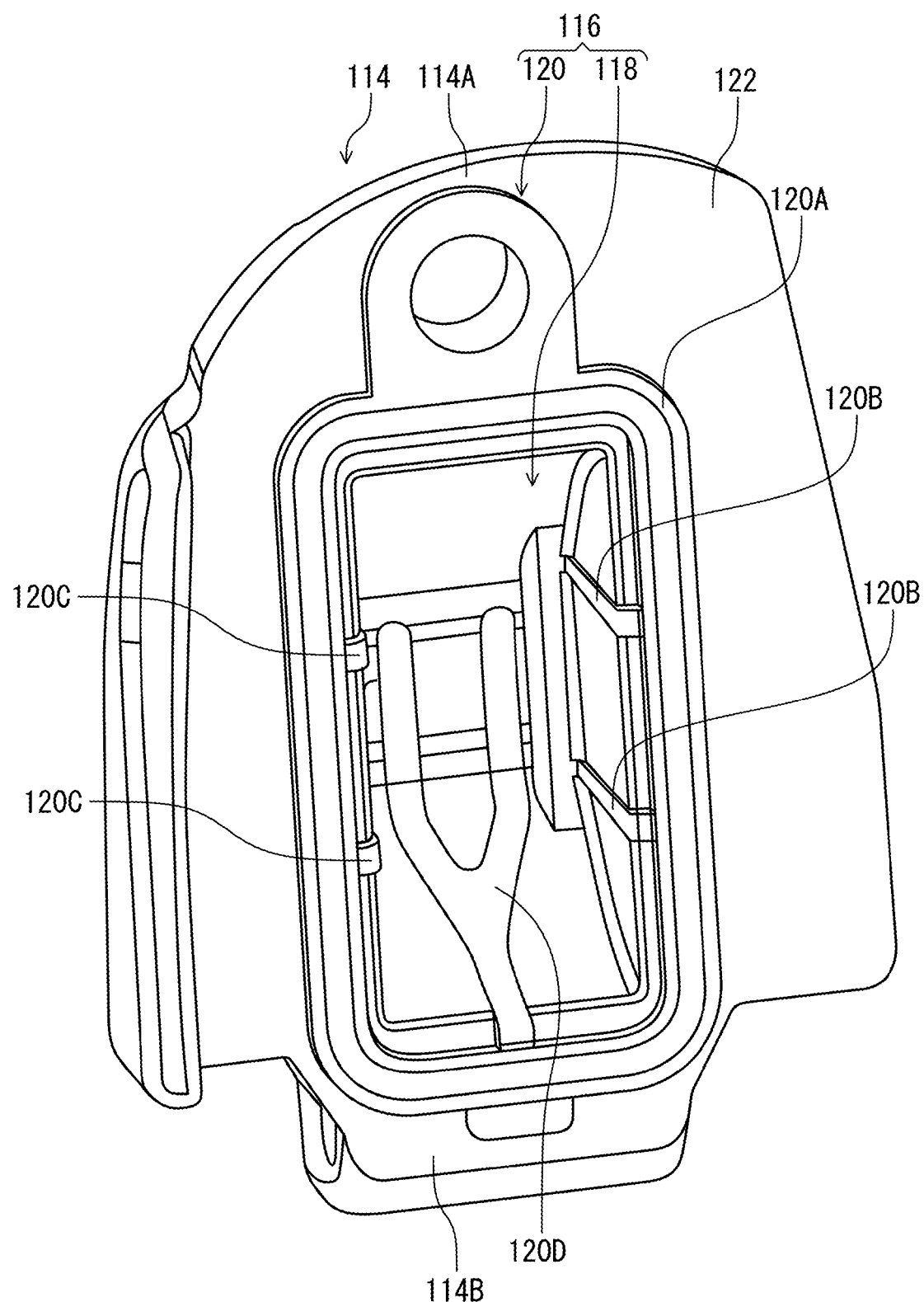
FIG. 15 is a perspective view of a lid of the operating device illustrated in FIG. 1.

As seen in FIG. 15, the holding part 116 includes an elastic portion 120. The elastic portion 120 is made of an elastic material such as elastomer (e.g., rubber). The lid 114 includes a lid body 122. The lid body 122 includes the first lid end 114A, the second lid end 114B, and the recess 118. The elastic portion 120 is attached to the lid body 122. The elastic portion 120 is provided in the recess 118 of the lid body 122. The elastic portion 120 is attached to the lid body 122.

Figure 16:
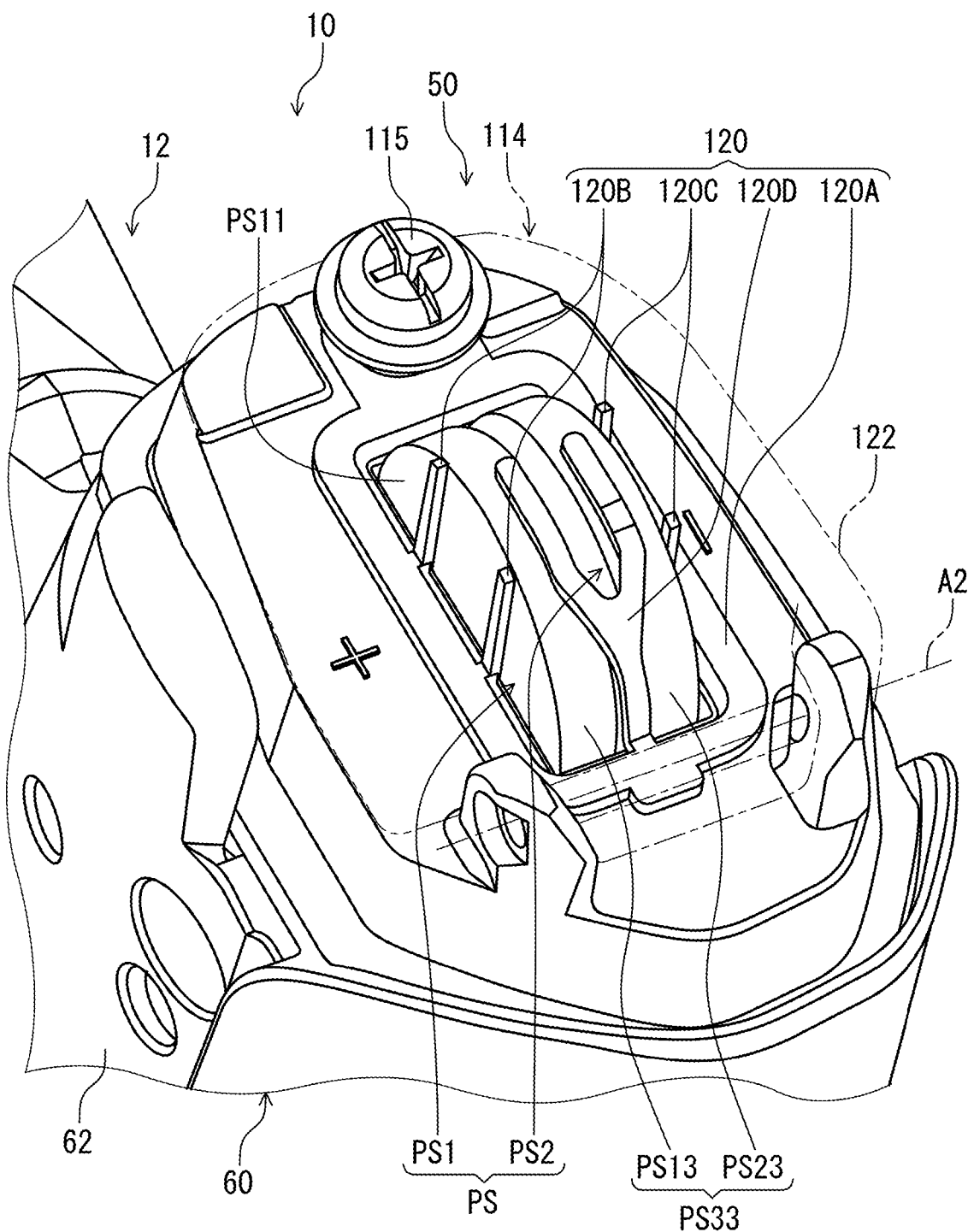
FIG. 16 is a perspective view of the operating device illustrated in FIG. 1, with the lid omitted.

As seen in FIG. 16, the elastic portion 120 is configured to be in contact with the power supply PS in the closed state where the lid 114 is in the closed position P21. The elastic portion 120 includes a base 120A, a first elastic part 120B, a second elastic part 120C, and a third elastic part 120D. The base 120A is attached to the lid body 122. The base 120A has an annular shape. The base 120A is provided between the accommodating base 60 and the lid body 122 in the closed state where the lid 114 is in the closed position P21. The base 120A includes an annular part 120E. The power-supply accommodating space 52 is sealed with the base 120A of the elastic portion 120 in the closed state where the lid 114 is in the closed position P21.

The first elastic part 120B extends from the base 120A. In the present embodiment, the elastic portion 120 includes a plurality of first elastic parts 120B. The first elastic parts 120B are spaced apart from each other. The first elastic part 120B is configured to be in contact with the power supply PS in the state where the power supply PS is in the power-supply accommodating space 52 and the closed state where the lid 114 is in the closed position P21. The first elastic part 120B is configured to be in contact with the first power supply PS1 in the state where the first power supply PS1 is in the first power-supply accommodating space 54 and the closed state where the lid 114 is in the closed position P21.

The first elastic part 120B is configured to be in contact with the end surface PS31 of the power supply PS in the state where the power supply PS is in the power-supply accommodating space 52 and the closed state where the lid 114 is in the closed position P21. The first elastic part 120B is configured to be in contact with the first end surface PS11 of the first power supply PS1 in the state where the first power supply PS1 is in the first power-supply accommodating space 54 and the closed state where the lid 114 is in the closed position P21.

Figure 17:
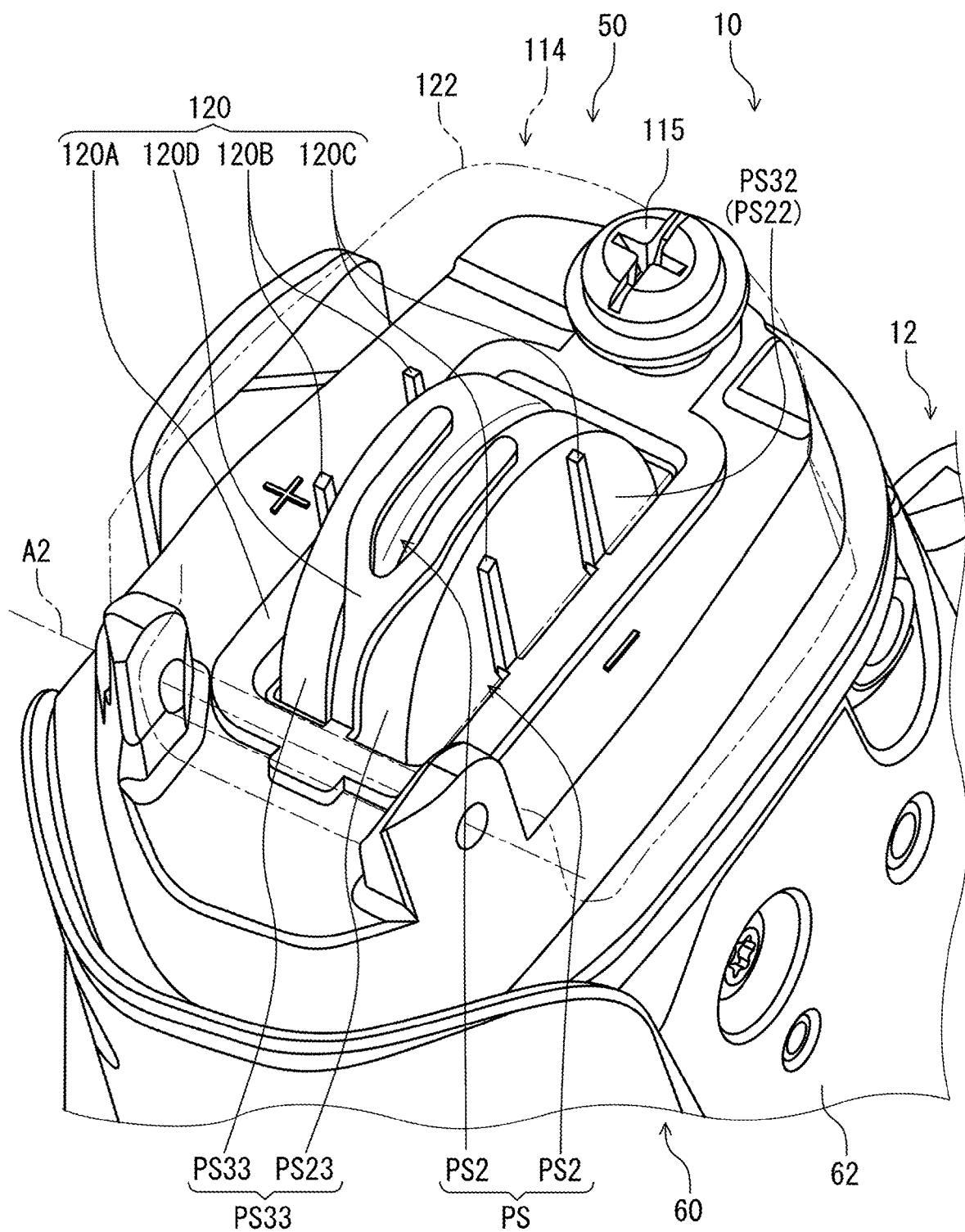
FIG. 17 is another perspective view of the operating device illustrated in FIG. 1, with the lid omitted.

As seen in FIG. 17, the second elastic part 120C extends from the base 120A. In the present embodiment, the elastic portion 120 includes a plurality of second elastic parts 120C. The second elastic parts 120C are spaced apart from each other. The second elastic part 120C is configured to be in contact with the power supply PS in the state where the power supply PS is in the power-supply accommodating space 52 and the closed state where the lid 114 is in the closed position P21. The second elastic part 120C is configured to be in contact with the second power supply PS2 in the state where the second power supply PS2 is in the second power-supply accommodating space 56 and the closed state where the lid 114 is in the closed position P21. The second elastic part 120C is configured to be in contact with the second additional end surface PS22 of the second power supply PS2 in the state where the second power supply PS2 is in the second power-supply accommodating space 56 and the closed state where the lid 114 is in the closed position P21.

The third elastic part 120D extends from the base 120A. The third elastic part 120D is configured to be in contact with the power supply PS in the state where the power supply PS is in the power-supply accommodating space 52 and the closed state where the lid 114 is in the closed position P21. The third elastic part 120D is configured to be in contact with the first power supply PS1 and the second power supply PS2 in the state where the first power supply PS1 and the second power supply PS2 are in the first power-supply accommodating space 54 and the second power-supply accommodating space 56 and the closed state where the lid 114 is in the closed position P21.

The third elastic part 120D is configured to be in contact with the outer peripheral surface PS33 of the power supply PS in the state where the power supply PS is in the power-supply accommodating space 52 and the closed state where the lid 114 is in the closed position P21. The third elastic part 120D is configured to be in contact with the first outer peripheral surface PS13 of the first power supply PS1 and the second outer peripheral surface PS23 of the second power supply PS2 in the state where the first power supply PS1 and the second power supply PS2 are in the first power-supply accommodating space 54 and the second power-supply accommodating space 56 and the closed state where the lid 114 is in the closed position P21.

In the present embodiment, the elastic portion 120 includes the base 120A, the first elastic part 120B, the second elastic part 120C, and the third elastic part 120D. However, at least one of the base 120A, the first elastic part 120B, the second elastic part 120C, and the third elastic part 120D can be omitted from the elastic portion 120 if needed and/or desired. At least one of the recess 118 and the elastic portion 120 can be omitted from the holding part 116 if needed and/or desired. The holding part 116 can be omitted from the lid 114 if needed and/or desired.

Figure 18:
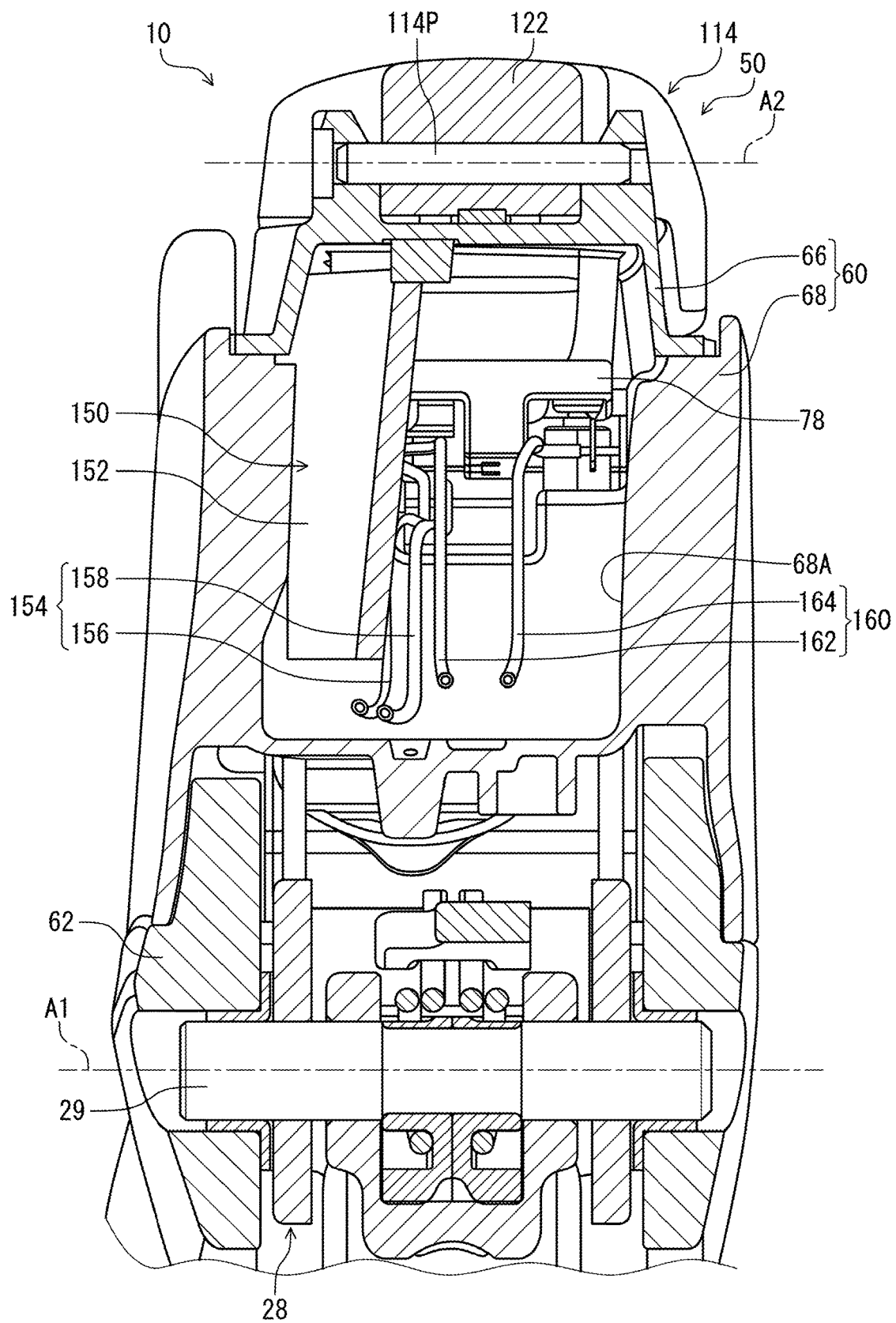
FIG. 18 is a partial cross-sectional view of the operating device taken along line XVIII-XVIII of FIG. 6.

As seen in FIG. 18, the lid pivot axis A2 extends along the pivot axis A1. The lid pivot axis A2 is parallel to the pivot axis A1. However, the lid pivot axis A2 can be non-parallel to the pivot axis A1 if needed and/or desired. The lid pivot axis A2 can be inclined relative to the pivot axis A1 if needed and/or desired.

Figure 19:
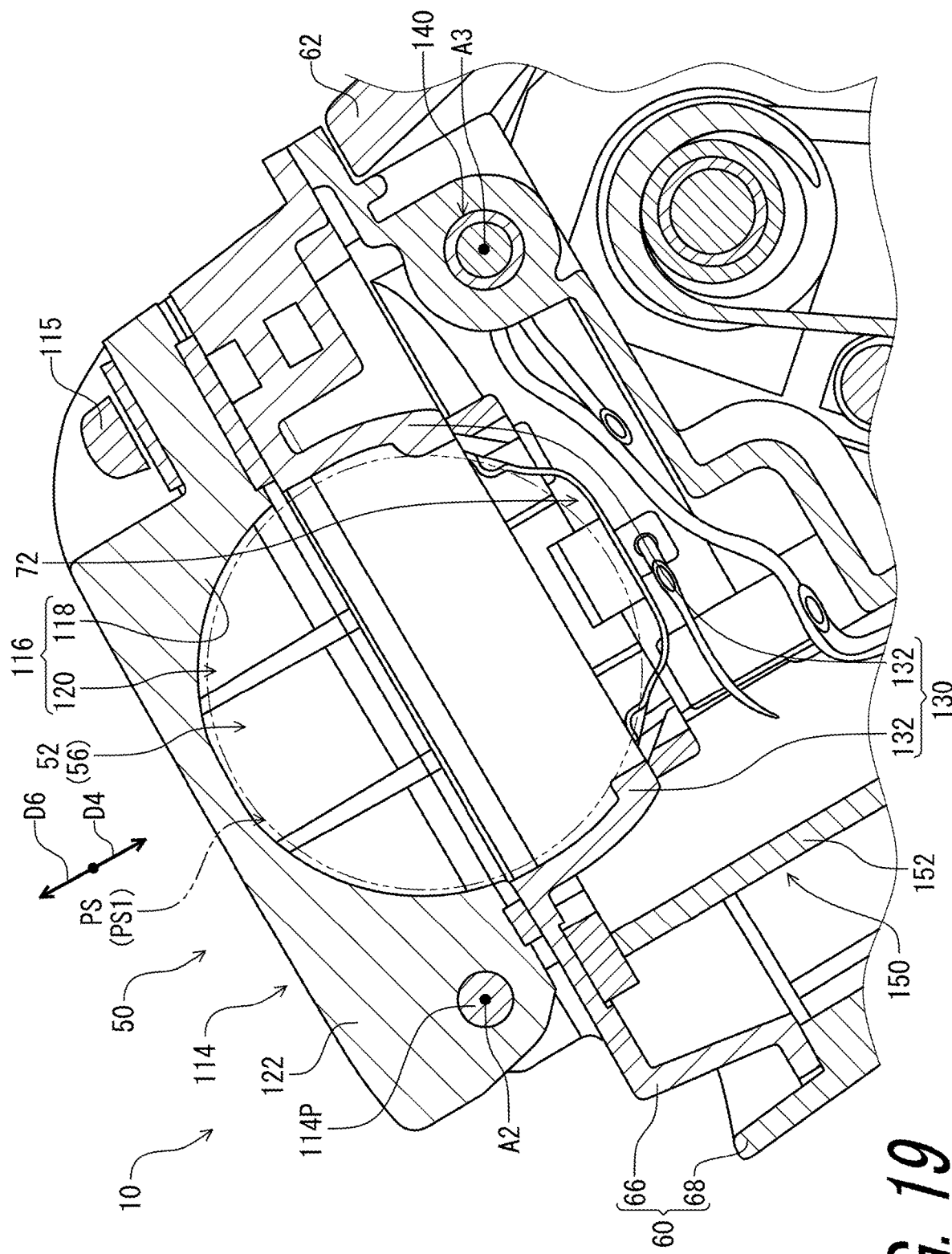
FIG. 19 is a partial cross-sectional view of the operating device taken along line XIX-XIX of FIG. 7.
Figure 20:
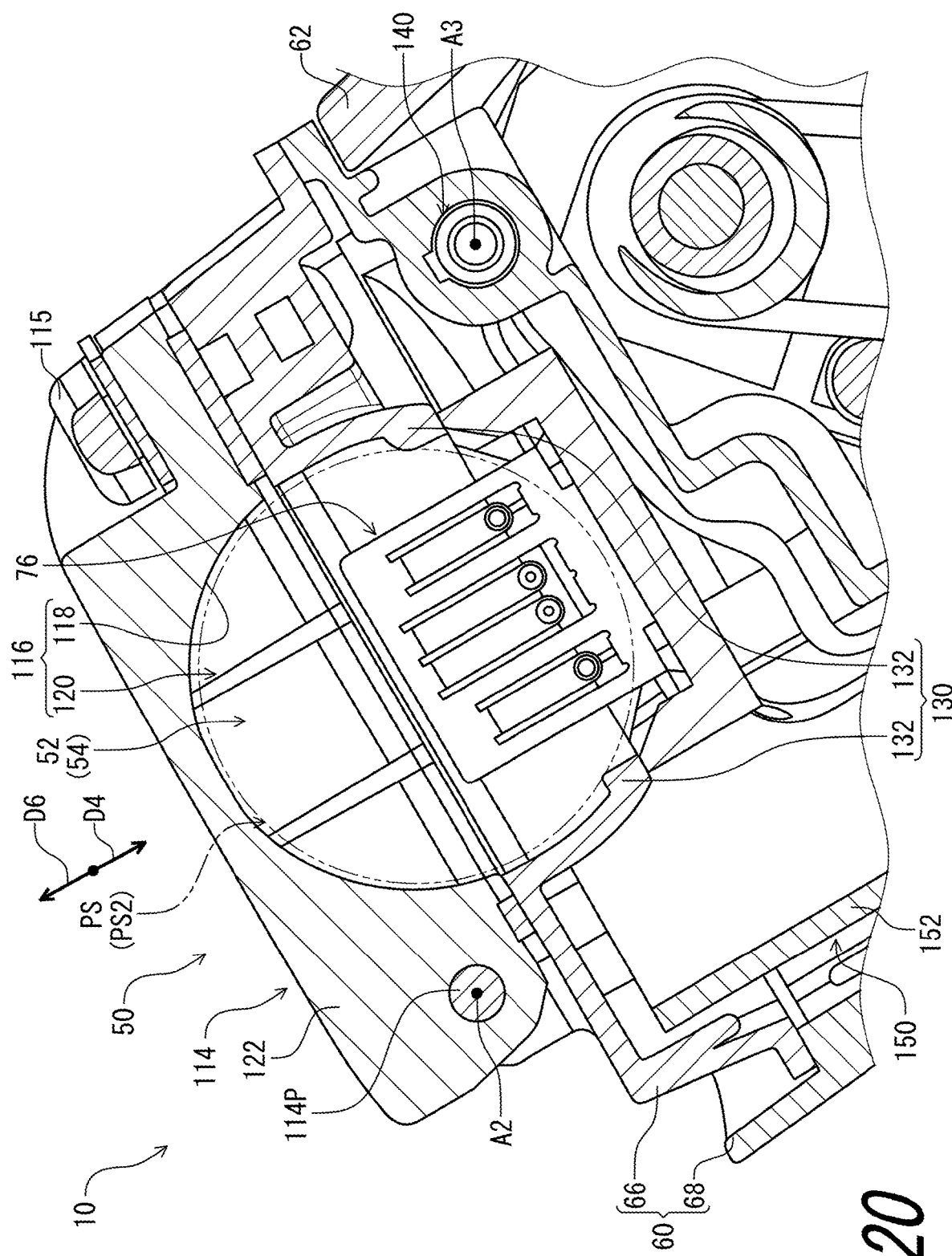
FIG. 20 is a partial cross-sectional view of the operating device taken along line XX-XX of FIG. 7.

As seen in FIGS. 19 and 20, the accommodating structure 50 includes a power-supply support 130. The power-supply support 130 is configured to be in contact with the power supply PS in the state where the power supply PS is in the power-supply accommodating space 52. The power-supply support 130 is a separate member from the terminal member 70 and made of a non-conductive material. As seen in FIG. 19, the power-supply support 130 is configured to be in contact with the first power supply PS1 in the state where the first power supply PS1 is in the first power-supply accommodating space 54. As seen in FIG. 20, the power-supply support 130 is configured to be in contact with the second power supply PS2 in the state where the second power supply PS2 is in the second power-supply accommodating space 56.

As seen in FIGS. 19 and 20, the power-supply support 130 includes a plurality of support parts 132 spaced apart from each other. The plurality of support parts 132 is configured to be in contact with the power supply PS in the state where the power supply PS is in the power-supply accommodating space 52. The plurality of support parts 132 is configured to be in contact with the first power supply PS1 in the state where the first power supply PS1 is in the first power-supply accommodating space 54. The plurality of support parts 132 is configured to be in contact with the second power supply PS2 in the state where the second power supply PS2 is in the second power-supply accommodating space 56.

Figure 21:
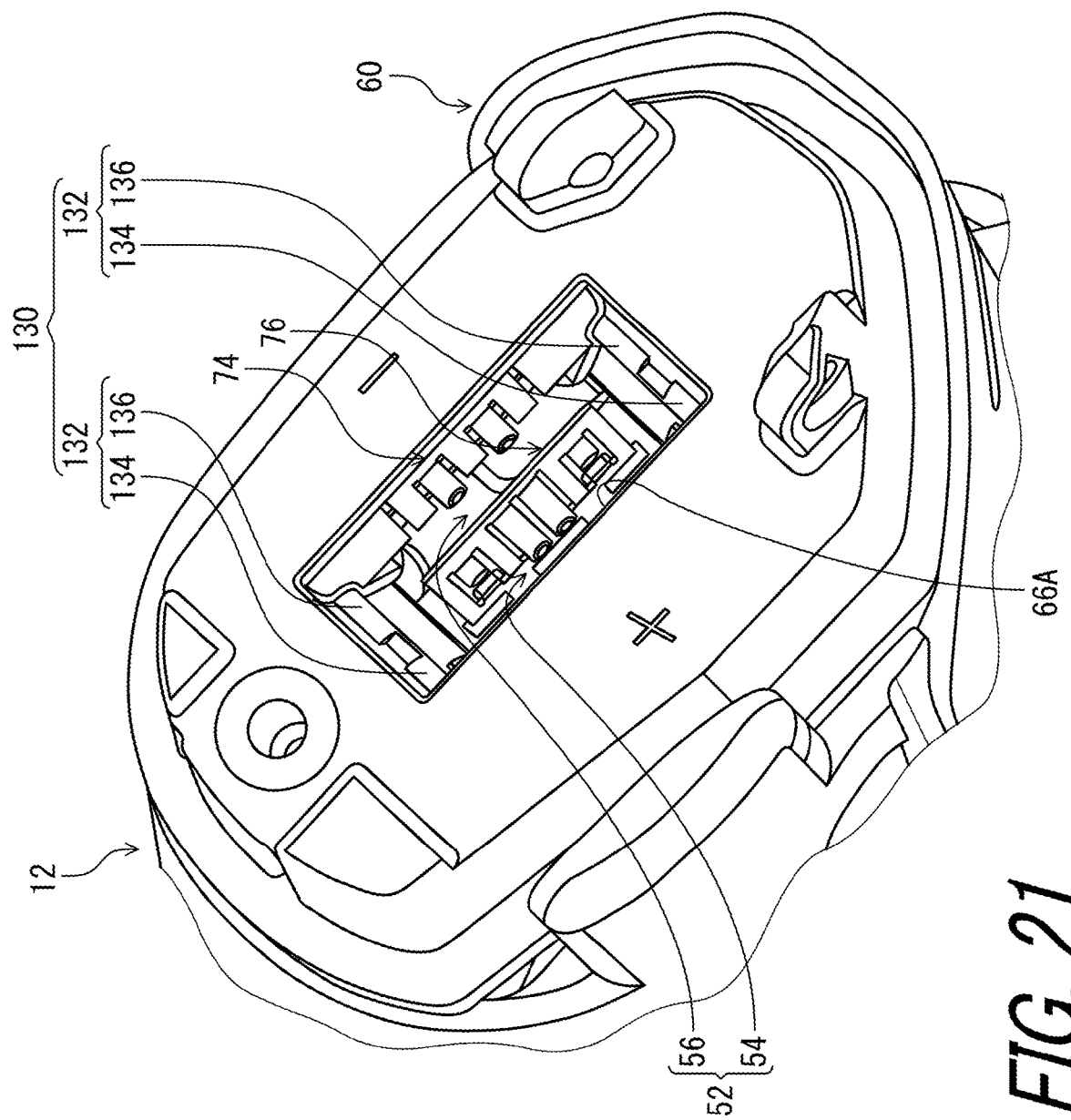
FIG. 21 is a perspective view of the operating device illustrated in FIG. 1, with the lid omitted.

As seen in FIG. 21, each support part of the plurality of support parts 132 includes a first support part 134 and a second support part 136. The first support parts 134 are spaced apart from each other. The second support parts 136 are spaced apart from each other. The first support parts 134 are configured to be in contact with the first power supply PS1 in the state where the first power supply PS1 is in the first power-supply accommodating space 54. The second support parts 136 are configured to be in contact with the second power supply PS2 in the state where the second power supply PS2 is in the second power-supply accommodating space 56.

Figure 22:
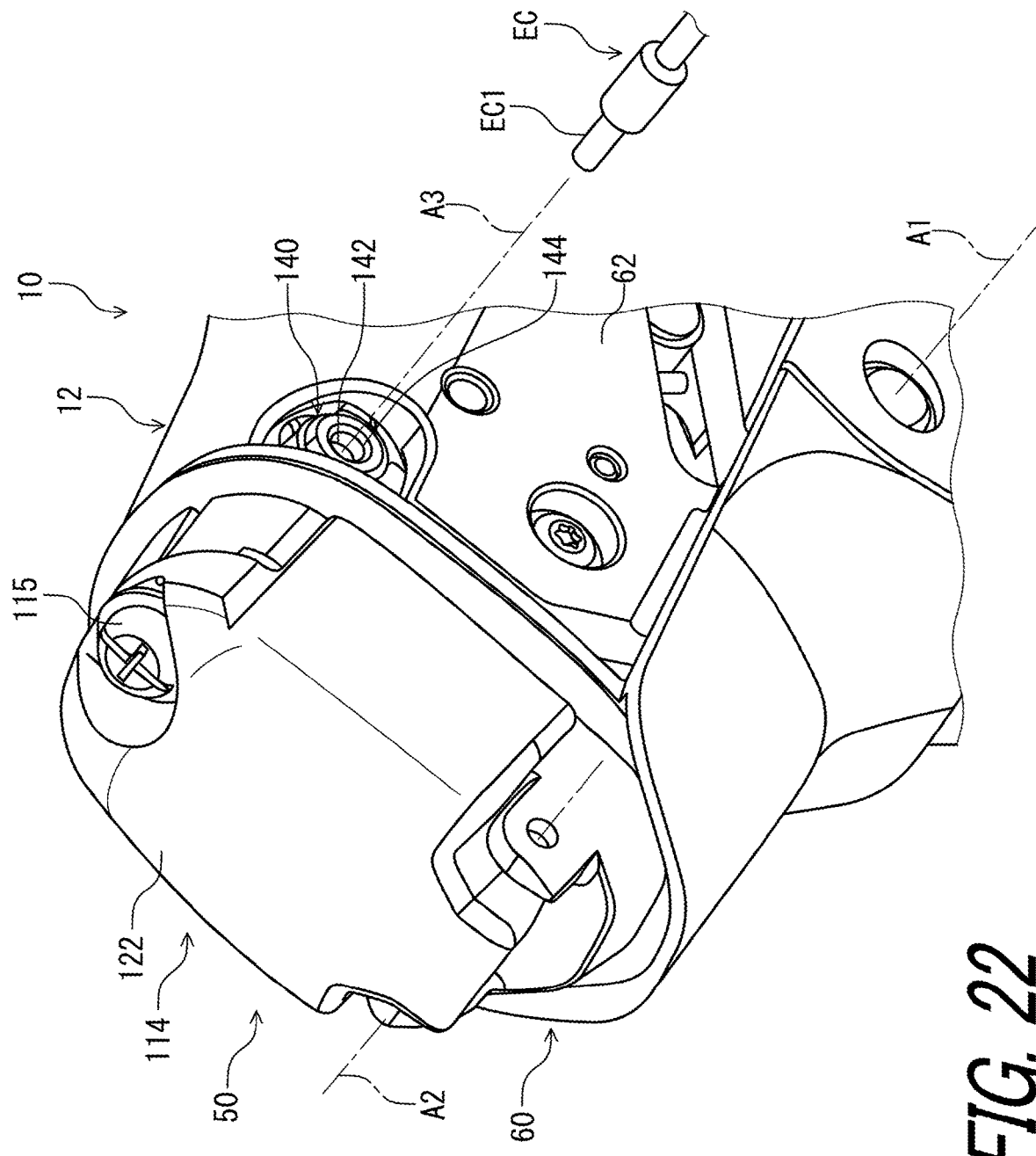
FIG. 22 is a perspective view of the operating device illustrated in FIG. 1.

As seen in FIG. 22, the operating device 10 for the human-powered vehicle 2 comprises an electric communication port 140. The electric communication port 140 is configured to be electrically connected to a connector EC1 of an electric cable EC. The connector EC1 of the electric cable EC is detachably connectable with the electric communication port 140.

As seen in FIG. 8, the electric communication port 140 is provided non-movably relative to the base member 12. The electric communication port 140 is secured to the accommodating structure 50. The electric communication port 140 is secured to the accommodating base 60. The electric communication port 140 is secured to the second accommodating base 68.

The accommodating structure 50 includes an attachment hole 50A. The second accommodating base 68 of the accommodating base 60 includes the attachment hole 50A. The electric communication port 140 is provided in the attachment hole 50A. For example, the electric communication port 140 is press-fitted in the attachment hole 50A. The electric communication port 140 can be secured to the accommodating structure 50 with a fastener (e.g., a screw) and/or a bonding structure (e.g., an adhesive agent).

The electric communication port 140 includes an insertion hole 142. The insertion hole 142 extends in a port insertion direction D7. The insertion hole 142 has a port center axis A3. The insertion hole 142 extends along the port center axis A3. The port insertion direction D7 is different from the longitudinal direction D1 (see e.g., FIG. 1). The port insertion direction D7 is non-parallel to the longitudinal direction D1 (see e.g., FIG. 1). The port insertion direction D7 is defined along the pivot axis A1.

In the present embodiment, the port insertion direction D7 is perpendicular to the longitudinal direction D1. The port insertion direction D7 is parallel to the pivot axis A1. However, the port insertion direction D7 can be non-perpendicular to the longitudinal direction D1 if needed and/or desired. The port insertion direction D7 can be parallel to the longitudinal direction D1 if needed and/or desired. The port insertion direction D7 can be non-parallel to the pivot axis A1 if needed and/or desired.

The insertion hole 142 defines an insertion opening 144. The insertion opening 144 faces the reference plane RP intersecting with the pivot axis A1. The insertion opening 144 faces toward the reference plane RP. The reference plane RP is defined to be perpendicular to the pivot axis A1. However, the reference plane RP can be inclined relative to the pivot axis A1 if needed and/or desired.

The base member 12 includes a first lateral surface 12A and a second lateral surface 12B provided on a reverse side of the first lateral surface 12A. The electric communication port 140 is provided in at least one of the first lateral surface 12A and the second lateral surface 12B. In the present embodiment, the electric communication port 140 is provided in the first lateral surface 12A. However, the electric communication port 140 can be provided in the second lateral surface 12B or both the first lateral surface 12A and the second lateral surface 12B if needed and/or desired.

The electric communication port 140 includes a connector body 146 and a connector terminal 148. The connector body 146 includes the insertion hole 142. The connector terminal 148 is provided in the insertion hole 142. The connector terminal 148 is made of a conductive material. In the present embodiment, the connector body 146 is a separate member from the base member 12. However, the connector body 146 can be integrally provided with the base member 12 as a one-piece unitary member if needed and/or desired.

As seen in FIG. 1, the electric communication port 140 is closer to the second end portion 16 than the first end portion 14 in the longitudinal direction D1. The electric communication port 140 is provided at the second end portion 16. The electric communication port 140 is closer to the pommel portion 20 than the first end portion 14 in the longitudinal direction D1. The electric communication port 140 is provided above the pivot axis A1 as viewed along the pivot axis A1 in a mounting state where the first end portion 14 is coupled to the handlebar 4.

As seen in FIG. 2, the electric communication port 140 is closer to the second end portion 16 than at least one of the cylinder bore 32 and the piston 34. The electric communication port 140 is closer to the second end portion 16 than at least one of the hydraulic chamber 36 and the reservoir chamber 38. In the present embodiment, the electric communication port 140 is closer to the second end portion 16 than the hydraulic chamber 36 and the reservoir chamber 38. However, the positional relationships among the electric communication port 140, the second end portion 16, the hydraulic chamber 36, and the reservoir chamber 38 are not limited to the above relationships.

The electric communication port 140 is closer to the accommodating structure 50 than the pivot axis A1 as viewed along the pivot axis A1. The electric communication port 140 is closer to the power-supply accommodating space 52 than the pivot axis A1 as viewed along the pivot axis A1. However, the positional relationships among the electric communication port 140, the accommodating structure 50, the power-supply accommodating space 52, and the pivot axis A1 are not limited to the above relationships.

As seen in FIG. 9, the operating device 10 further comprises circuitry 150. The circuitry 150 is electrically connected to the electric communication port 140. The circuitry 150 includes a substrate 152 provided to the second end portion 16. The connector terminal 148 is configured to be electrically connected to the circuitry 150. The terminal member 70 is configured to be electrically connected to the circuitry 150. The first terminal 72 and the second terminal 74 are configured to be electrically connected to the circuitry 150. The terminal member 70 is configured to be electrically connected to the substrate 152. The first terminal 72 and the second terminal 74 are configured to be electrically connected to the substrate 152.

Figure 23:
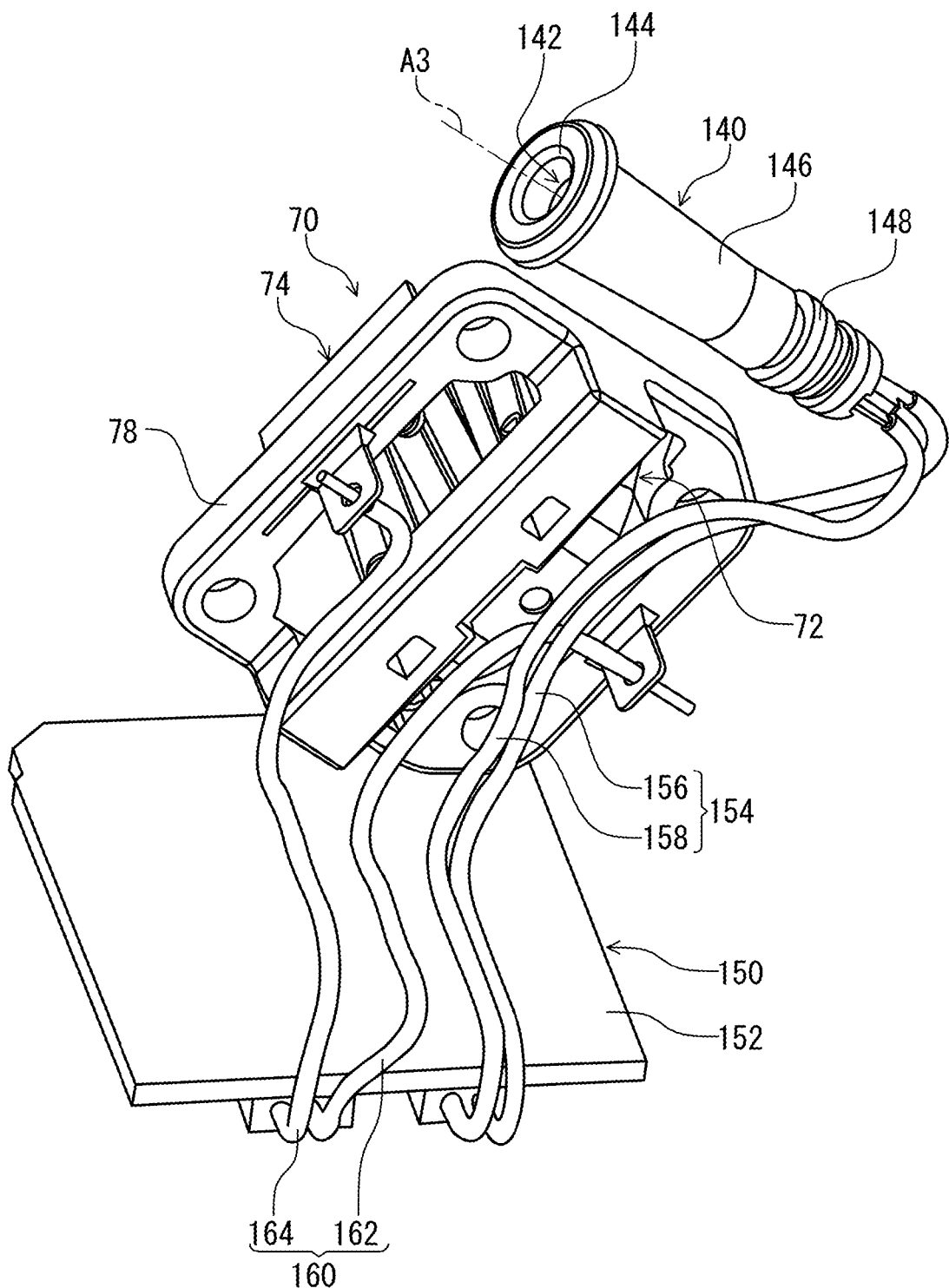
FIG. 23 is a perspective view of the internal structure illustrated in FIG. 9.

As seen in FIG. 23, the operating device 10 further comprises a wire 154. The wire 154 is configured to electrically connect the electric communication port 140 to the substrate 152. In the present embodiment, the wire 154 includes a first wire 156 and a second wire 158. The first wire 156 and the second wire 158 are configured to electrically connect the electric communication port 140 to the substrate 152. The connector terminal 148 of the electric communication port 140 is configured to be electrically connected to the substrate 152 via the first wire 156 and the second wire 158.

The operating device 10 further comprises an additional wire 160. The additional wire 160 is configured to electrically connect the terminal member 70 to the substrate 152. In the present embodiment, the additional wire 160 includes a first additional wire 162 and a second additional wire 164. The first additional wire 162 is configured to electrically connect the first terminal 72 to the substrate 152. The second additional wire 164 is configured to electrically connect the second terminal 74 to the substrate 152.

As seen in FIGS. 6 and 18, the wire 154 is provided in the base member 12. The wire 154 is provided in the accommodating base 60 of the accommodating structure 50. The wire 154 is provided in the second internal space 68A of the second accommodating base 68. The first wire 156 and the second wire 158 are provided in the base member 12. The first wire 156 and the second wire 158 are provided in the accommodating base 60 of the accommodating structure 50. The first wire 156 and the second wire 158 are provided in the second internal space 68A of the second accommodating base 68.

Figure 24:
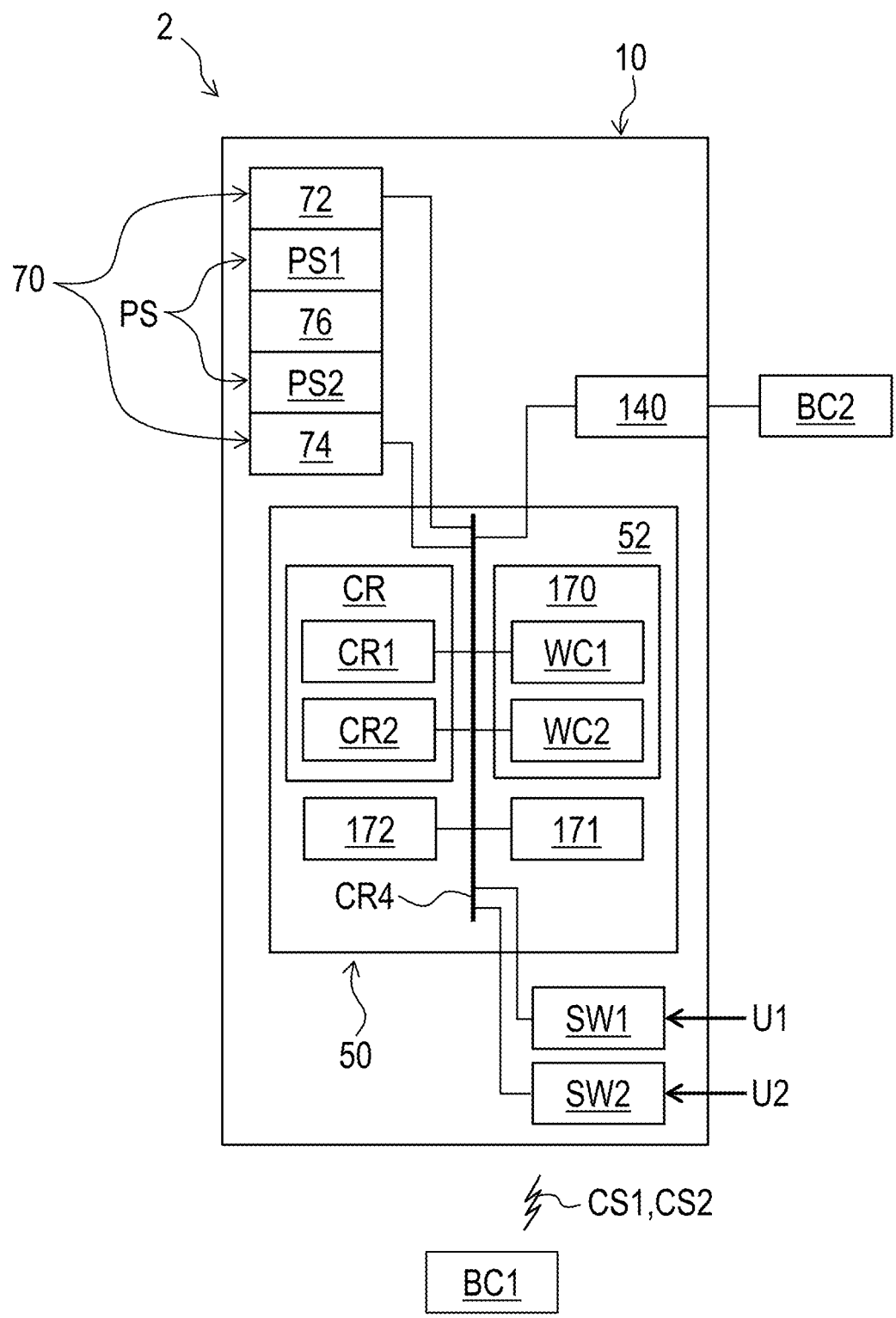
FIG. 24 is a schematic block diagram of a human-powered vehicle including the operating device illustrated in FIG. 1.

As seen in FIG. 24, the circuitry 150 includes at least one of a communicator, an antenna, an informing unit, and a controller. In the present embodiment, the circuitry 150 includes a communicator 170, an antenna 171, an informing unit 172, and a controller CR. The communicator 170, the antenna 171, the informing unit 172, and the controller CR are electrically mounted on the substrate 152. The communicator 170, the antenna 171, the informing unit 172, and the controller CR are electrically connected with each other via the substrate 152. The switches SW1 and SW2 are electrically connected to the substrate 152. The switch SW1 is configured to receive a user input U1. The switch SW2 is configured to receive a user input U2.

The communicator 170 is configured to communicate with another device via at least one of a wired communication channel and a wireless communication channel. In the present embodiment, the communicator 170 includes a wireless communicator WC1 and a wired communicator WC2. The wireless communicator WC1 is configured to communicate with a wireless communicator of the electric component BC1 using the antenna 171 via a wireless communication channel. The wired communicator WC2 is configured to communicate with a wired communicator of the additional electric component BC2 via a wired communication channel. However, the wireless communicator WC1 can be configured to communicate with a wireless communicator of the additional electric component BC2 using the antenna 171 via a wireless communication channel if needed and/or desired. The wired communicator WC2 can be configured to communicate with a wired communicator of the electric component BC1 via a wired communication channel if needed and/or desired.

The controller CR is configured to control another device in response to the user input U1, the user input U2, and/or other information. In the present embodiment, the controller CR is configured to control the wired communicator WC2 and the wireless communicator WC1 to transmit a control signal CS1 and/or CS2 to the electric component BC1. In the present embodiment, the control signal CS1 indicates upshifting of the electric component BC1. The control signal CS2 indicates downshifting of the electric component BC1. However, the user inputs U1 and U2 and the control signals CS1 and CS2 can be used to operate other components.

The controller CR includes a processor CR1, a memory CR2, and a system bus CR4. The processor CR1 and the memory CR2 are electrically mounted on the circuitry 150. For example, the processor CR1 includes a central processing unit (CPU) and a memory controller. The processor CR1 is electrically connected to the memory CR2 with the circuitry 150 and the system bus CR4. Each of the wireless communicator WC1 and the wired communicator WC2 is electrically connected to the processor CR1 and the memory CR2 with the circuitry 150 and the system bus CR4.

The memory CR2 includes a read only memory (ROM) and a random-access memory (RAM). The memory CR2 includes storage areas each having an address in the ROM and the RAM. The processor CR1 is configured to control the memory CR2 to store data in the storage areas of the memory CR2 and reads data from the storage areas of the memory CR2. The memory CR2 (e.g., the ROM) stores a program. The program is read into the processor CR1, and thereby the configuration and/or algorithm of the communicator 170 is performed. The structure and/or configuration are not limited to the above structure and/or configuration.

The controller CR is configured to detect connection between the electric communication port 140 and an electric cable. The controller CR is configured to control the wired communicator WC2 to communicate with the additional electric component BC2 if the controller CR detects the connection between the electric communication port 140 and the electric cable EC connected to the additional electric component BC2. In a case where the additional electric component BC2 includes an additional operating device such as a satellite operating device (e.g., a satellite switch), the controller CR is configured to control another component such as the electric component BC1 based on a control signal transmitted from the additional electric component BC2 or other components via the electric cable EC and the electric communication port 140. In a case where the additional electric component BC2 includes an operated component, the controller CR is configured to transmit a control signal to the operated component via the electric communication port 140 and the electric cable EC.

In the present embodiment, the wired communicator WC2 is configured to communicate with other wired communicators using power line communication (PLC) technology. The PLC technology is used for communicating between electric components. The PLC carries data on a conductor that is also used simultaneously for electric power transmission or electric power distribution to the electric components. However, the wired communicator WC2 can be configured to communicate with other wired communicators without the PLC.

The controller CR is configured to update firmware stored in the memory CR2 via the electric communication port 140 in a case where a device configured to update firmware is electrically connected to the electric communication port 140. The cover 26 (see e.g., FIG. 1) is at least partially removed from the base member 12 when the electric cable EC is connected to the electric communication port 140.

The informing unit 172 is configured to inform the user of a state of the operating device 10. Examples of the state of the operating device 10 includes a communication state of the communicator 170, a level of remaining electricity of the power supply PS, and a pairing state of the communicator 170. Examples of the informing unit 172 include a light emitting device such as a light-emitting diode (LED) and a loudspeaker. In the present embodiment, the informing unit 172 is provided to the base member 12. However, the informing unit 172 can be provided other portions of the operating device 10 if needed and/or desired. The informing unit 172 can be omitted from the operating device 10 if needed and/or desired.

Second Embodiment

An operating device 210 in accordance with a second embodiment will be described below referring to FIGS. 25 to 30. The operating device 210 has the same structure and/or configuration as those of the operating device 10 except for the accommodating structure 50. Thus, elements having substantially the same function as those in the first embodiment will be numbered the same here and will not be described and/or illustrated again in detail here for the sake of brevity.

Figure 25:
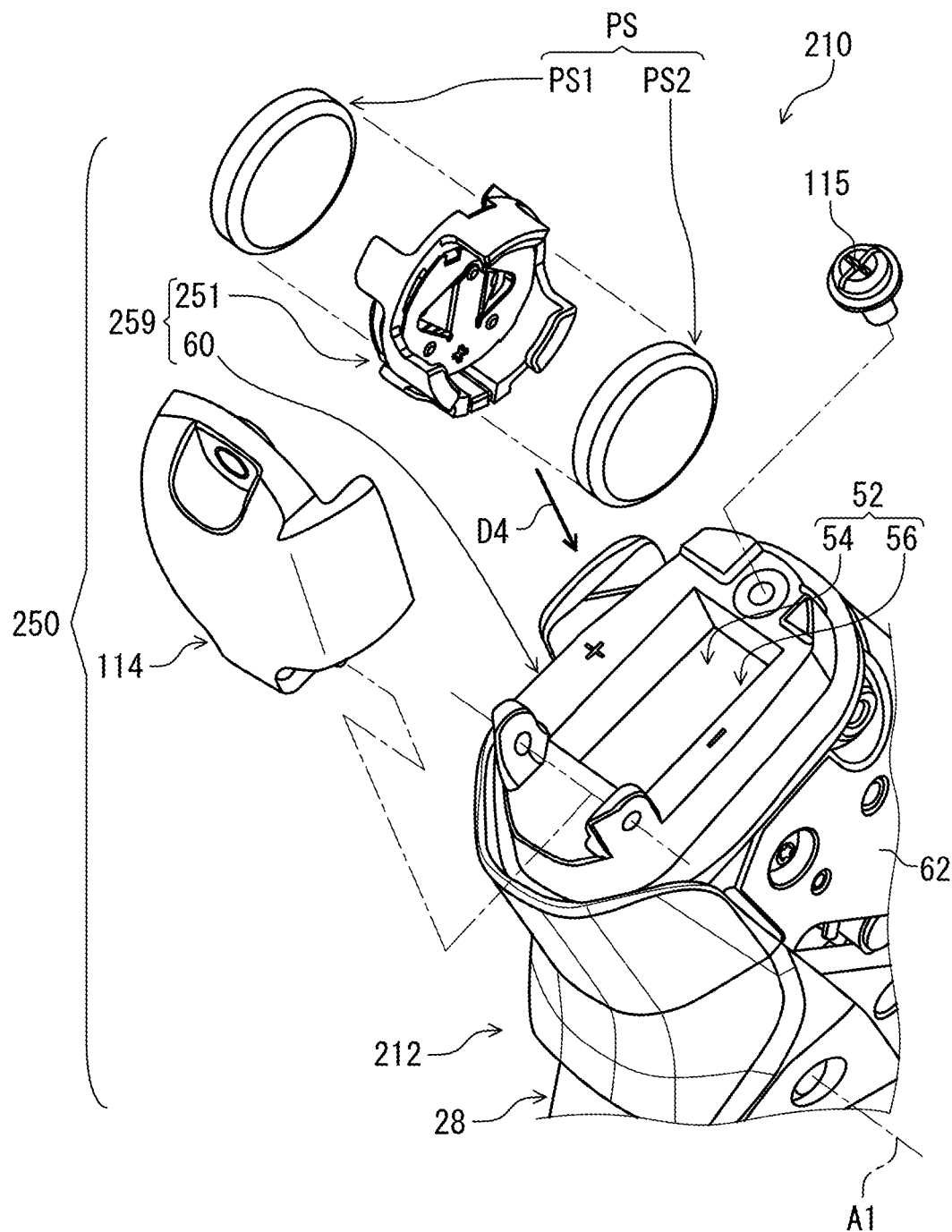
FIG. 25 is a perspective view of an operating device in accordance with a second embodiment.

As seen in FIG. 25, the operating device 210 for the human-powered vehicle 2 comprises a base member 212 and the operating member 28. The base member 212 includes an accommodating structure 250. The accommodating structure 250 is configured to accommodate the power supply PS. The accommodating structure 250 is configured to accommodate the power supply PS defining the radial direction D2. The accommodating structure 250 includes the power-supply accommodating space 52 into which the power supply PS is to be inserted along the radial direction D2 and the insertion direction D4 which is non-parallel to the pivot axis A1. The accommodating structure 250 has substantially the same structure as the structure of the accommodating structure 50 of the first embodiment.

In the present embodiment, the accommodating structure 250 includes an accommodating body 259. The accommodating body 259 includes the accommodating base 60 and a holder 251. The accommodating structure 250 includes a holder 251. The holder 251 is a separate member from the accommodating base 60. The holder 251 is configured to be detachably attached to the accommodating base 60. The holder 251 is configured to be provided in the power-supply accommodating space 52. The holder 251 is configured to be inserted into the power-supply accommodating space 52 in the insertion direction D4.

Figure 26:
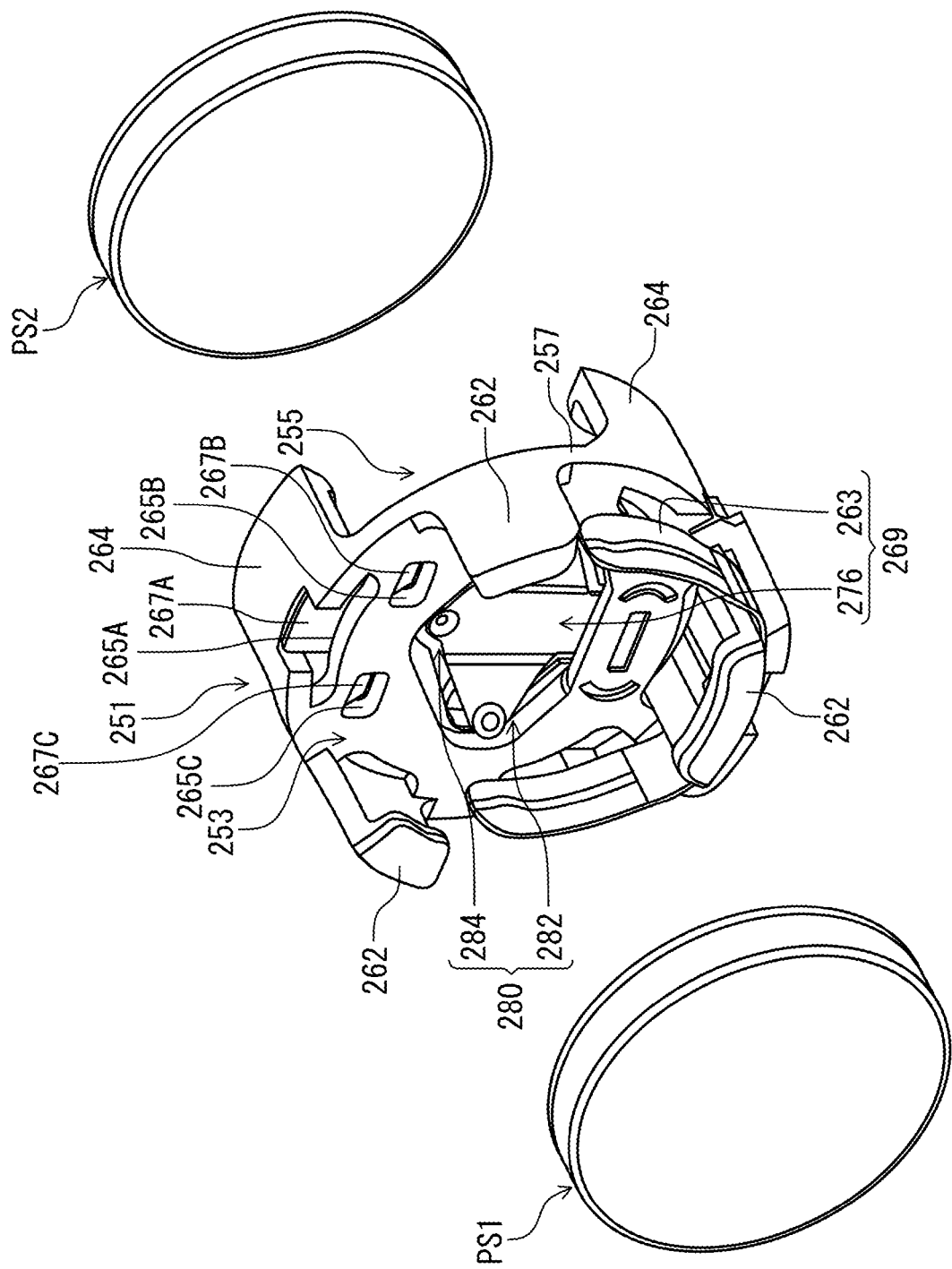
FIG. 26 is a perspective view of a holder, a terminal structure, and a power supply of the operating device illustrated in FIG. 25.
Figure 27:
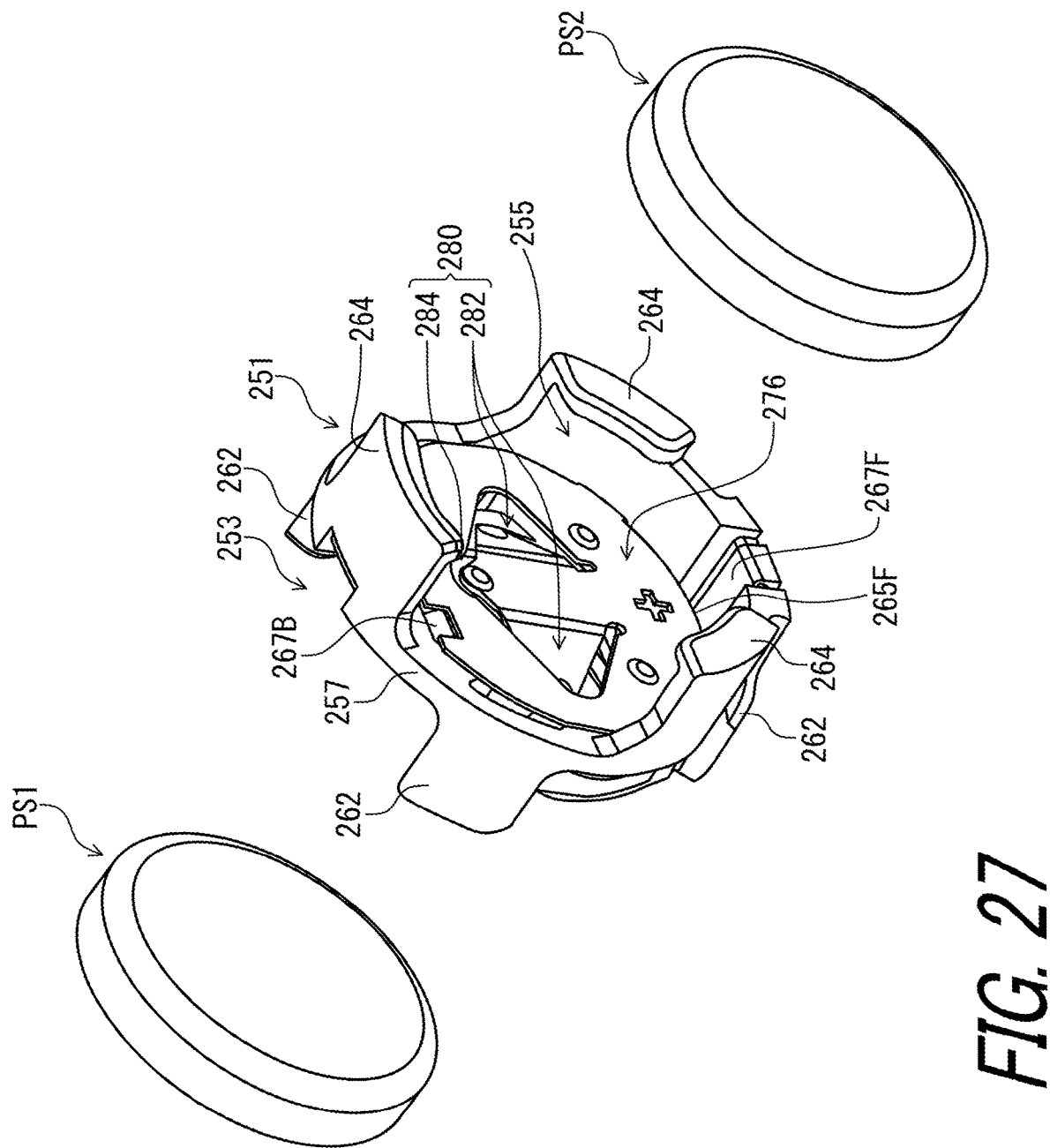
FIG. 27 is another perspective view of the holder, the terminal structure, and the power supply of the operating device illustrated in FIG. 25.

As seen in FIGS. 26 and 27, the holder 251 defines a first holding space 253 in which the first power supply PS1 is to be provided and a second holding space 255 in which the second power supply PS2 is to be provided. The holder 251 includes a holder body 257, a plurality of first holding parts 262, and a plurality of second holding parts 264. The holder body 257 is provided between the first holding space 253 and the second holding space 255. The plurality of first holding parts 262 extends from the holder body 257 toward the first holding space 253 to hold the first power supply SP1 in the first holding space 253. The plurality of second holding parts 264 extends from the holder body 257 toward the second holding space 255 to hold the second power supply SP2 in the second holding space 255.

Figure 28:
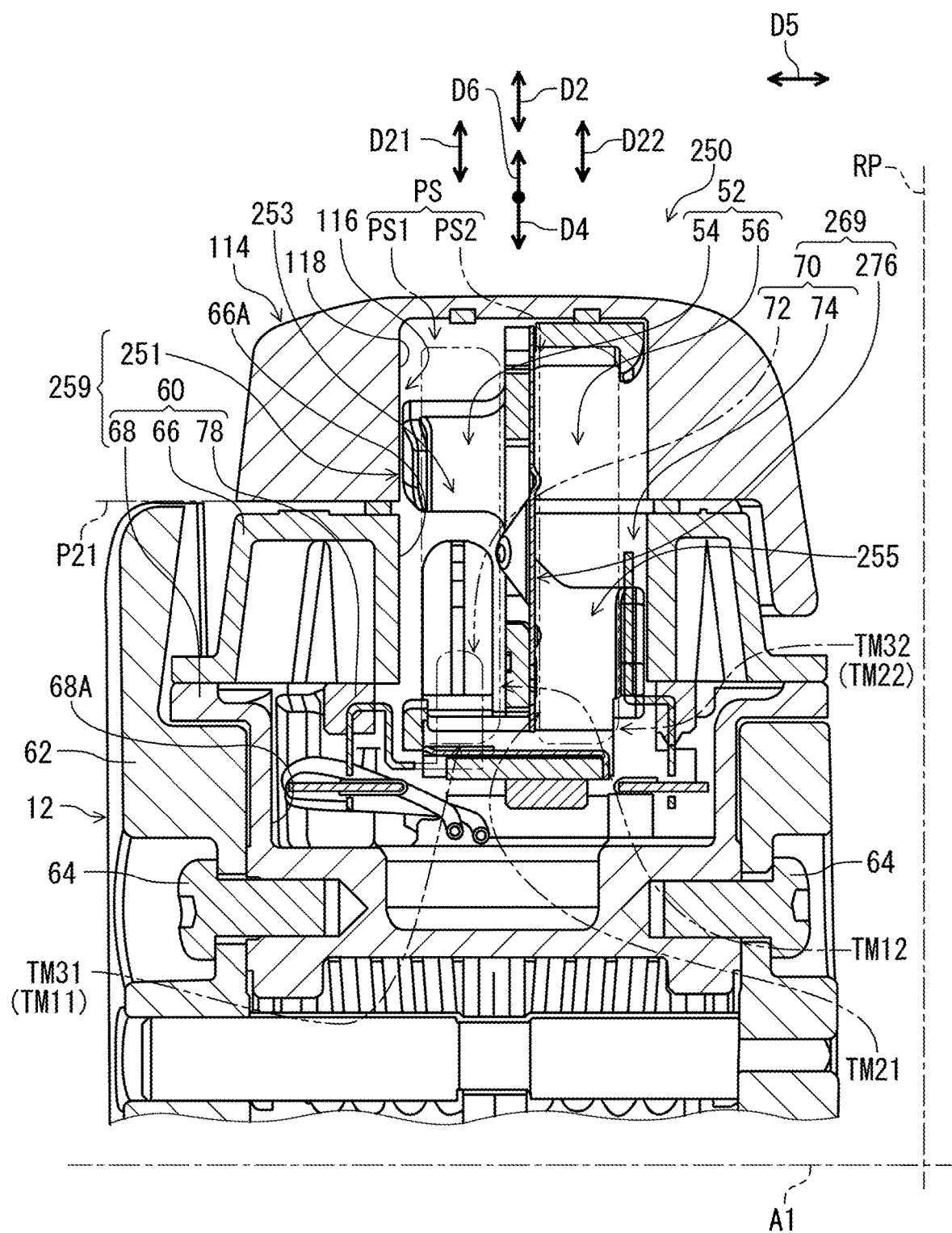
FIG. 28 is a partial cross-sectional view of the operating device illustrated in FIG. 25 taken along a same cross-sectional line as line VII-VII in FIG. 6.

As seen in FIG. 28, the accommodating structure 250 includes a terminal structure 269. The terminal structure 269 is configured to be in contact with the power supply PS in the state where the power supply PS is in the power-supply accommodating space 52. The terminal structure 269 includes an intermediate terminal 276. Namely, the accommodating structure 250 includes the intermediate terminal 276.

Figure 29:
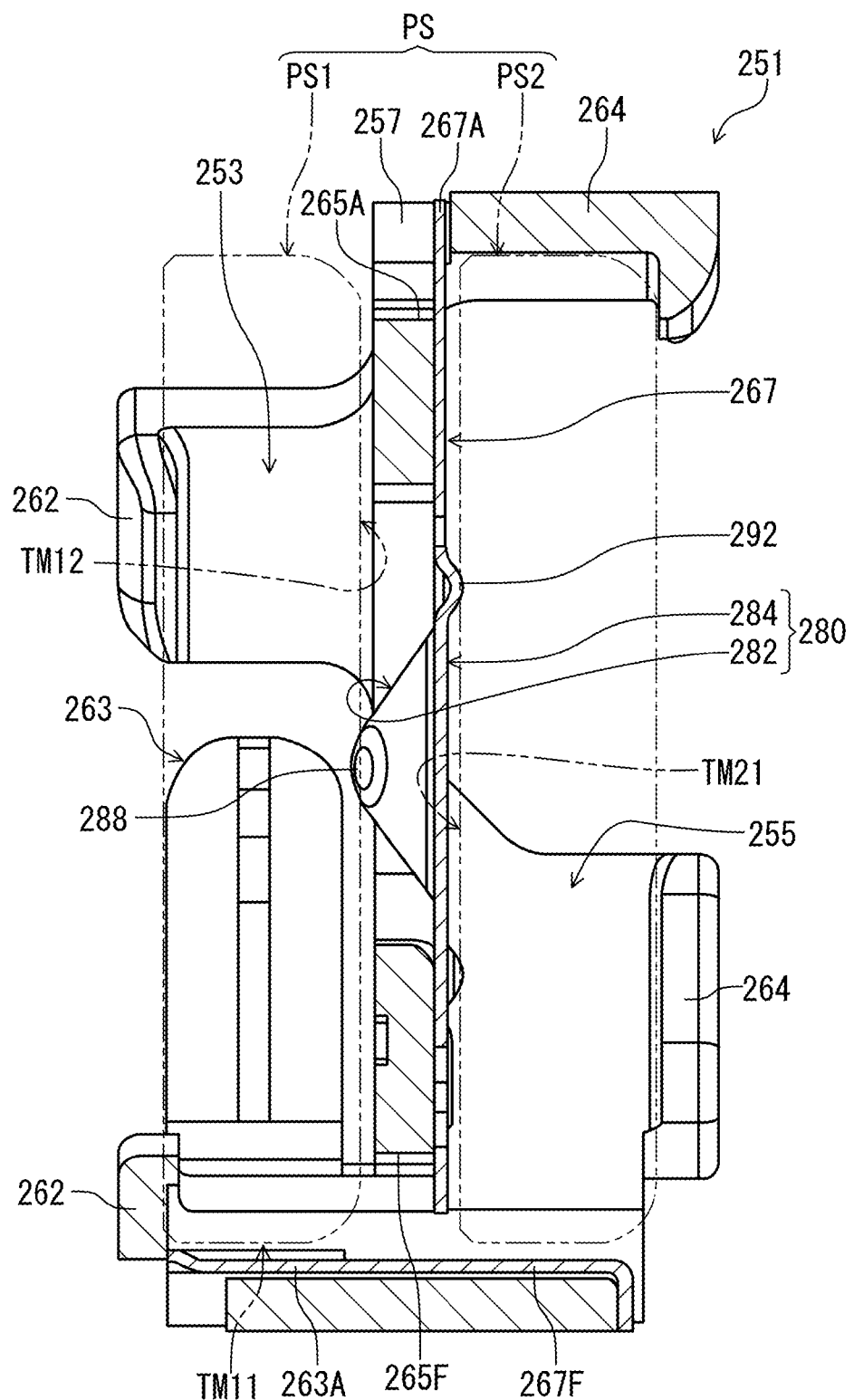
FIG. 29 is a partial cross-sectional view of the holder and the terminal structure of the operating device illustrated in FIG. 28.

As seen in FIG. 29, the intermediate terminal 276 is attached to the holder 251. The intermediate terminal 276 is made of a conductive material. The intermediate terminal 276 is provided between the first holding space 253 and the second holding space 255. The intermediate terminal 276 is configured to be in contact with the first power supply PS1 and the second power supply PS2 in a state where the first power supply PS1 and the second power supply PS2 are provided in the first holding space 253 and the second holding space 255. The intermediate terminal 276 is configured to be in contact with the first negative terminal TM12 of the first power supply PS1 and the second positive terminal TM21 of the second power supply PS2 in the state where the first power supply PS1 and the second power supply PS2 are provided in the first holding space 253 and the second holding space 255.

As seen in FIG. 28, the intermediate terminal 276 is provided between the first power-supply accommodating space 54 and the second power-supply accommodating space 56. The intermediate terminal 276 is provided between the first power-supply accommodating space 54 and the second power-supply accommodating space 56 in the state where the first power supply PS1 and the second power supply PS2 are provided in the first power-supply accommodating space 54 and the second power-supply accommodating space 56. The intermediate terminal 276 is attached to the accommodating base 60 in a state where the holder 251 is attached to the accommodating base 60.

The first power supply PS1 is provided in the first power-supply accommodating space 54 in a state where the holder 251 holds the first power supply PS1 in the first holding space 253 and a state where the holder 251 is provided in the power-supply accommodating space 52. The second power supply PS2 is provided in the second power-supply accommodating space 56 in a state where the holder 251 holds the second power supply PS2 in the second holding space 255 and the state where the holder 251 is provided in the power-supply accommodating space 52.

The terminal structure 269 includes the terminal member 70. Namely, the accommodating structure 250 includes the terminal member 70. The terminal member 70 is configured to be attached to the accommodating base 60. The terminal member 70 is configured to be in contact with the power supply PS in a state where the power supply PS is in the power-supply accommodating space 52. The terminal member 70 is configured to be in contact with at least one of the first power supply PS1 and the second power supply PS2 in a state where the first power supply PS1 and the second power supply PS2 are respectively provided in the first holding space 253 and the second holding space 255 and a state where the holder 251 is attached to the accommodating base 60.

The first terminal 72 of the terminal member 70 is configured to be in contact with the holding terminal 292 in the state where the holder 251 is provided in the power-supply accommodating space 52. The first terminal 72 is configured to be electrically connected to the first positive terminal TM11 of the first power supply PS1 through the holding terminal 292 in the state where the holder 251 is provided in the power-supply accommodating space 52. The second terminal 74 is configured to be in contact with the second negative terminal TM22 of the second power supply PS2 in the state where the holder 251 holds the second power supply PS2 in the second holding space 255 and the state where the holder 251 is provided in the power-supply accommodating space 52.

As seen in FIG. 29, the intermediate terminal 276 includes a biasing member 280. The biasing member 280 is configured to be in contact with at least one of the first power supply PS1 and the second power supply PS2. The biasing member 280 is configured to bias the at least one of the first power supply PS1 and the second power supply PS2 such that the first power supply PS1 and the second power supply PS2 are separated from each other in the state where the first power supply PS1 and the second power supply PS2 are provided in the first power-supply accommodating space 54 (see e.g., FIG. 28) and the second power-supply accommodating space 56 (see e.g., FIG. 28).

In the present embodiment, the biasing member 280 includes a first biasing member 282 and a second biasing member 284. The first biasing member 282 is configured to bias the first power supply PS1 away from the second power supply PS2 in the state where the first power supply PS1 and the second power supply PS2 are provided in the first power-supply accommodating space 54 and the second power-supply accommodating space 56. The second biasing member 284 is configured to bias the second power supply PS2 away from the first power supply PS1 in the state where the first power supply PS1 and the second power supply PS2 are provided in the first power-supply accommodating space 54 and the second power-supply accommodating space 56.

Figure 30:
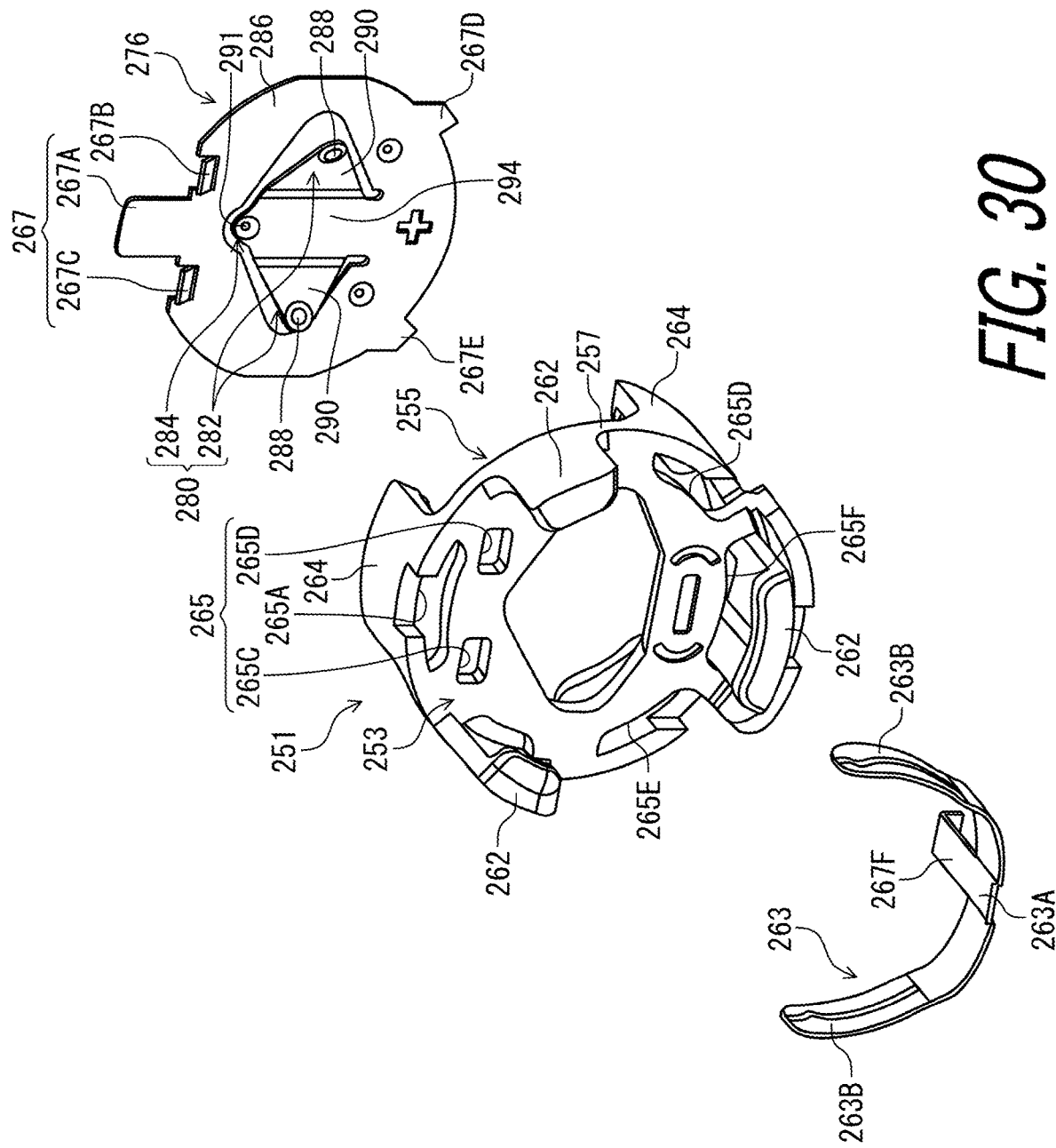
FIG. 30 is an exploded perspective view of the holder and the terminal structure illustrated in FIG. 29.

As seen in FIG. 30, the biasing member 280 includes a plurality of first biasing members 282. The second biasing member 284 is provided between the plurality of first biasing members 282. The plurality of first biasing members 282 extends from the second biasing member 284 away from each other. However, the positional relationships among the first biasing members 282 and the second biasing member 284 are not limited to the above relationships. A total number of the first biasing members 282 is not limited to two. A total number of the second biasing member 284 is not limited to one. At least one of the first biasing member 282 and the second biasing member 284 can be omitted from the intermediate terminal 276 if needed and/or desired. The biasing member 280 can be omitted from the intermediate terminal 276.

The intermediate terminal 276 includes an intermediate base 286. The intermediate base 286 is secured to the holder 251. The second biasing member 284 is coupled to the intermediate base 286 to be elastically deformable. The first biasing member 282 is coupled to the second biasing member 284 to be elastically deformable. In the present embodiment, the biasing member 280 is integrally provided with the intermediate base 286 as a one-piece unitary member. However, the biasing member 280 can be a separate member from the intermediate base 286 if needed and/or desired.

As seen in FIG. 30, the first biasing member 282 includes a first contact 288 configured to be in contact with the first power supply PS1 in the state where the first power supply PS1 is in the first power-supply accommodating space 54. The first contact 288 includes a first curved member 88A configured to be in contact with the first power supply PS1. The first biasing member 282 includes a first biasing body 290. The first biasing body 290 extends from the intermediate base 286. The first contact 288 is provided at a longitudinal end of the first biasing body 290. The shape of the first biasing member 282 is not limited to the shape illustrated in FIG. 30.

The second biasing member 284 includes a second contact 291 configured to be in contact with the second power supply PS2 in a state where the second power supply PS2 is in the second power-supply accommodating space 56. The second contact 291 is spaced apart from the first contact 288. The second contact 291 includes a second curved member 92A configured to be in contact with the second power supply PS2. The second biasing member 284 includes a second biasing body 294. The second biasing body 294 extends from the intermediate base 286. The second contact 291 is provided at a longitudinal end of the second biasing body 294. The shape of the second biasing member 284 is not limited to the shape illustrated in FIG. 30.

As seen in FIG. 26, the terminal structure 269 includes a holder terminal 263. The holder terminal 263 is attached to the holder 251. As seen in FIG. 29, the holder terminal 263 is configured to be in contact with the first power supply PS1 in a state where the first power supply PS1 is held in the first holding space 253. The holder terminal 263 is configured to be in contact with the first positive terminal TM11 of the first power supply PS1 in the state where the first power supply PS1 is held in the first holding space 253.

As seen in FIG. 30, the holder terminal 263 includes a terminal base 263A and a plurality of biasing parts 263B. The biasing part 263B is configured to be in contact with the first power supply PS1. The biasing part 263B is coupled to the terminal base 263A to be elastically deformable. The shape of the holder terminal 263 is not limited to the shape illustrated in FIG. 30.

As seen in FIG. 30, the accommodating body 259 includes an attachment opening 265. The terminal structure 269 includes a securing part 267. The securing part 267 is configured to be provided in the attachment opening 265 to secure the terminal structure 269 to the accommodating body 259. In the present embodiment, the attachment opening 265 includes a plurality of openings 265A, 265B, 265C, 265D, 265E, and 265F. The securing part 267 includes a plurality of a securing portions 267A, 267B, 267C, 267D, 267E, and 267F configured to be in the plurality of openings 265A, 265B, 265C, 265D, 265E, and 265F. The holder 251 of the accommodating body 259 includes the attachment opening 265. The holder 251 of the accommodating body 259 includes the plurality of openings 265A, 265B, 265C, 265D, 265E, and 265F. The intermediate terminal 276 of the terminal structure 269 includes the plurality of securing portions 267A, 267B, 267C, 267D, and 267E. The plurality of securing portions 267A, 267B, 267C, 267D, and 267E protrudes from the intermediate base 286. The holder terminal 263 includes the securing portion 267F. The terminal base 263A includes the securing portion 267F and extends from the plurality of biasing parts 263B.

The securing portion 267A is configured to be provided in the opening 265A to secure the intermediate terminal 276 of the terminal structure 269 to the holder 251 of the accommodating body 259. The securing portion 267A extends through the opening 265A to secure the intermediate terminal 276 to the holder 251.

The securing portion 267B is configured to be provided in the opening 265B to secure the intermediate terminal 276 of the terminal structure 269 to the holder 251 of the accommodating body 259. The securing portion 267B extends through the opening 265B to secure the intermediate terminal 276 to the holder 251.

The securing portion 267C is configured to be provided in the opening 265C to secure the intermediate terminal 276 of the terminal structure 269 to the holder 251 of the accommodating body 259. The securing portion 267C extends through the opening 265C to secure the intermediate terminal 276 to the holder 251.

The securing portion 267D is configured to be provided in the opening 265D to secure the intermediate terminal 276 of the terminal structure 269 to the holder 251 of the accommodating body 259. The securing portion 267D extends through the opening 265D to secure the intermediate terminal 276 to the holder 251.

The securing portion 267E is configured to be provided in the opening 265E to secure the intermediate terminal 276 of the terminal structure 269 to the holder 251 of the accommodating body 259. The securing portion 267E extends through the opening 265E to secure the intermediate terminal 276 to the holder 251.

The securing portion 267F is configured to be provided in the opening 265F to secure the holder terminal 263 of the terminal structure 269 to the holder 251 of the accommodating body 259. The securing portion 267F extends through the opening 265F to secure the holder terminal 263 to the holder 251.

First Modification

Figure 31:
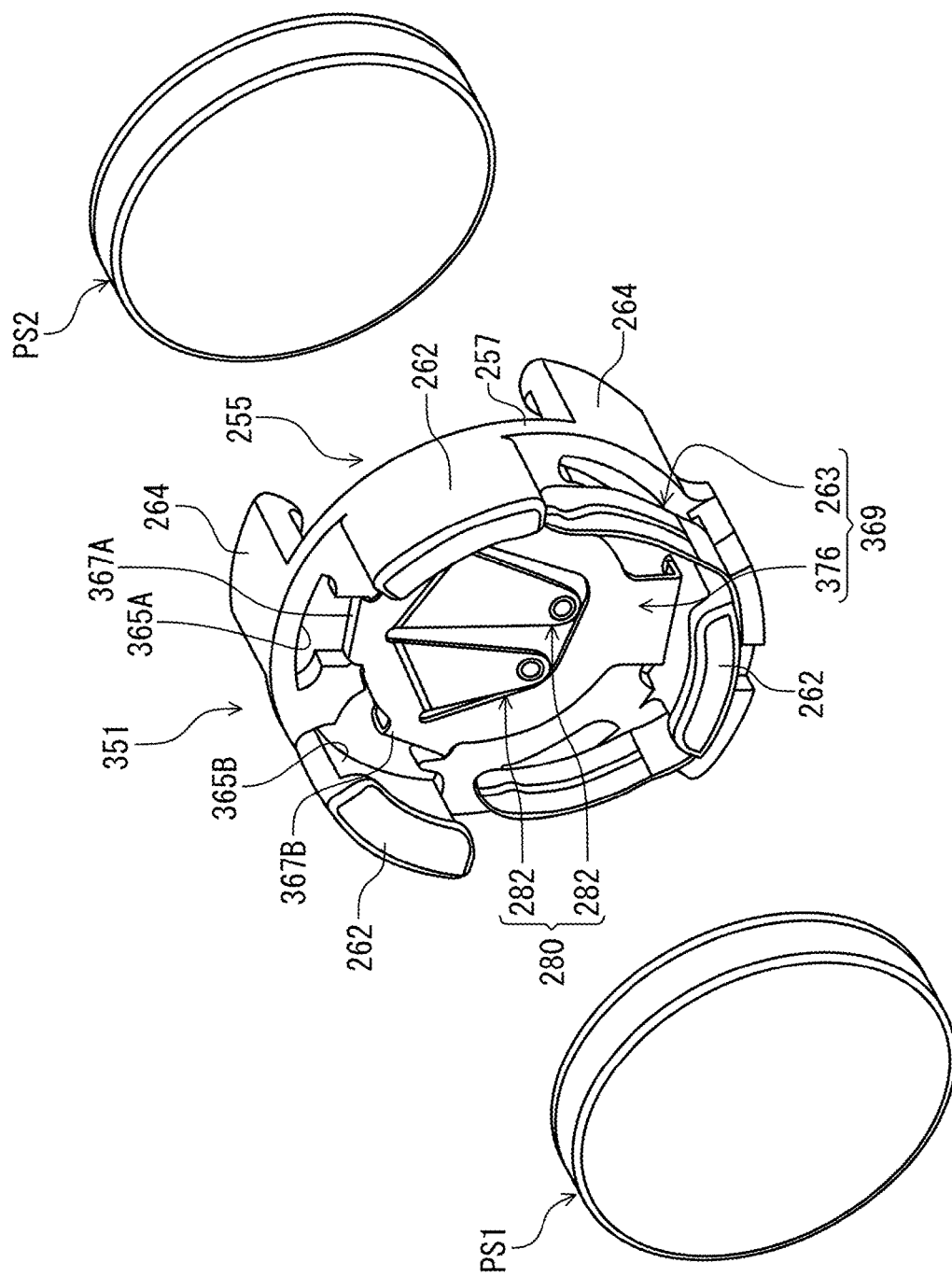
FIG. 31 is a perspective view of a holder, a terminal structure, and the power supply of an operating device in accordance with a first modification.
Figure 32:
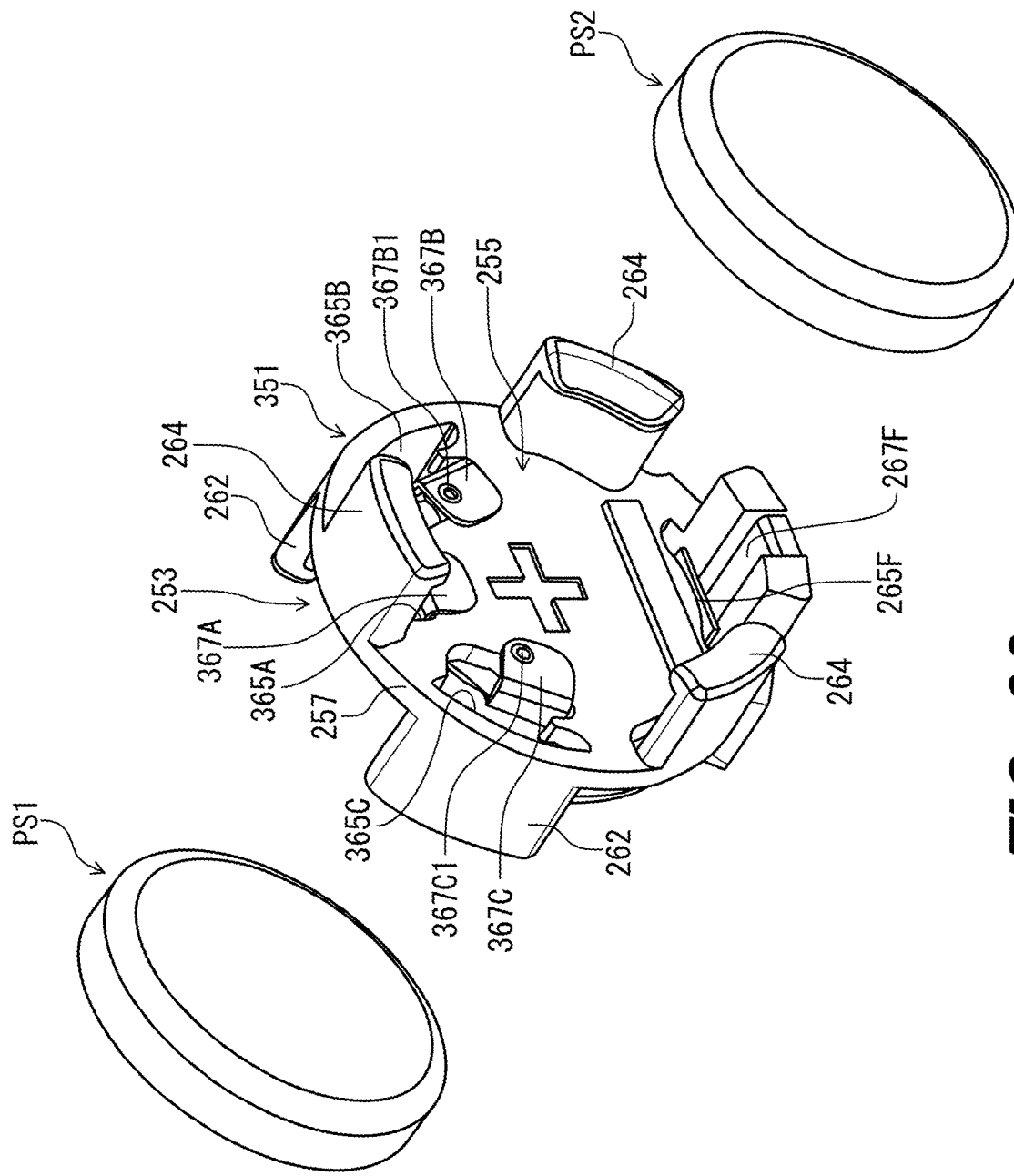
FIG. 32 is another perspective view of the holder, the terminal structure, and the power supply of the operating device illustrated in FIG. 31.

The holder 251 and the intermediate terminal 276 of the second embodiment can be replaced with a holder 351 and an intermediate terminal 376. illustrated in FIGS. 31 to 34. The holder 351 has substantially the same structure as the structure of the holder 251 of the second embodiment. The intermediate terminal 376 has substantially the same structure as the structure of the intermediate terminal 276 of the second embodiment. As seen in FIGS. 31 and 32, the holder 351 defines the first holding space 253 in which the first power supply PS1 is to be provided and the second holding space 255 in which the second power supply PS2 is to be provided. The holder 351 includes the holder body 257, the plurality of first holding parts 262, and the plurality of second holding parts 264.

Figure 33:
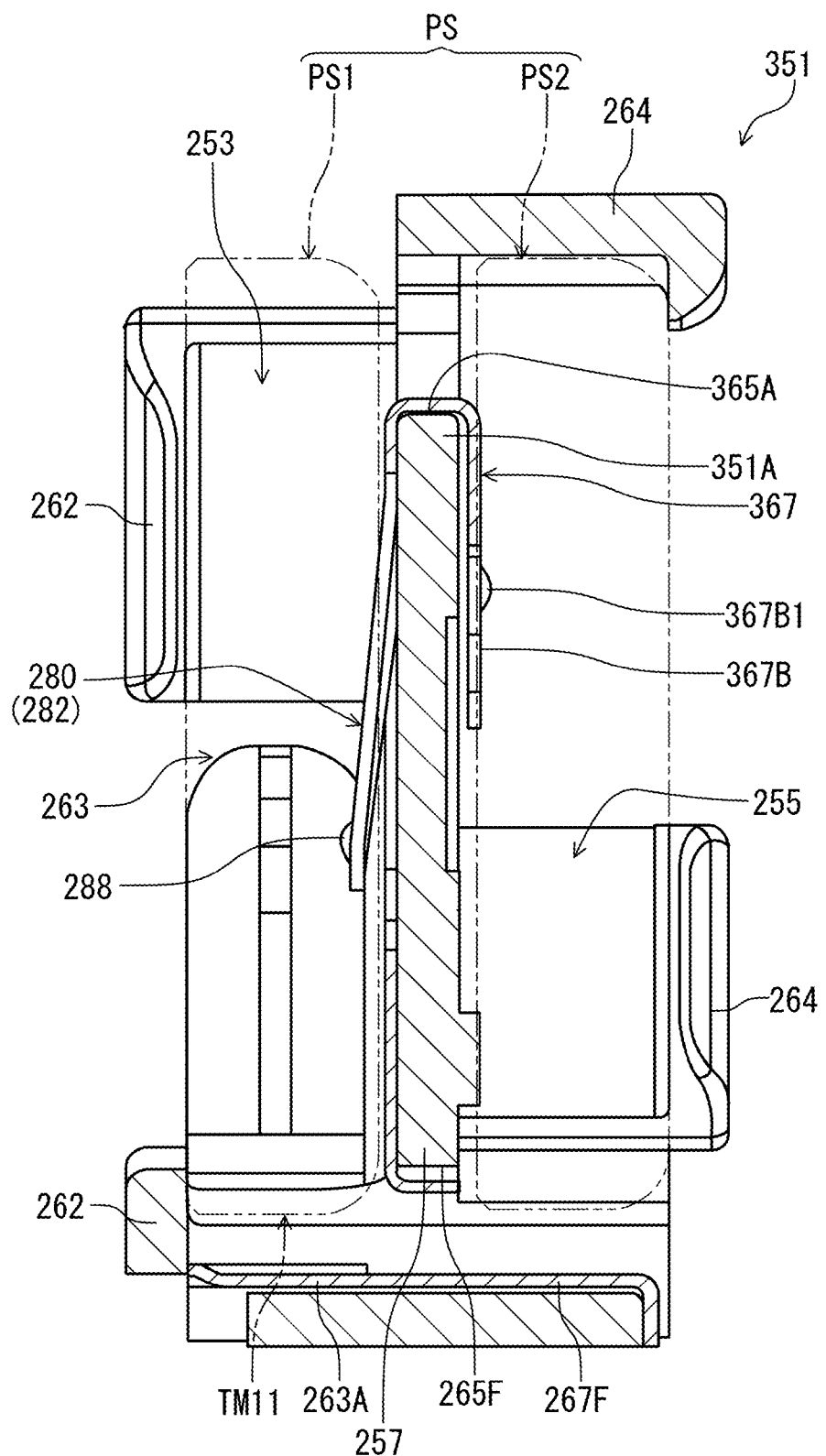
FIG. 33 is a partial cross-sectional view of the holder and the terminal structure illustrated in FIG. 31.

As seen in FIG. 33, the intermediate terminal 376 is attached to the holder 351. The intermediate terminal 376 is made of a conductive material. The intermediate terminal 376 is provided between the first holding space 253 and the second holding space 255. The intermediate terminal 376 is configured to be in contact with the first power supply PS1 and the second power supply PS2 in the state where the first power supply PS1 and the second power supply PS2 are provided in the first holding space 253 and the second holding space 255. The intermediate terminal 376 is configured to be in contact with the first negative terminal TM12 of the first power supply PS1 and the second positive terminal TM21 of the second power supply PS2 in the state where the first power supply PS1 and the second power supply PS2 are provided in the first holding space 253 and the second holding space 255.

Figure 34:
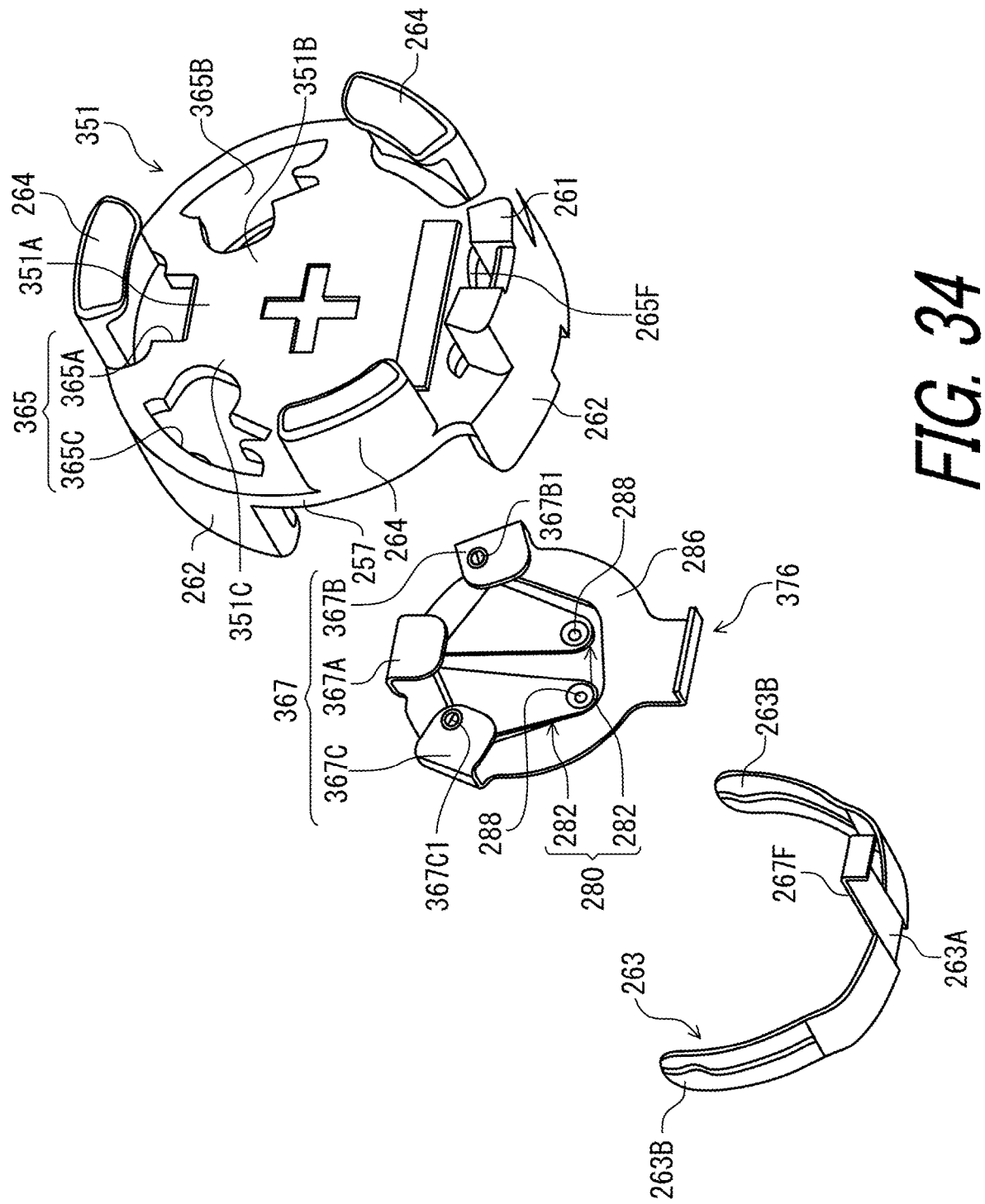
FIG. 34 is an exploded perspective view of the holder and the terminal structure illustrated in FIG. 31.

As seen in FIG. 34, the intermediate terminal 376 includes a biasing member 280. The biasing member 280 of the intermediate terminal 376 includes the plurality of first biasing members 282 and the intermediate base 286. The intermediate base 286 is secured to the holder 351. The first biasing member 282 is coupled to the intermediate base 286 to be elastically deformable.

The holder 351 of the accommodating body 259 includes an attachment opening 365. The intermediate terminal 376 of the terminal structure 269 includes a securing part 367. The securing part 367 is configured to be provided in the attachment opening 365 to secure the terminal structure 269 to the accommodating body 259. In the present embodiment, the attachment opening 365 includes a plurality of openings 365A, 365B, 365C, and 265F. The securing part 367 includes a plurality of a securing portions 367A, 367B, 367C, and 267F configured to be in the plurality of openings 365A, 365B, 365C, and 265F. The holder 351 of the accommodating body 259 includes the attachment opening 365. The holder 351 of the accommodating body 259 includes the plurality of openings 365A, 365B, 365C, and 265F. The intermediate terminal 376 of the terminal structure 269 includes the plurality of securing portions 367A, 367B, and 367C. The plurality of securing portions 367A, 367B, and 367C protrudes from the intermediate base 286. The holder terminal 263 includes the securing portion 367F. The terminal base 263A includes the securing portion 367F and extends from the plurality of biasing parts 263B.

The securing portion 367A is configured to be provided in the opening 365A to secure the intermediate terminal 376 of the terminal structure 269 to the holder 351 of the accommodating body 259. The securing portion 367A extends through the opening 365A to secure the intermediate terminal 376 to the holder 351. The holder 351 of the accommodating body 259 includes a receiving part 351A. The securing part 367 is bent to hold the receiving part 351A. The securing portion 367A is bent to hold the receiving part 351A.

The securing portion 367B is configured to be provided in the opening 365B to secure the intermediate terminal 376 of the terminal structure 269 to the holder 351 of the accommodating body 259. The securing portion 367B extends through the opening 365B to secure the intermediate terminal 376 to the holder 351. The holder 351 of the accommodating body 259 includes a receiving part 351B. The securing part 367 is bent to hold the receiving part 351B. The securing portion 367B is bent to hold the receiving part 351B.

The securing portion 367C is configured to be provided in the opening 365C to secure the intermediate terminal 376 of the terminal structure 269 to the holder 351 of the accommodating body 259. The securing portion 367C extends through the opening 365C to secure the intermediate terminal 376 to the holder 351. The holder 351 of the accommodating body 259 includes a receiving part 351C. The securing part 367 is bent to hold the receiving part 351C. The securing portion 367C is bent to hold the receiving part 351C.

The securing portion 267F is configured to be provided in the opening 265F to secure the holder terminal 263 of the terminal structure 269 to the holder 351 of the accommodating body 259. The securing portion 267F extends through the opening 265F to secure the holder terminal 263 to the holder 351.

The securing portion 367B includes a contact 367B1 configured to be in contact with the second power supply PS2 in the state where the second power supply PS2 is provided in the second holding space 255 (see e.g., FIG. 33). The securing portion 367C includes a contact 367C1 configured to be in contact with the second power supply PS2 in the state where the second power supply PS2 is provided in the second holding space 255.

Second Modification

Figure 35:
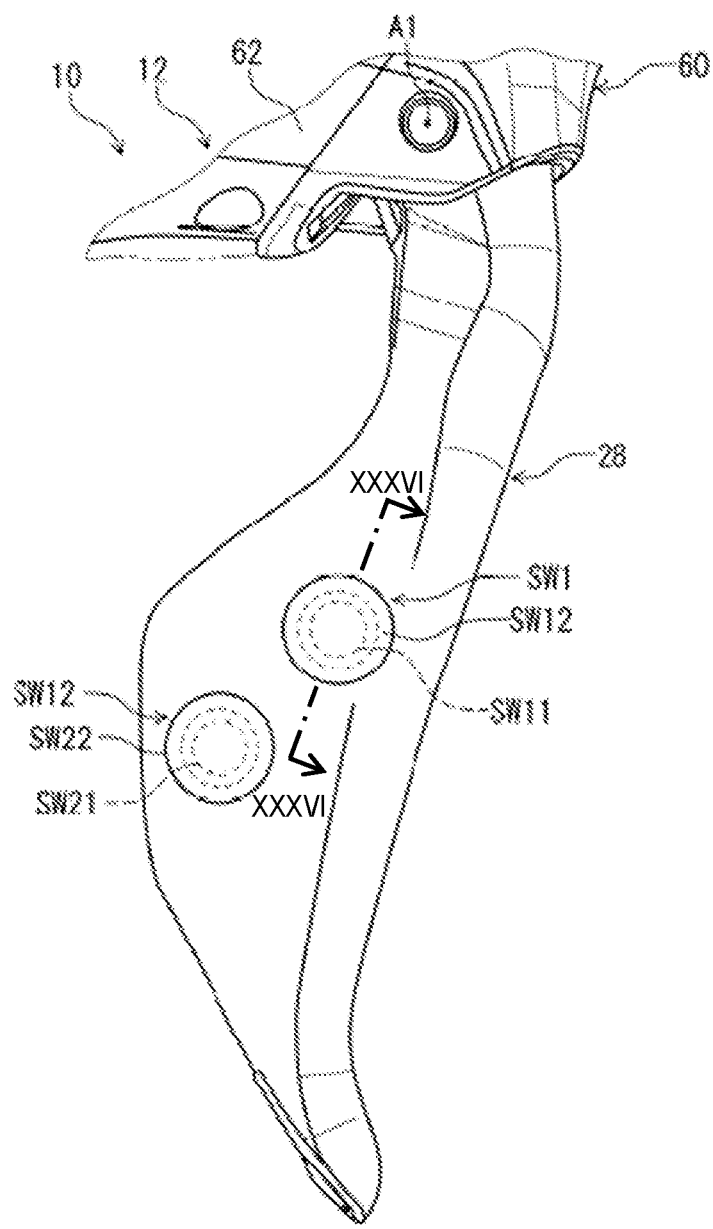
FIG. 35 is a partial side elevational view of an operating device in accordance with a second modification.

As seen in FIG. 35, at least one of the switches SW1 and SW2 can have a replaceable button. The switch SW1 includes a switch circuit SW11 and a button SW12. The button SW12 is movably attached to the operating member 28 to be pressed by a user. The switch circuit SW11 is configured to be turned on in response to the movement of the button SW12. Similarly, the switch SW2 includes a switch circuit SW21 and a button SW22. The button SW22 is movably attached to the operating member 28 to be pressed by a user. The switch circuit SW21 is configured to be turned on in response to the movement of the button SW22.

Figure 36:
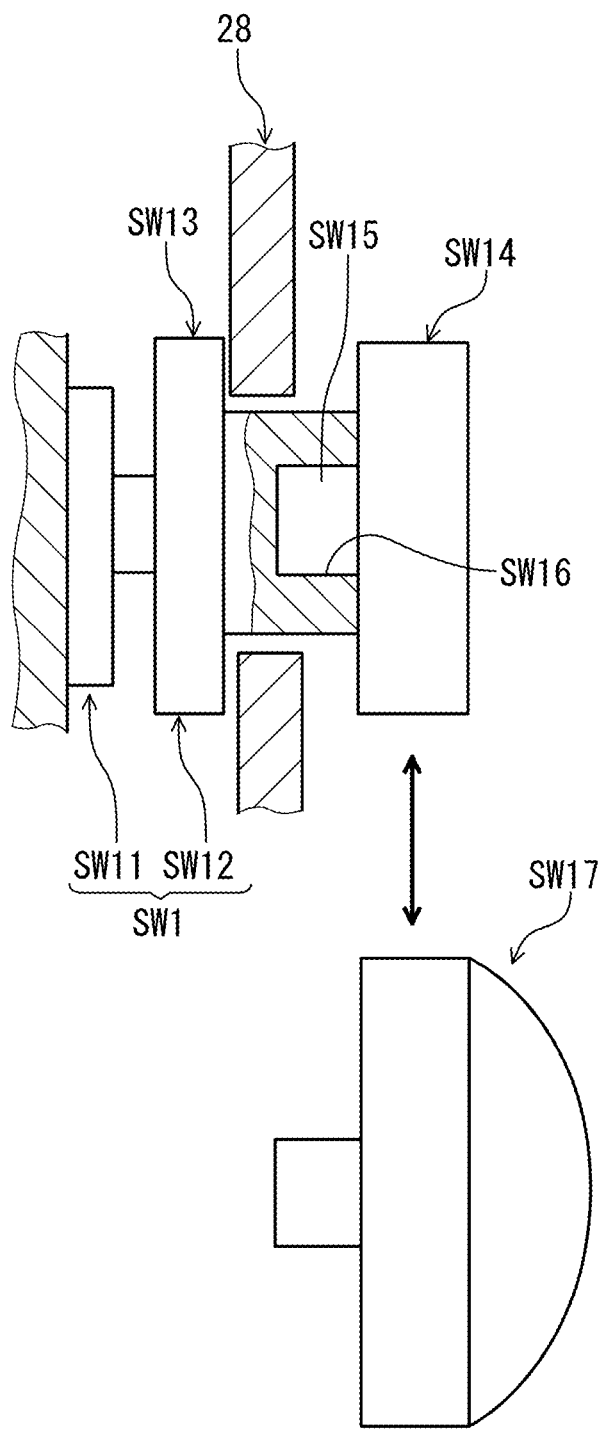
FIG. 36 is a schematic cross-sectional view of the operating device taken along line XXXVI-XXXVI of FIG. 35.

As seen in FIG. 36, the button SW12 includes a button base SW13 and a button body SW14. The button base SW13 is configured to be in contact with the switch circuit SW11. The button base SW13 is movable relative to the operating member 28. The button body SW14 is detachably attached to the button base SW13. A protrusion SW15 of the button body SW14 is press-fitted in a hole SW16 of the button base SW13. The button body SW14 is configured to be replaceable with an additional button body SW17. The additional button body SW17 has a structure different from the structure of the button body SW14. For example, the additional button body SW17 has a shape and/or a size different from the shape and/or the size of the button body SW14. The additional button body SW17 can be made of a material different from a material of the button body SW14.

Please note that the operating member 28 can be omitted from the operating device 10 and/or 210 of the first and/or second embodiments and the first and/or second modifications thereof if needed and/or desired.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating device for a human-powered vehicle, comprising:
   a base member extending in a longitudinal direction and including
      a first end portion configured to be coupled to a handlebar, and
      a second end portion opposite to the first end portion in the longitudinal direction; and
   an electric communication port configured to be electrically connected to a connector of an electric cable, the electric communication port being closer to the second end portion than the first end portion in the longitudinal direction.

2. The operating device according to claim 1, wherein the electric communication port is provided at the second end portion.

3. The operating device according to claim 1, wherein the electric communication port includes an insertion hole extending in a port insertion direction, and the port insertion direction is different from the longitudinal direction.

4. The operating device according to claim 1, further comprising
   an operating member pivotally coupled to the base member about a pivot axis, wherein
   the electric communication port is provided above the pivot axis as viewed along the pivot axis in a mounting state where the first end portion is coupled to the handlebar.

5. The operating device according to claim 1, wherein the base member includes a first lateral surface and a second lateral surface provided on a reverse side of the first lateral surface, and
   the electric communication port is provided in at least one of the first lateral surface and the second lateral surface.

6. The operating device according to claim 1, further comprising
   an operating member pivotally coupled to the base member about a pivot axis, wherein
   the base member includes an accommodating structure configured to accommodate a power supply, and
   the electric communication port is closer to the accommodating structure than the pivot axis as viewed along the pivot axis.

7. The operating device according to claim 6, wherein the accommodating structure includes a power-supply accommodating space in which the power supply is to be provided, and
   the electric communication port is closer to the power-supply accommodating space than the pivot axis as viewed along the pivot axis.

8. The operating device according to claim 1, further comprising
   a circuitry electrically connected to the electric communication port.

9. The operating device according to claim 8, wherein the circuitry includes a substrate provided to the second end portion.

10. The operating device according to claim 8, further comprising
    a wire configured to electrically connect the electric communication port to the substrate, wherein
    the wire is provided in the base member.

11. The operating device according to claim 1, wherein the second end portion includes a pommel portion, and
    the electric communication port is closer to the pommel portion than the first end portion in the longitudinal direction.

12. The operating device according to claim 1, wherein the base member includes a grip portion provided between the first end portion and the second end portion in the longitudinal direction.

13. The operating device according to claim 1, wherein the electric communication port is configured to detachably receive the connector of the electric cable from an outside of the operating device.

14. An operating device for a human-powered vehicle, comprising:
    a base member extending in a longitudinal direction and including
       a first end portion configured to be coupled to a handlebar, and
       a second end portion opposite to the first end portion in the longitudinal direction;
    a hydraulic unit including a cylinder bore and a piston movably provided in the cylinder bore; and
    an electric communication port configured to be electrically connected to a connector of an electric cable, the electric communication port being closer to the second end portion than at least one of the cylinder bore and the piston.

15. The operating device according to claim 14, wherein the hydraulic unit includes
    a hydraulic chamber defined by the cylinder bore and the piston, and
    a reservoir chamber configured to be in communication with the hydraulic chamber, and
    the electric communication port is closer to the second end portion than at least one of the hydraulic chamber and the reservoir chamber.

16. The operating device according to claim 14, wherein the electric communication port is configured to detachably receive the connector of the electric cable from an outside of the operating device.

17. An operating device for a human-powered vehicle, comprising:
- a base member extending in a longitudinal direction and including
  - a first end portion configured to be coupled to a handlebar,
  - a second end portion opposite to the first end portion in the longitudinal direction; and
- an electric communication port configured to be electrically connected to a connector of an electric cable, the electric communication port including an insertion hole extending in a port insertion direction different from the longitudinal direction, the electric communication port being provided non-movably relative to the base member.

18. The operating device according to claim 3, wherein the port insertion direction is non-parallel to the longitudinal direction.

19. The operating device according to claim 3, wherein the port insertion direction is perpendicular to the longitudinal direction.

20. An operating device for a human-powered vehicle, comprising:
- a base member extending in a longitudinal direction and including
  - a first end portion configured to be coupled to a handlebar, and
  - a second end portion opposite to the first end portion in the longitudinal direction;
- an operating member pivotally coupled to the base member about a pivot axis; and
- an electric communication port configured to be electrically connected to a connector of an electric cable, the electric communication port including an insertion hole defining an insertion opening, the insertion opening facing a reference plane non-parallel to the pivot axis.

* * * * *